(12) United States Patent
Andeshmand et al.

(10) Patent No.: US 11,920,700 B2
(45) Date of Patent: Mar. 5, 2024

(54) ROTARY VALVE

(71) Applicant: TALIS BIOMEDICAL CORPORATION, Redwood City, CA (US)

(72) Inventors: Sayeed Andeshmand, Dublin, CA (US); Thomas H. Cauley, III, Redwood City, CA (US); John Dixon, Moss Beach, CA (US)

(73) Assignee: Talis Biomedical Corporation, Chicago, IL (US)

( * ) Notice: Subject to any disclaimer, the term of this patent is extended or adjusted under 35 U.S.C. 154(b) by 775 days.

(21) Appl. No.: 16/970,074

(22) PCT Filed: Feb. 15, 2019

(86) PCT No.: PCT/US2019/018351
§ 371 (c)(1),
(2) Date: Aug. 14, 2020

(87) PCT Pub. No.: WO2019/168691
PCT Pub. Date: Sep. 6, 2019

(65) Prior Publication Data
US 2021/0116049 A1    Apr. 22, 2021

Related U.S. Application Data

(63) Continuation of application No. 15/898,064, filed on Feb. 15, 2018, now Pat. No. 10,527,192.

(51) Int. Cl.
*F16K 99/00* (2006.01)
*B01L 3/00* (2006.01)

(52) U.S. Cl.
CPC .... *F16K 99/0028* (2013.01); *B01L 3/502738* (2013.01); *B01L 3/565* (2013.01);
(Continued)

(58) Field of Classification Search
CPC ............. F16K 99/0028; F16K 11/0743; F16K 99/0013; B01L 3/502738; B01L 3/565; B01L 3/567
See application file for complete search history.

(56) References Cited

U.S. PATENT DOCUMENTS 2,598,362 A   11/1945  Daniels
2,428,410 A   10/1947  Daniels
(Continued)

FOREIGN PATENT DOCUMENTS

CN       1415058 A      4/2003
CN       106090311 A   11/2016
(Continued)

*Primary Examiner* — Atif H Chaudry
(74) *Attorney, Agent, or Firm* — Shay Glenn LLP

(57) ABSTRACT

Rotary valves and methods of using, manufacturing, and storing the same are provided herein. The rotary valve includes a rotor and a stator, biased toward one another to form a fluid tight seal. In some implementations, the rotor comprises an integrated flow channel containing a porous solid support. Frequently, the interface between rotor and stator is made fluid-tight using a gasket. Some implementations of the rotary valve include a displaceable spacer to prevent the gasket from sealing against at least one of the rotor and stator prior to operation, wherein when the spacer is displaced, the gasket seals the rotor and stator together in a fluid-tight manner.

27 Claims, 42 Drawing Sheets

(52) U.S. Cl.
CPC .......... *B01L 3/567* (2013.01); *F16K 99/0013* (2013.01); *B01L 2300/042* (2013.01); *B01L 2300/0816* (2013.01); *B01L 2400/0622* (2013.01); *B01L 2400/0644* (2013.01); *F16K 2099/0084* (2013.01)

(56) References Cited

U.S. PATENT DOCUMENTS

| | | | |
|---|---|---|---|
| 2,451,678 A * | 10/1948 | Johnson | F16K 11/0743 |
| | | | D23/245 |
| 2,857,929 A * | 10/1958 | Whitlock, Jr. | F16K 11/0743 |
| | | | 251/367 |
| 3,504,799 A | 4/1970 | Ogle | |
| 3,776,276 A | 12/1973 | Stiltner | |
| 5,639,074 A | 6/1997 | Greenhill et al. | |
| 6,250,618 B1 | 6/2001 | Greenhill | |
| 6,254,071 B1 | 7/2001 | Greenhill | |
| 6,357,476 B1 * | 3/2002 | Moretti | F16K 11/0743 |
| | | | 137/597 |
| 6,374,684 B1 | 4/2002 | Dority | |
| 6,702,256 B2 | 3/2004 | Killeen et al. | |
| 6,758,465 B1 | 7/2004 | Greenhill et al. | |
| 6,779,557 B2 | 8/2004 | Weiss | |
| 6,813,568 B2 | 11/2004 | Powell et al. | |
| 6,889,710 B2 | 5/2005 | Wagner | |
| 7,143,787 B1 | 12/2006 | Bauerle et al. | |
| 7,159,848 B2 | 1/2007 | Brennen | |
| 7,377,291 B2 | 5/2008 | Moon et al. | |
| RE40,511 E | 9/2008 | Weiss | |
| 7,503,203 B2 | 3/2009 | Gamache et al. | |
| 7,871,575 B2 | 1/2011 | Baeuerle et al. | |
| 7,998,437 B2 | 8/2011 | Berndt et al. | |
| 8,008,080 B2 | 8/2011 | Tokhtuev et al. | |
| 8,012,427 B2 | 9/2011 | Bommarito et al. | |
| 8,016,264 B2 | 9/2011 | Takemasa et al. | |
| 8,017,409 B2 | 9/2011 | Tokhtuev et al. | |
| 8,186,381 B2 | 5/2012 | Wilen | |
| 8,186,382 B2 | 5/2012 | Wilen | |
| 8,191,578 B2 | 6/2012 | Weiss | |
| 8,202,492 B2 | 6/2012 | Linder et al. | |
| 8,225,817 B2 | 7/2012 | Wilen | |
| 8,272,401 B2 | 9/2012 | McLean | |
| 8,286,663 B2 | 10/2012 | Kallback et al. | |
| 8,622,086 B2 | 1/2014 | Servin | |
| 8,656,955 B2 | 2/2014 | Price | |
| 8,728,765 B2 | 5/2014 | Ching et al. | |
| 8,763,640 B2 | 7/2014 | Kojima et al. | |
| 8,770,226 B2 | 7/2014 | Wilen et al. | |
| 8,857,792 B2 | 10/2014 | Parrie et al. | |
| 8,876,081 B2 | 11/2014 | Tower | |
| 8,887,754 B2 | 11/2014 | Dahlke et al. | |
| 8,900,828 B2 | 12/2014 | Smith et al. | |
| 8,911,688 B2 | 12/2014 | Gransee et al. | |
| 8,960,230 B2 | 2/2015 | Weber | |
| 9,169,934 B2 | 10/2015 | Bunner et al. | |
| 9,194,504 B2 | 11/2015 | Cormier et al. | |
| 9,199,238 B2 | 12/2015 | Koltzscher et al. | |
| 9,308,530 B2 | 4/2016 | Hanafusa | |
| 9,316,321 B2 | 4/2016 | McCarty | |
| 9,316,324 B2 | 4/2016 | Berndt | |
| 9,383,020 B2 | 7/2016 | Jackson | |
| 9,421,545 B2 | 8/2016 | Servin | |
| 9,669,409 B2 | 6/2017 | Dority et al. | |
| 9,808,802 B2 | 11/2017 | Dothie et al. | |
| 10,527,192 B2 | 1/2020 | Cauley et al. | |
| 2003/0116203 A1 | 6/2003 | Fleischer | |
| 2003/0116206 A1 | 6/2003 | Hartshorne et al. | |
| 2005/0244837 A1 | 11/2005 | McMillan | |
| 2006/0196552 A1 | 9/2006 | Kriesel et al. | |
| 2011/0232373 A1 | 9/2011 | Desmet et al. | |
| 2013/0263649 A1 | 10/2013 | Storch et al. | |
| 2015/0020904 A1 | 1/2015 | Gärtner et al. | |
| 2015/0184760 A1 | 7/2015 | Moeller et al. | |
| 2018/0015467 A1 | 1/2018 | Liang et al. | |
| 2020/0182379 A1 | 6/2020 | Cauley et al. | |

FOREIGN PATENT DOCUMENTS

| | | |
|---|---|---|
| CN | 106523740 A | 3/2017 |
| JP | 2003090650 A | 3/2003 |
| JP | 2004177105 A | 6/2004 |
| JP | 2013256964 A | 12/2013 |

* cited by examiner

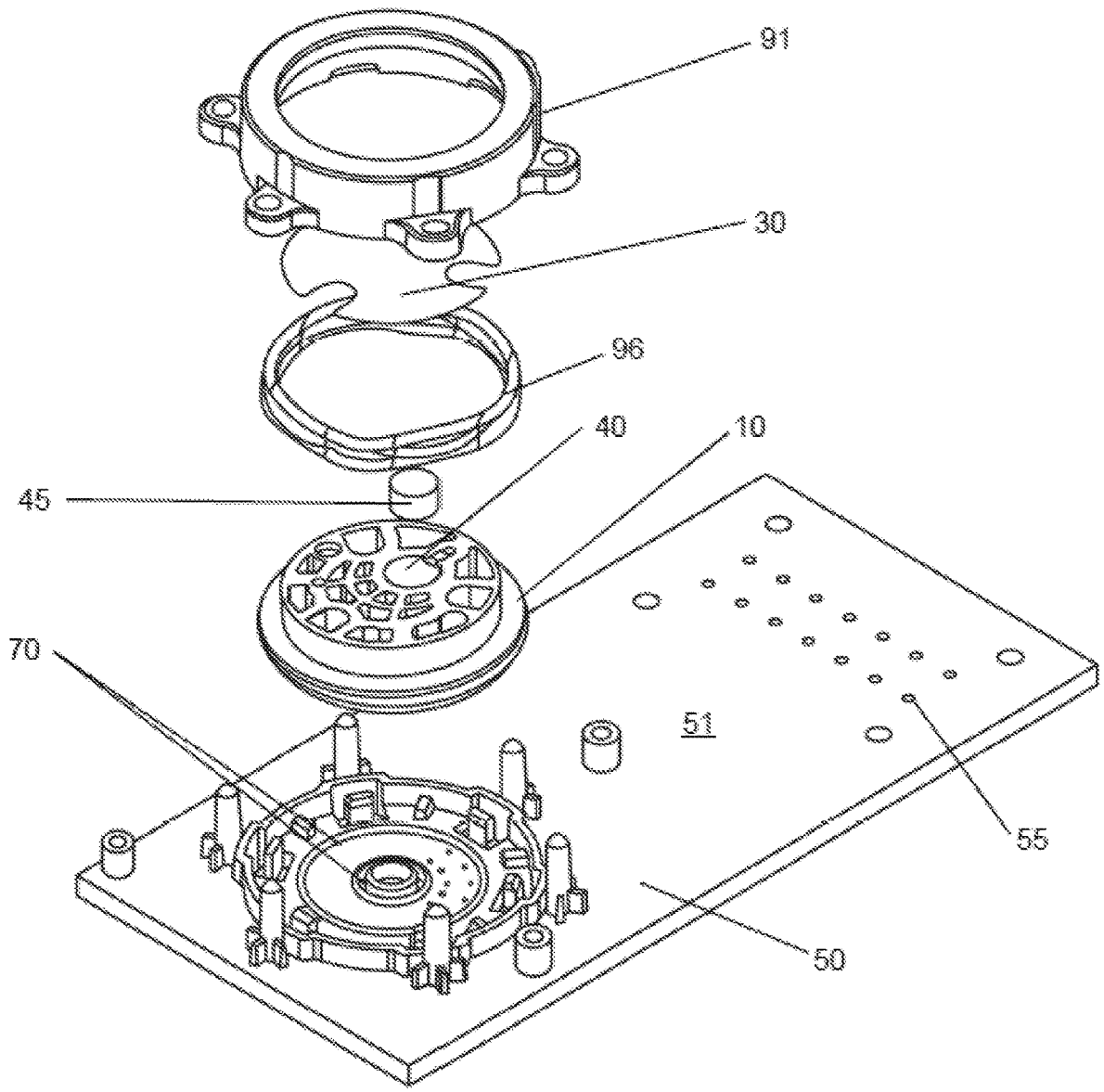
FIG. 1 B1

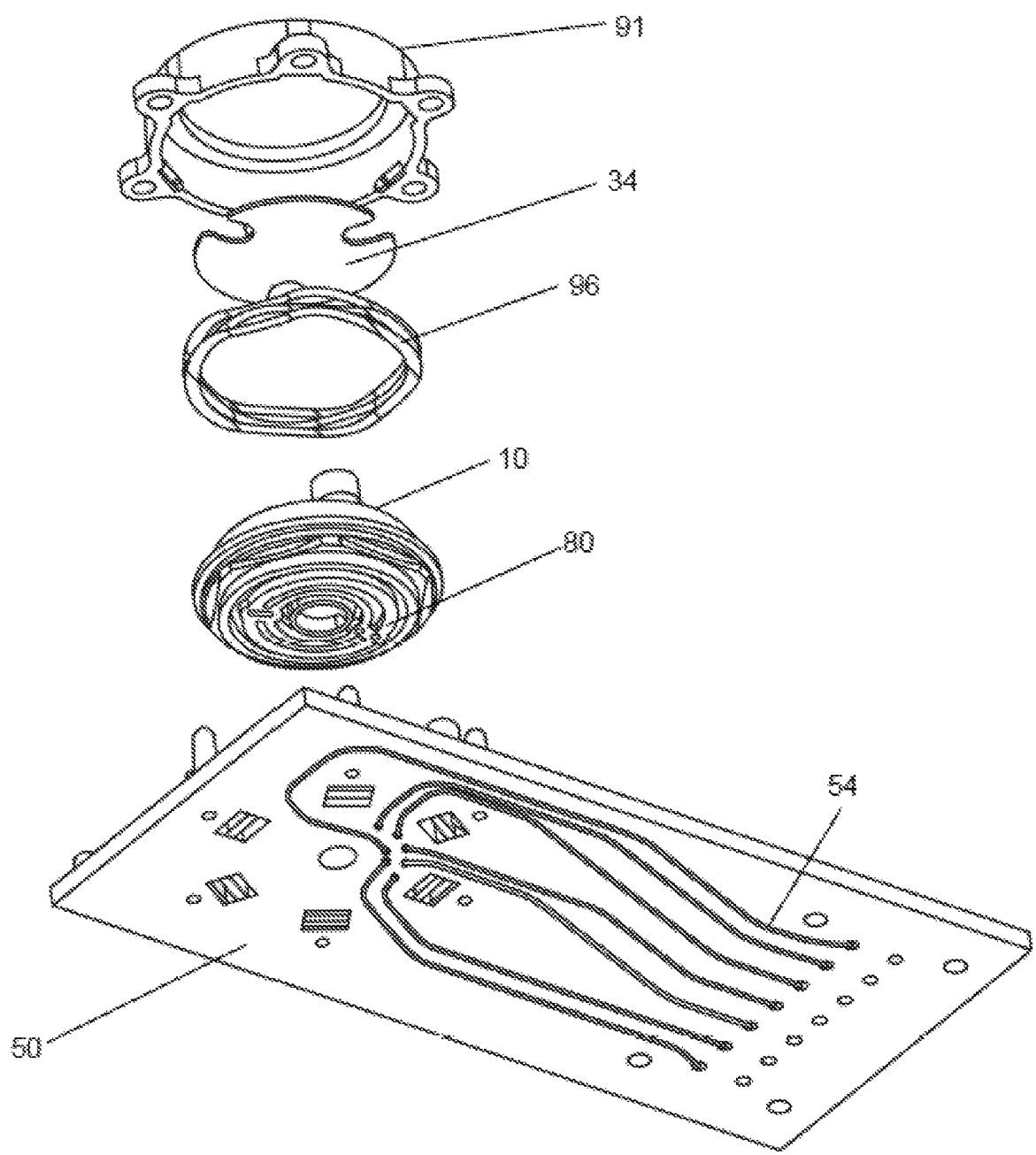
FIG. 1 B2

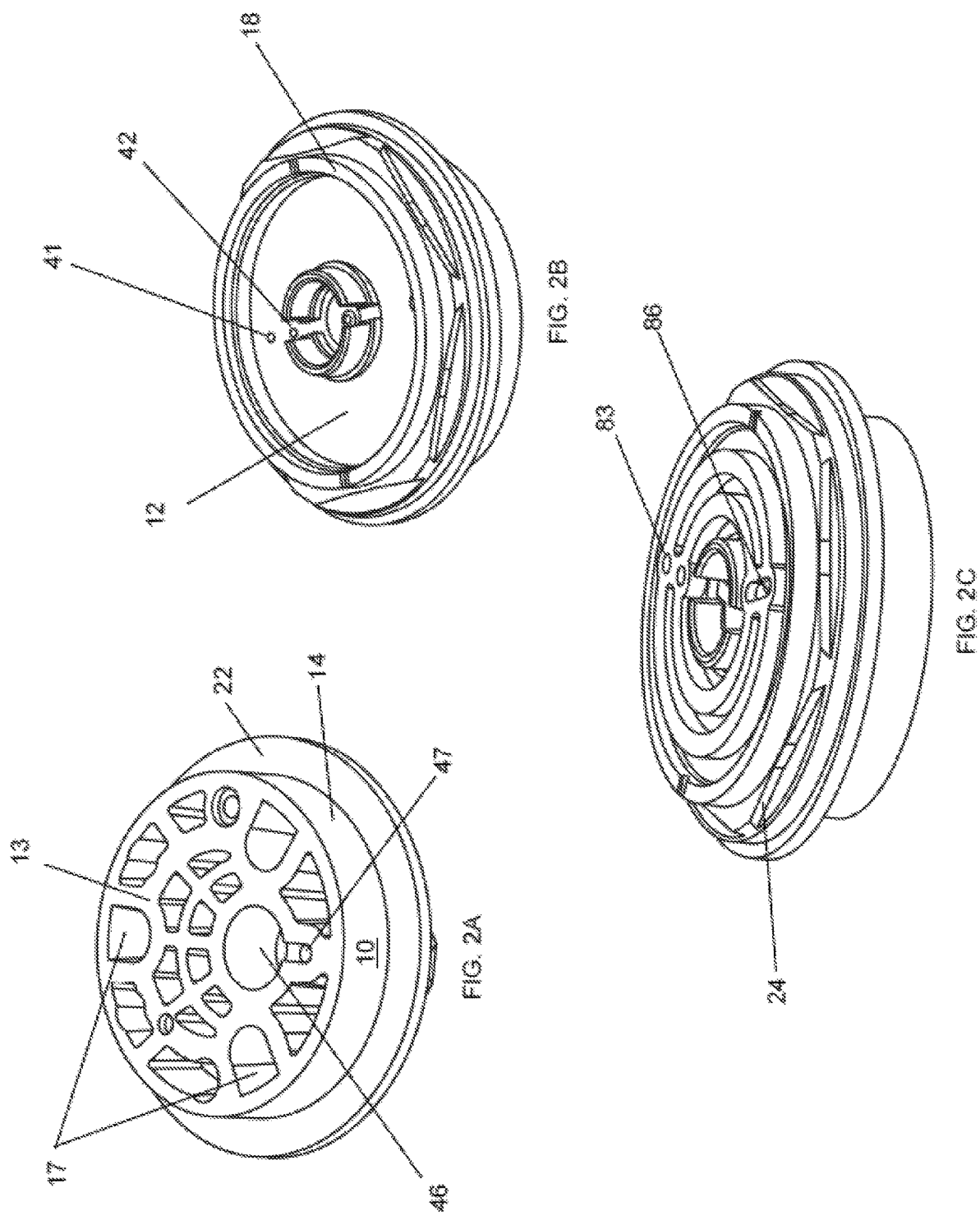

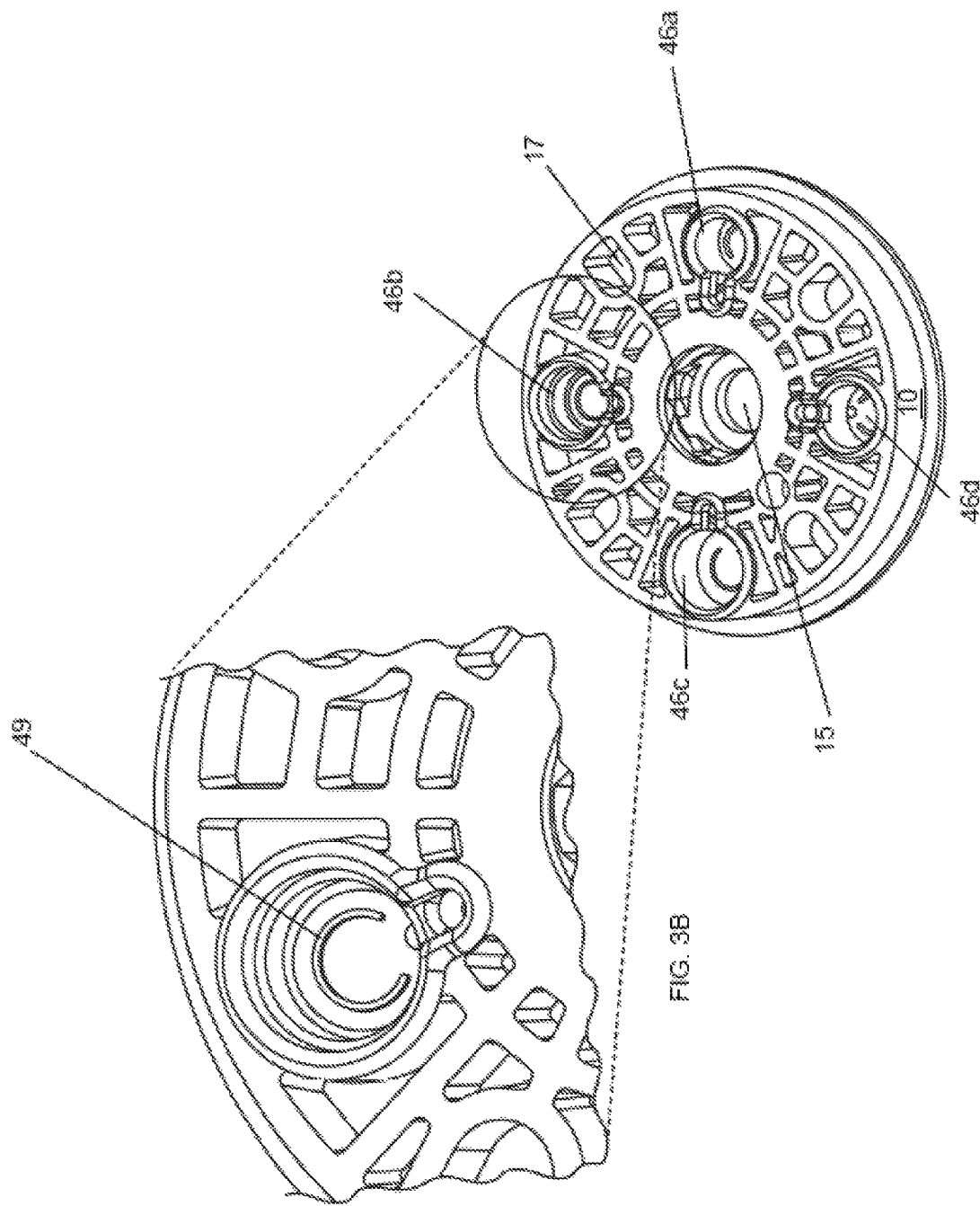

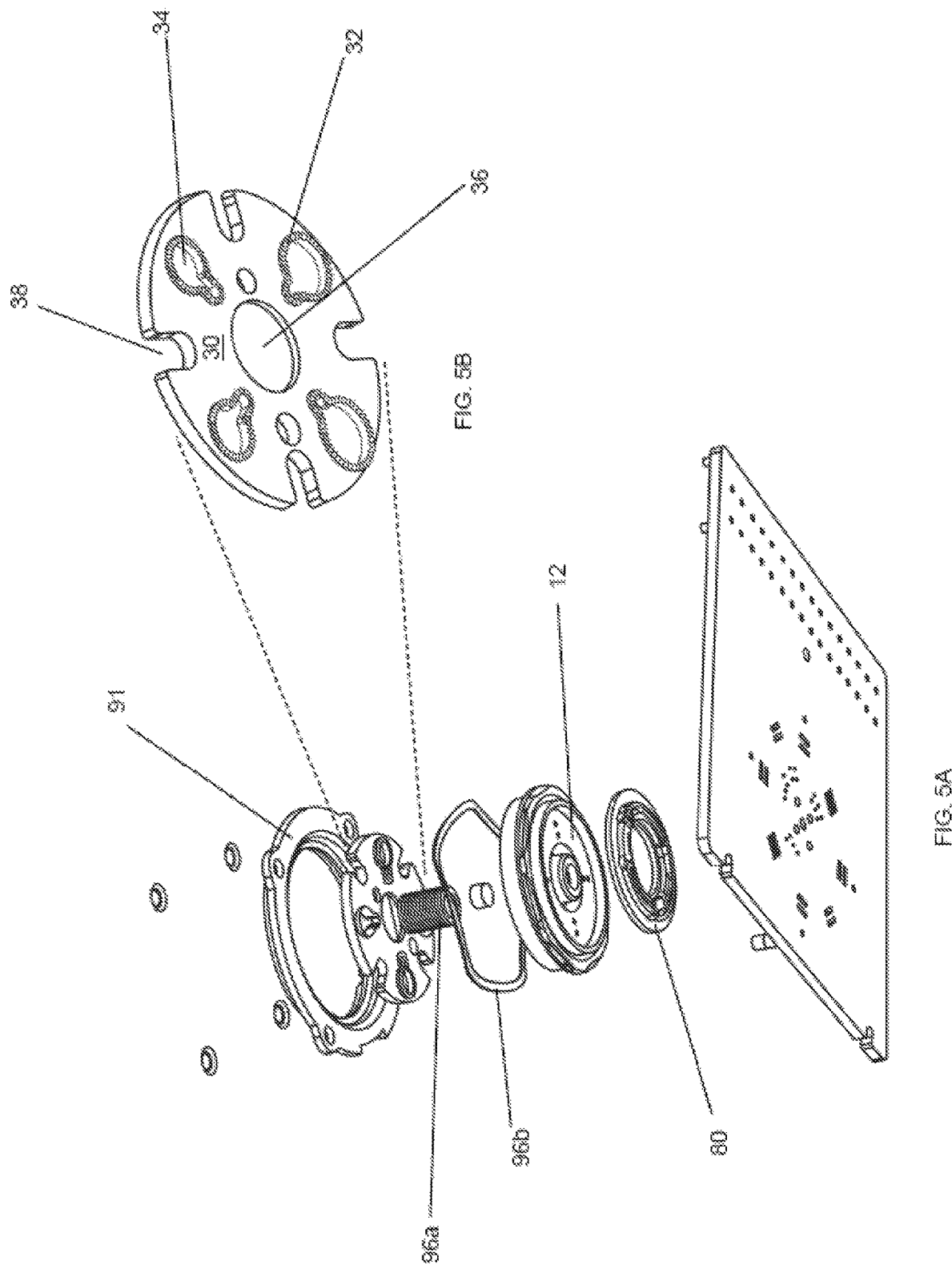

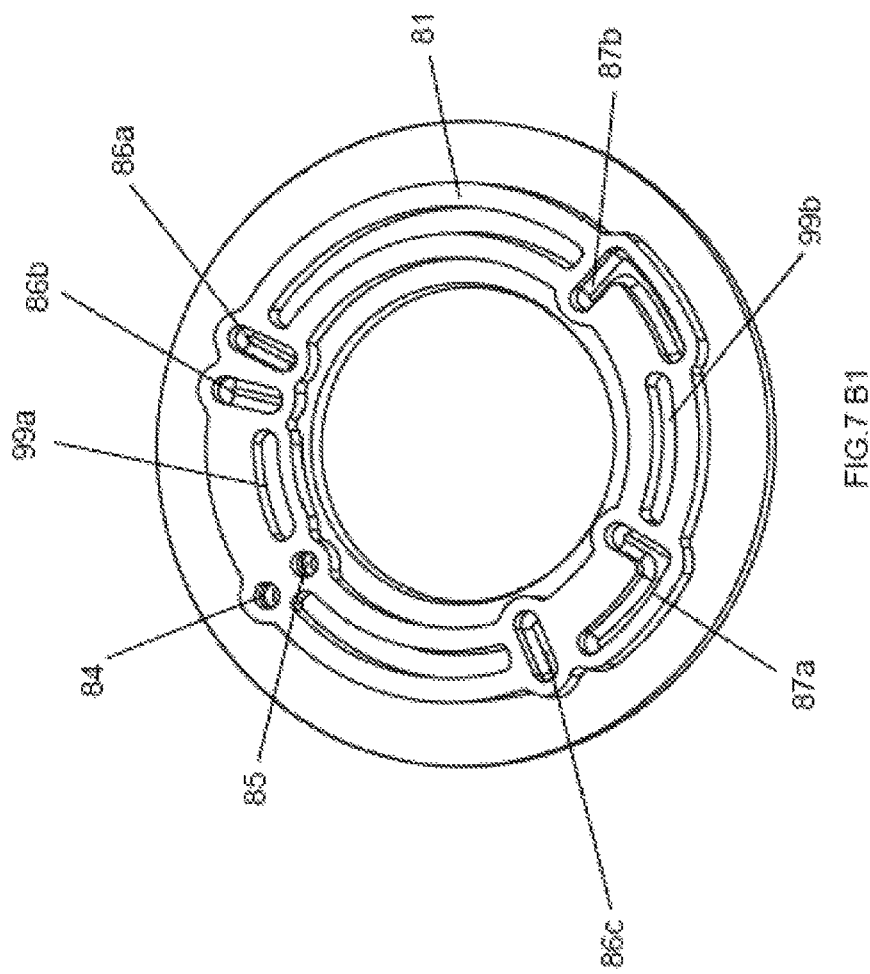
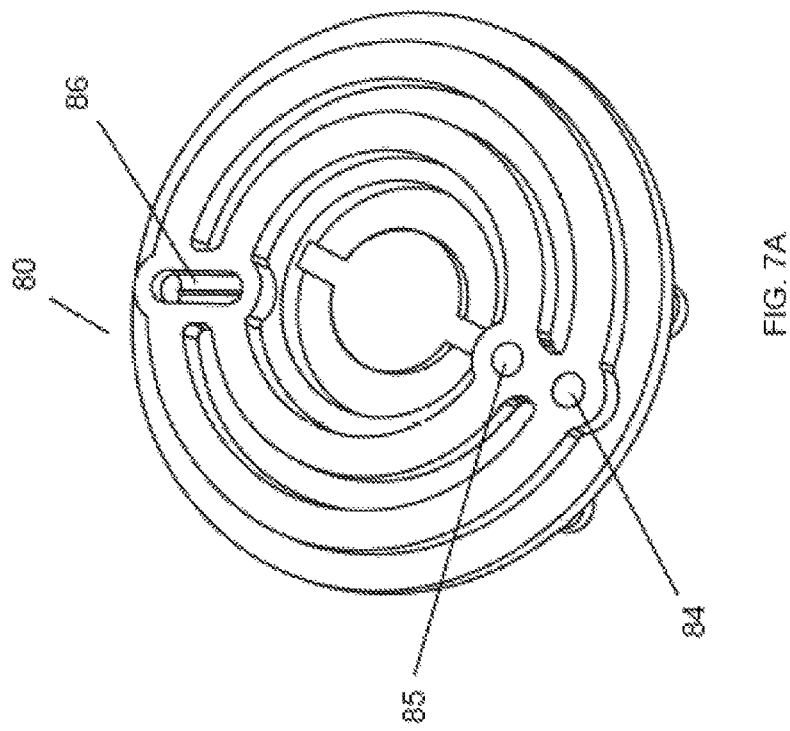

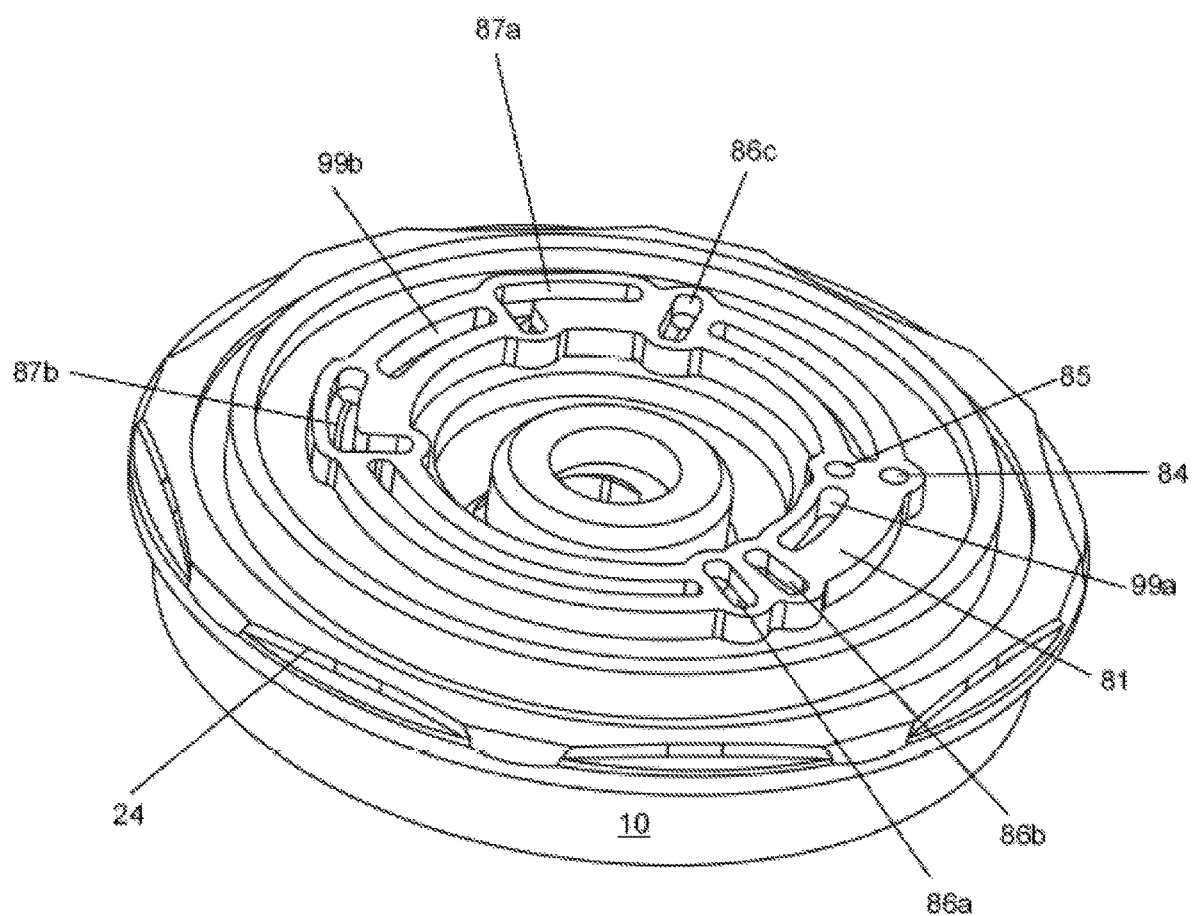
FIG. 7 B2

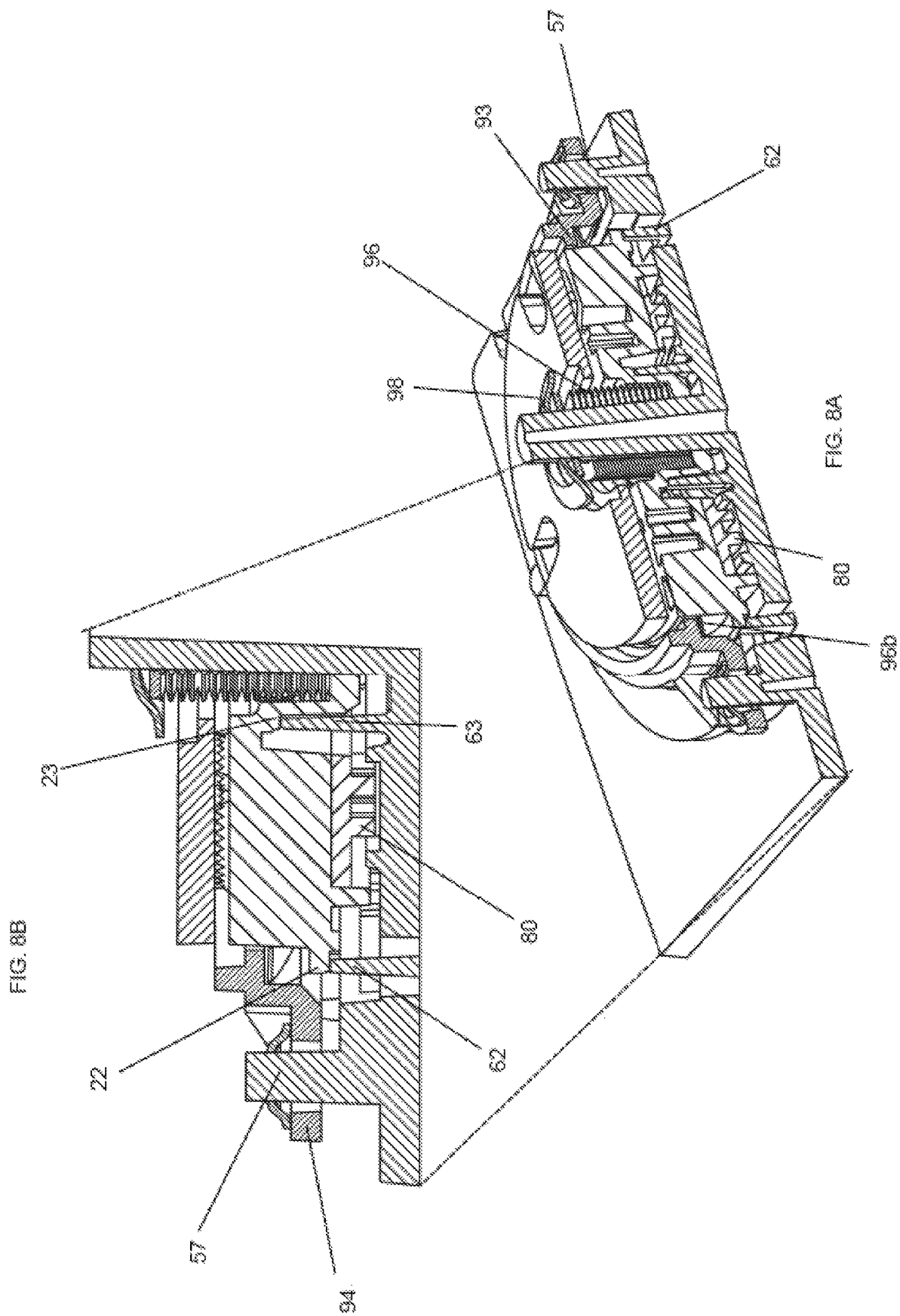

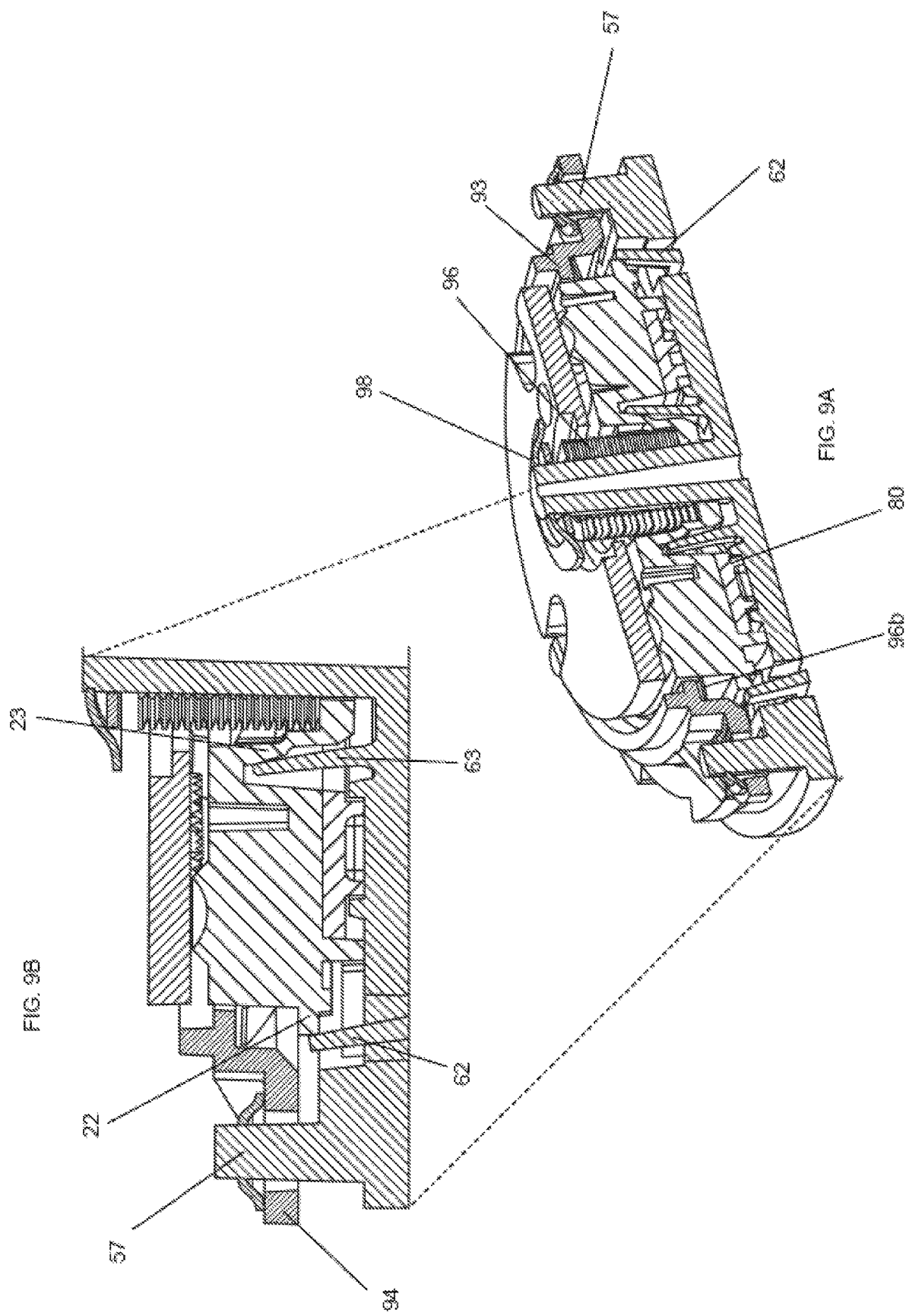

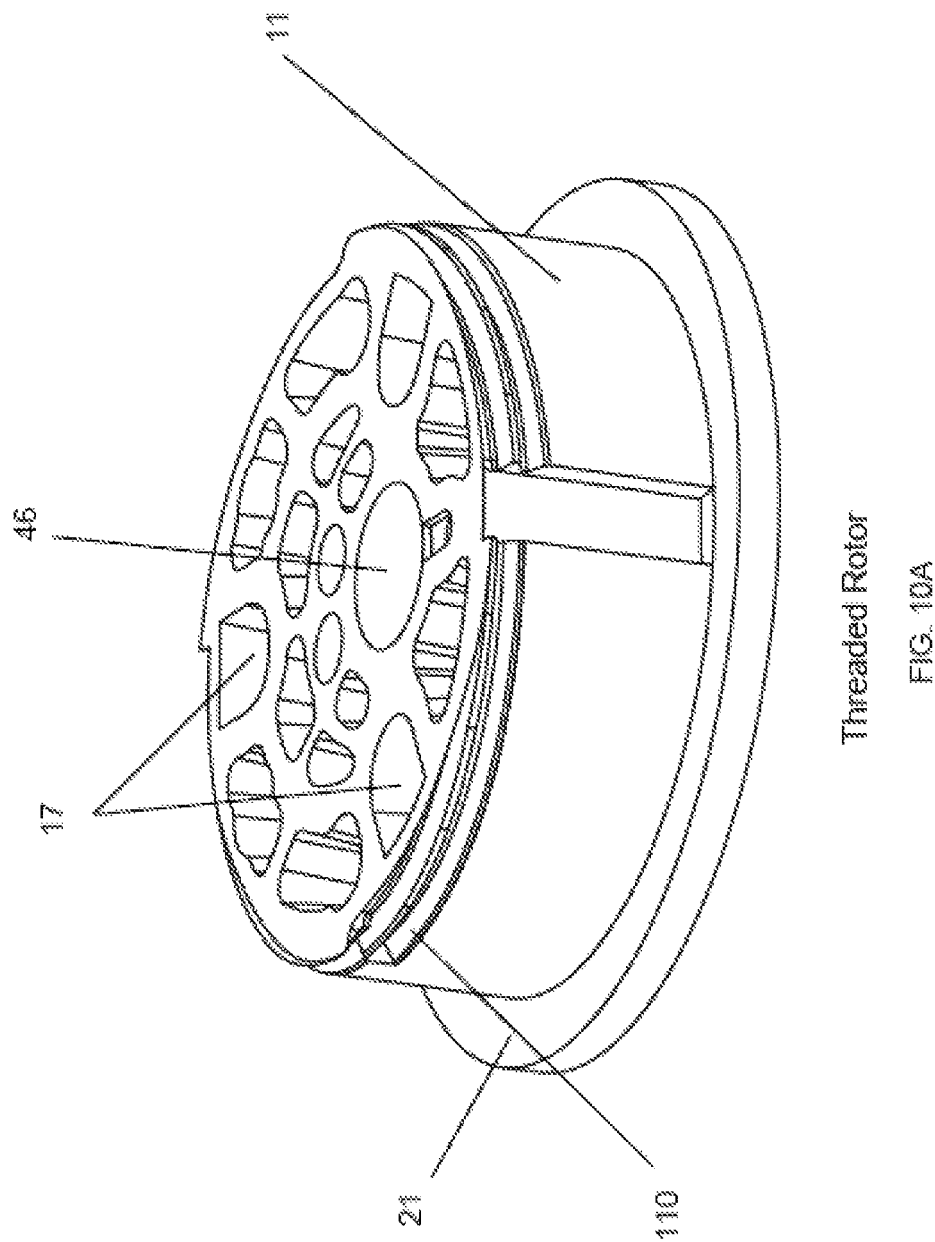

Horizontal View

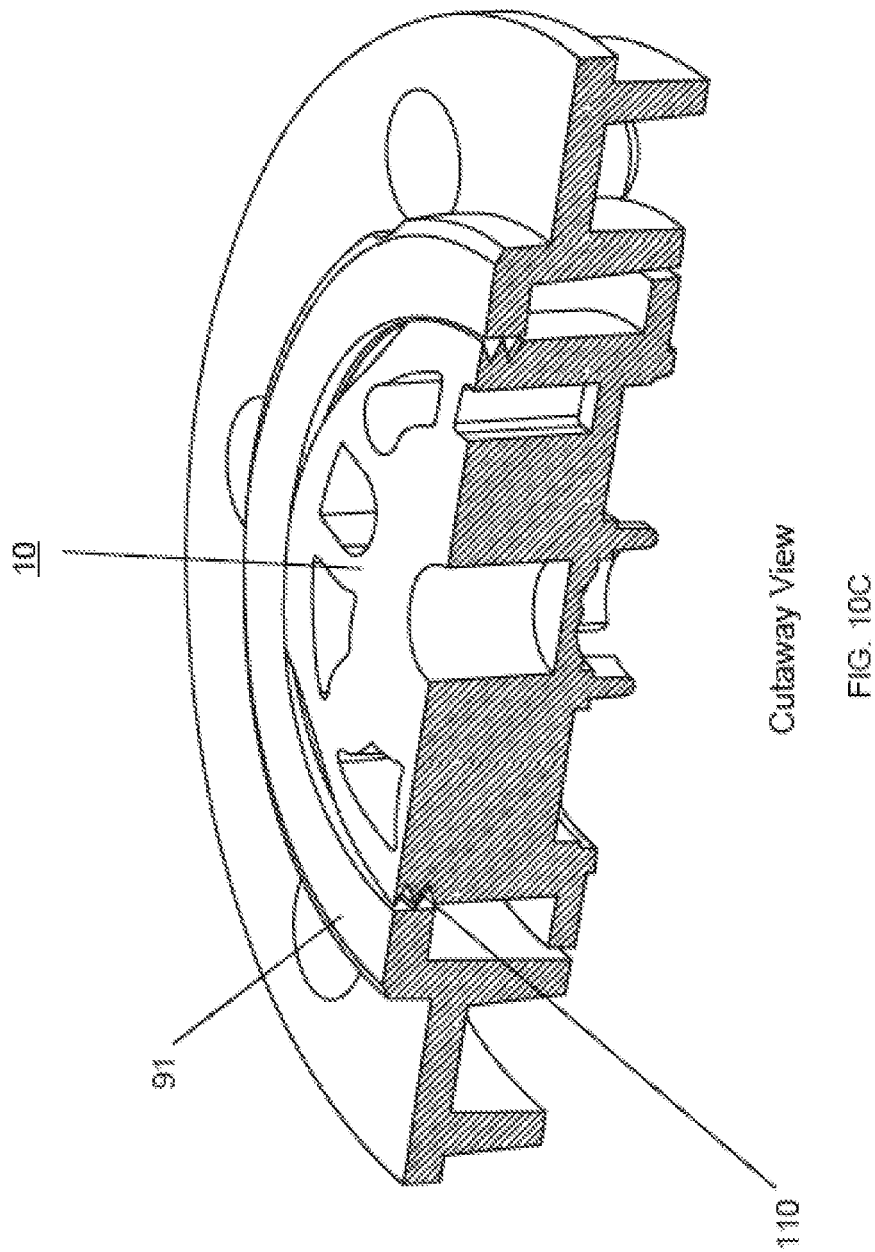

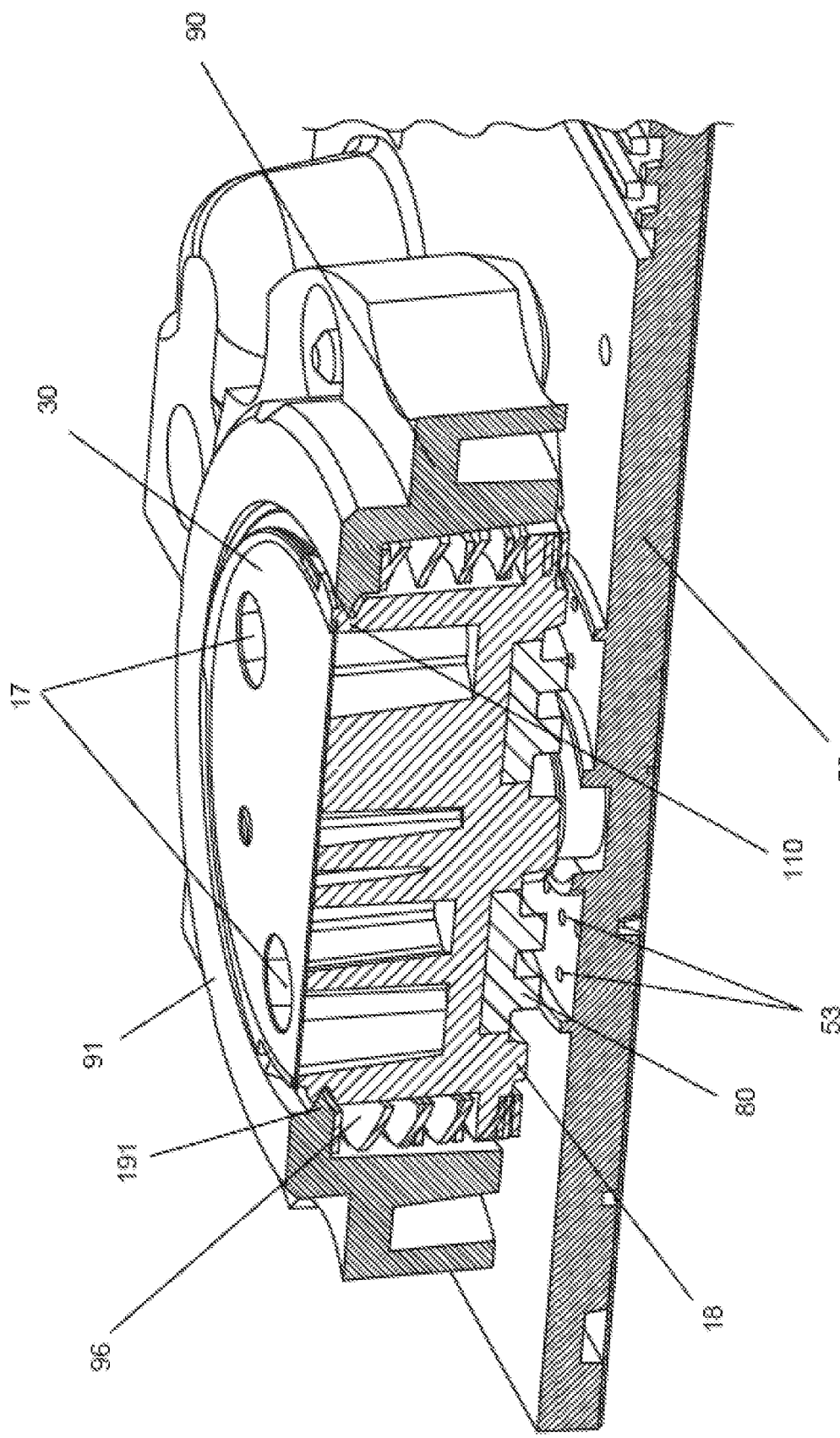

| Step | Position |
|------|----------|
| 0 | Storage |
| 1 | Home |
| 2 | Sample Loading |
| 3 | Lysis / Mixing |
| 4 | Matrix Binding |
| 5 | Matrix Wash |
| 6 | Matrix Drying |
| 7 | Analyte Elution |
| 8 | Reagent Mixing - 1 |
| 9 | Reagent Mixing - 2 |
| 10 | Amplification Well Filling |

FIG.19

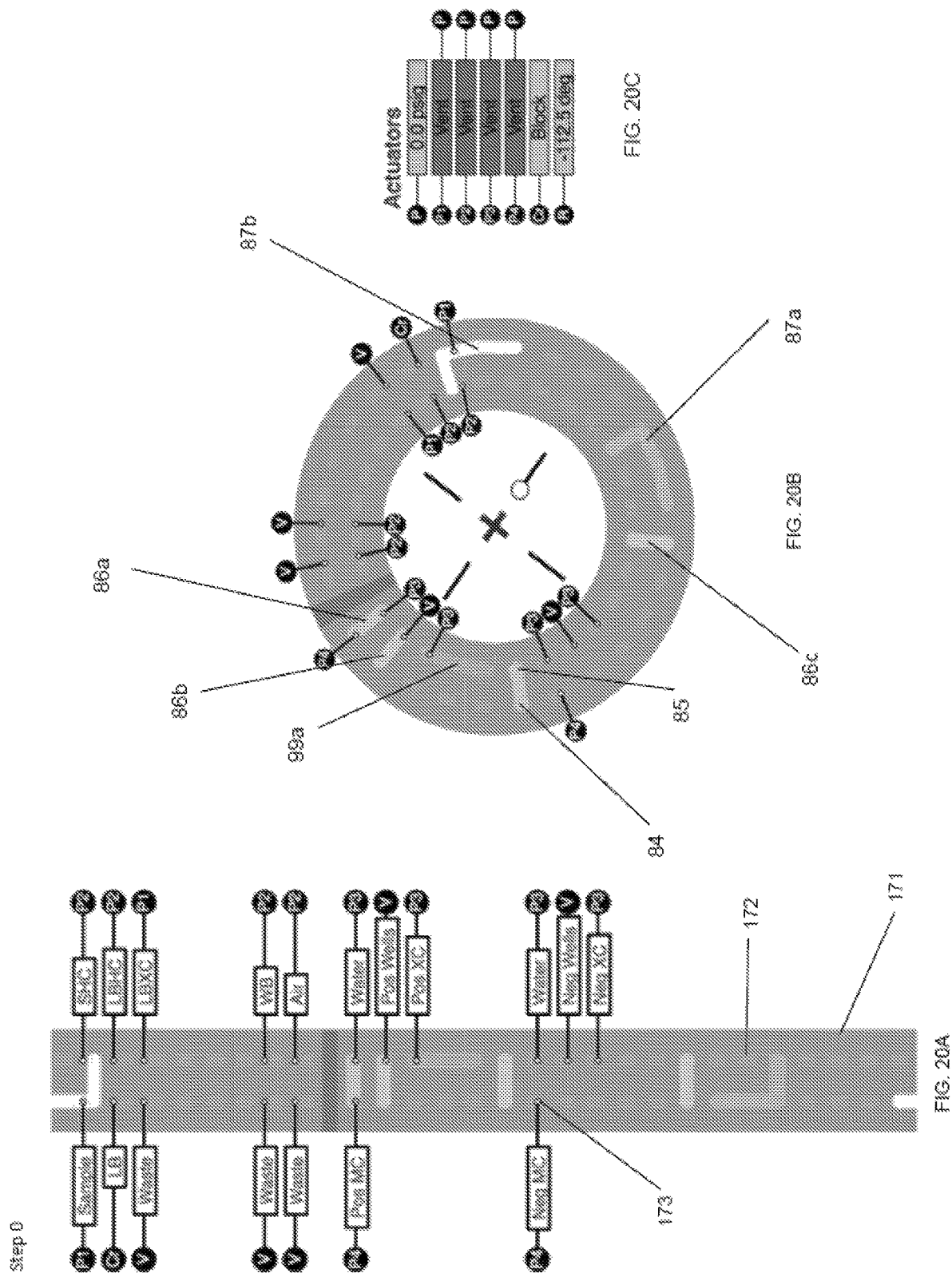

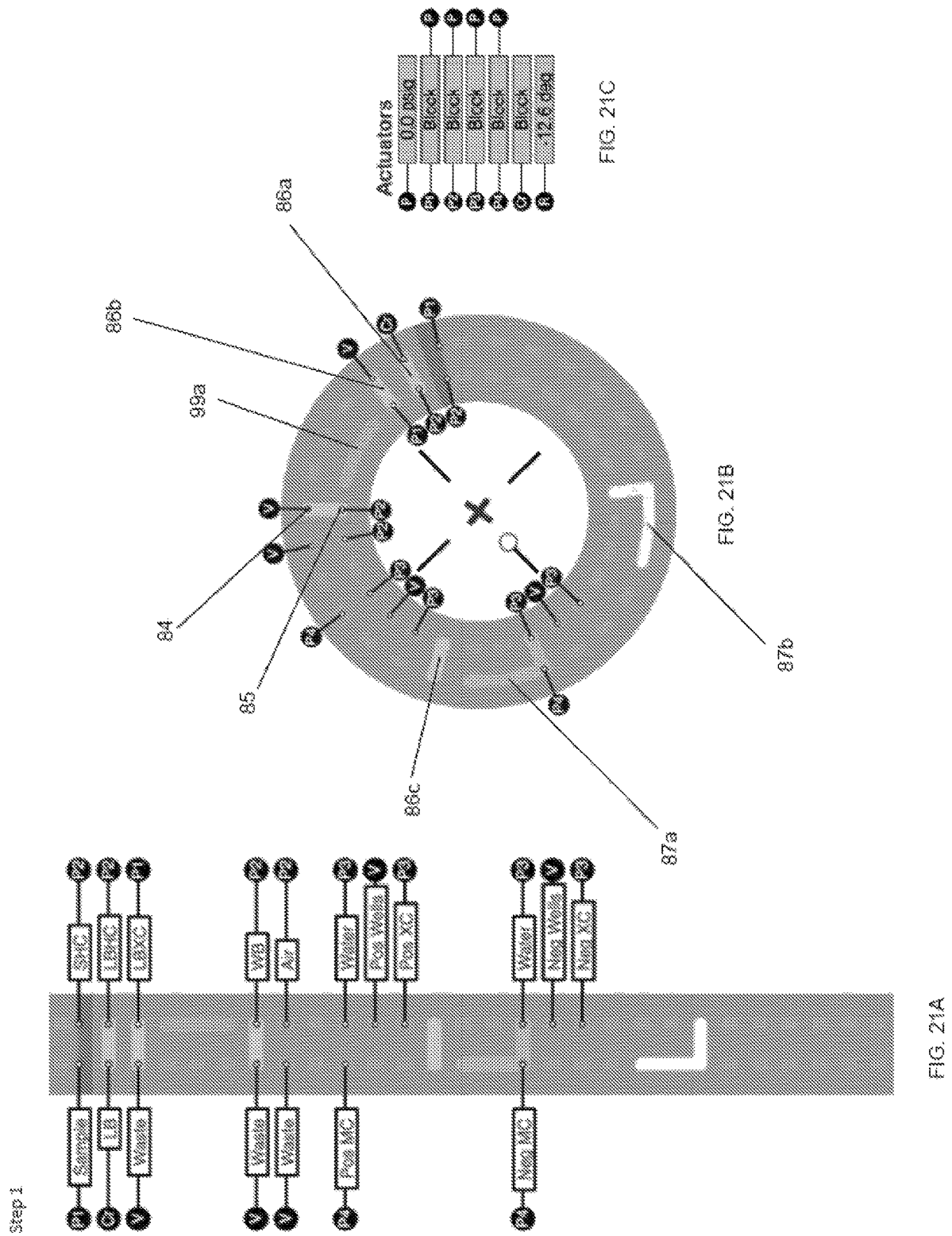

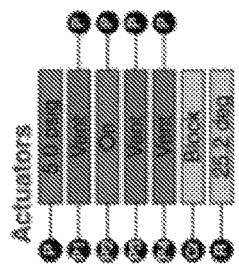
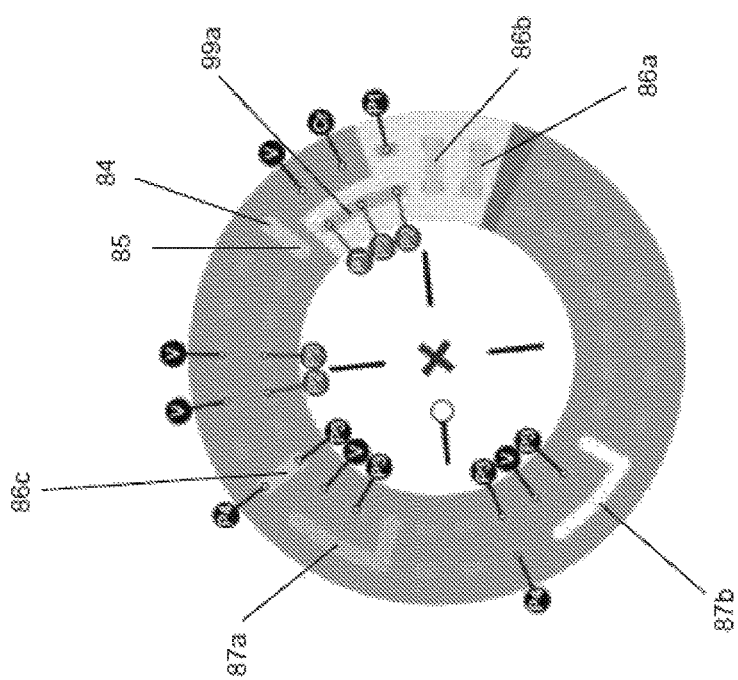
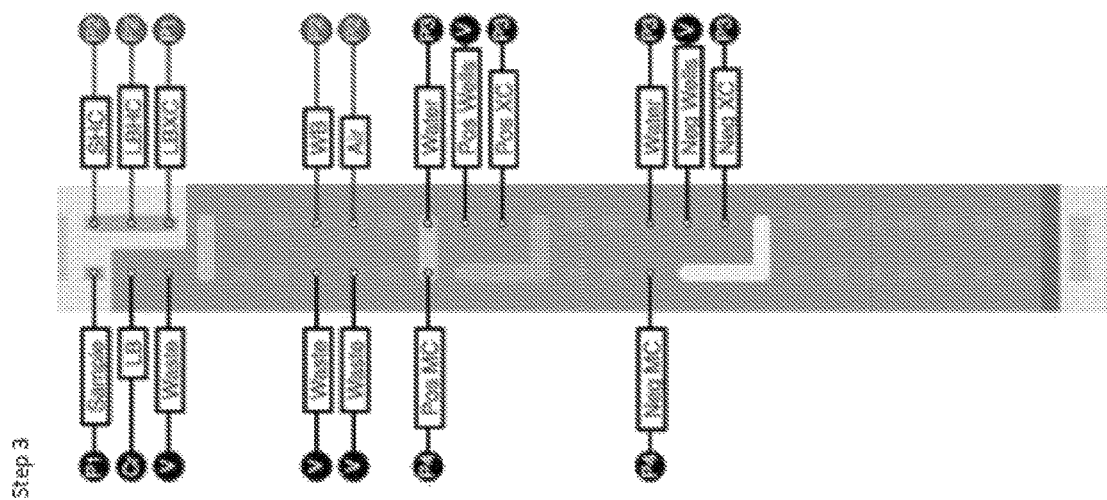
FIG. 23C
FIG. 23B
FIG. 23A

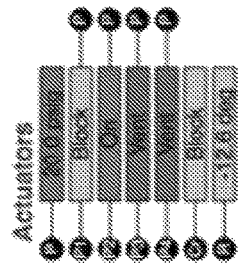
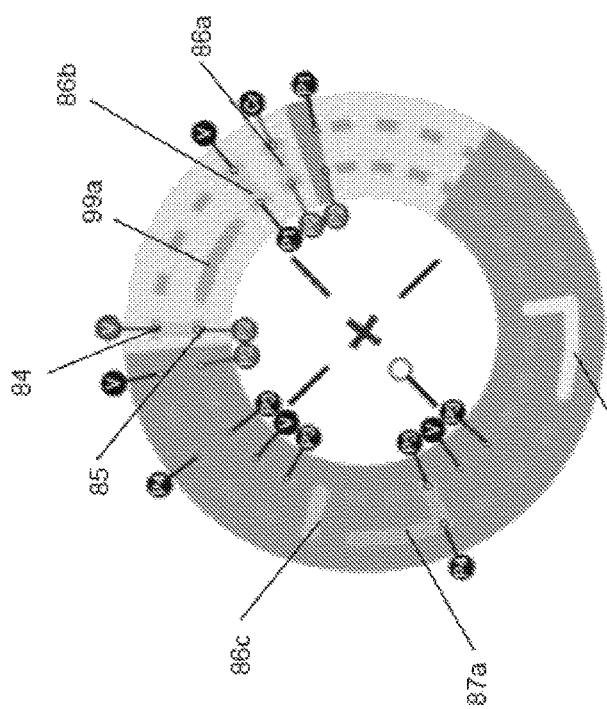
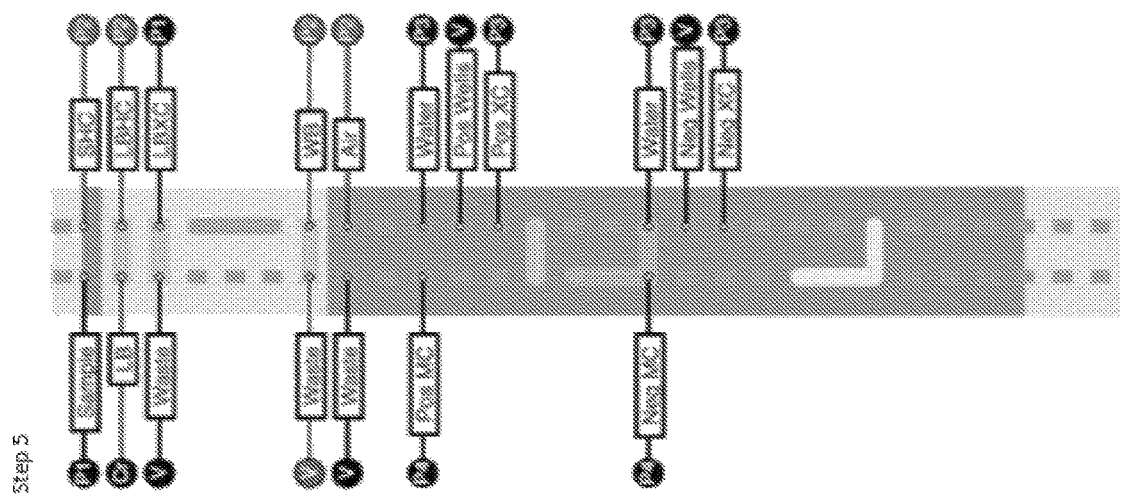
FIG. 25C
FIG. 25B
FIG. 25A

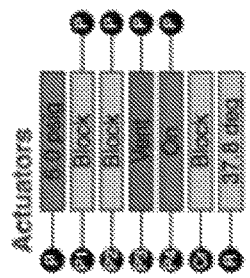
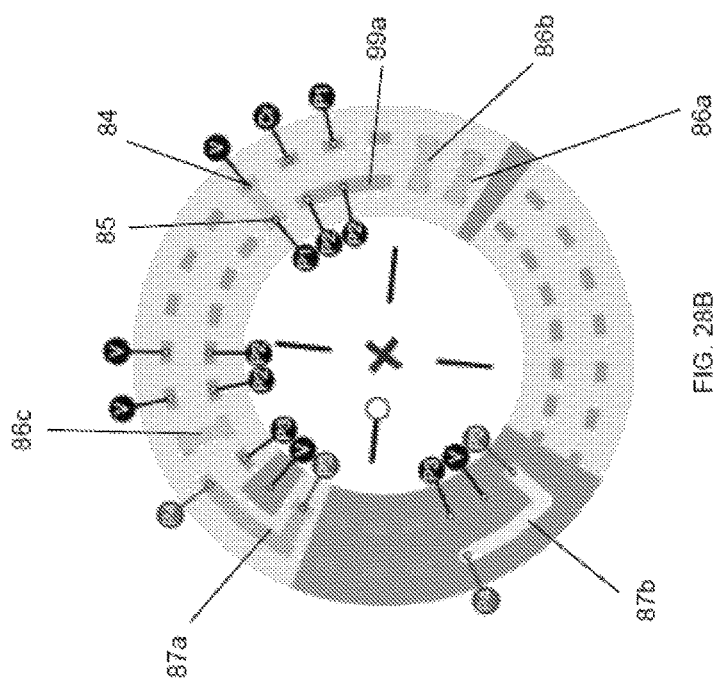
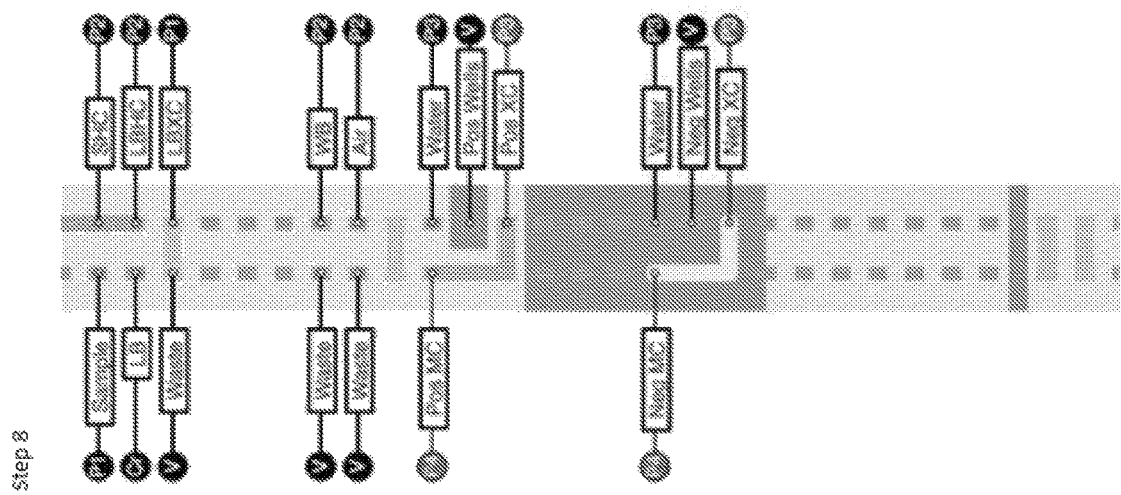
FIG. 28C
FIG. 28B
FIG. 28A

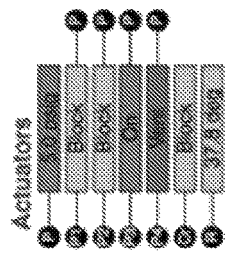
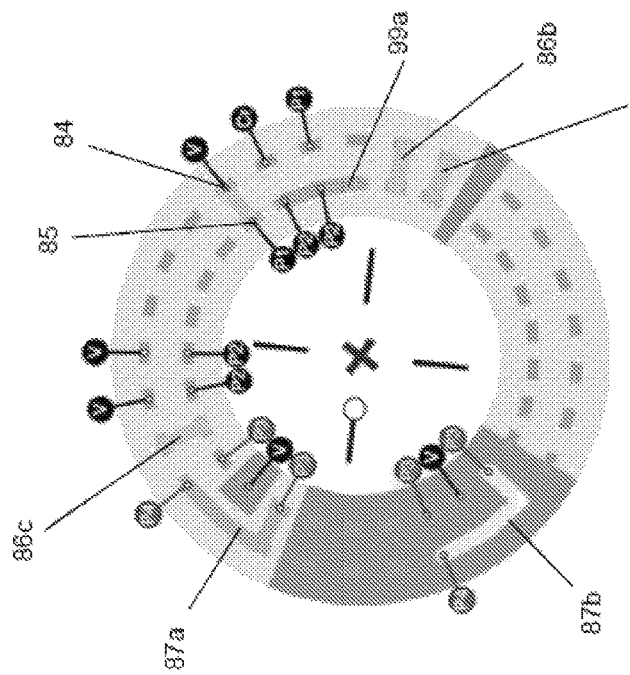
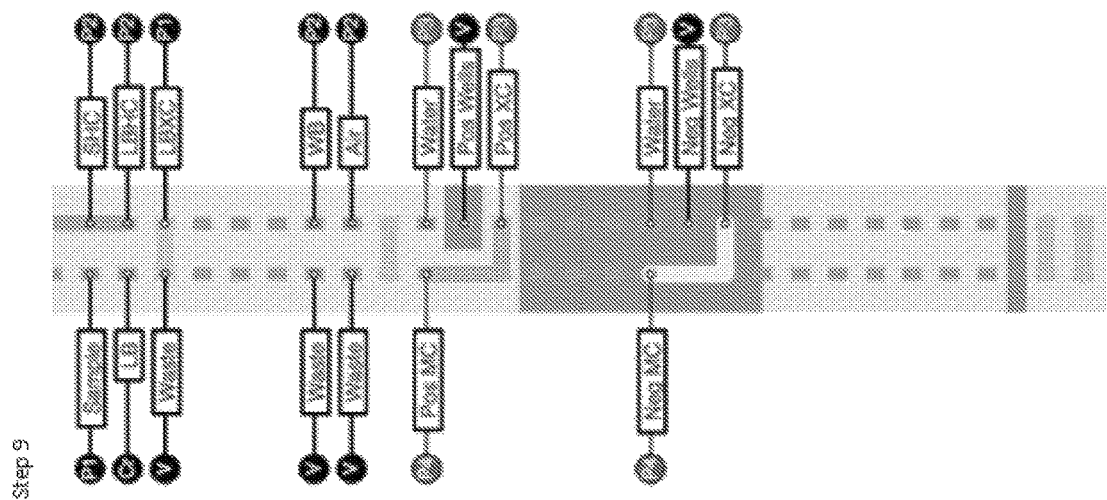
FIG. 29C
FIG. 29B
FIG. 29A

ROTARY VALVE

STATEMENT REGARDING FEDERALLY SPONSORED RESEARCH OR DEVELOPMENT

This invention was made with government support under contract number HR0011-11-2-0006 awarded by the Department of Defense (DARPA). The government has certain rights in the invention.

CROSS REFERENCE TO RELATED APPLICATIONS

This application claims the benefit of U.S. patent application Ser. No. 15/898,064, filed Feb. 15, 2018, titled "ROTARY VALVE," which is herein incorporated by reference in its entirety.

TECHNICAL FIELD

The present invention relates to the field of rotary valves used, for example, to direct fluid flows in microfluidic and diagnostic devices.

BACKGROUND

Lab-on-a-valve or other diagnostic systems that use microfluidic components to carry out real-time analysis of biological samples have great potential for applications in a broad range of scientific research and diagnostic applications. Key to the function of such systems are methods for directing fluids to correct segments of a device, particularly a microfluidic device.

The devices and methods described herein provide effective ways of transporting fluids and/or isolating one or more analyte therefrom. Such devices can be utilized for mixing or metering fluids to perform, for example, chemical or biochemical purification, synthesis and/or analysis. The subject devices can be employed to evaluate a sample to determine whether a particular analyte, such as an organism is present in the sample. Fluidic devices can be employed to provide a positive or negative assay result. Such devices can also be employed, for example, to determine a concentration of the analyte in the sample or other characteristics of the analyte.

Fluidic devices are also specifically applied in biological assays. Devices can be employed in the capture of analytes from solution, such as by filtration. Such capture can include concentrating analytes by passing the analytes in solution over a porous solid support, selective matrix or membrane. The selective element in turn restricts the movement of the analytes away from the selective element without restricting movement of the remaining solution. One practical application of analyte capture is the concentration of nucleic acids by filtration into volumes that are amenable to amplification reactions. In such a circumstance, analytes having even a small initial concentration can be captured from a solution and thereby concentrated. The described single axis actuation valve device reduces the cost and complexity of the instrument compared to common existing valves. Further, the integration of zero, one, or multiple flow channels and/or porous solid supports in the rotor eases the requirements on fluidic layout and simplifies the design of the overall device compared to common existing valves.

Additional, fluidic devices having moving parts may suffer structurally from storage. For example, a flexible material such as a gasket that is compressed for extended periods of time during storage or shipping may become deformed and/or can experience a loss in elasticity. Further extended storage under compression can lead to adhesion of the flexible material to the compressing surface. Such circumstances can negatively affect the operability of a valve, for example, to contain, direct and/or transport fluids therethrough. Adhesion of the gasket can impede movement of the valve requiring significant force to actuate the valve or, in some cases, seize and render the valve inoperable. The subject devices and methods including a storage configuration in which a displaceable spacer holds the rotor away from the stator until the device is activated. As such, a storage configuration avoids problems with compression set and valve degradation from storage under pressure. Accordingly, the subject valve eases the requirements on the gasket elastomer sealing surface and thereby enables a higher pressure rating, and longer operating and storage lifetimes than common existing valves.

SUMMARY

Rotary valves and methods of using, manufacturing, and storing the devices are provided herein. The valve devices can include a rotor connected to a stator and including a rotor valving face and a flow channel containing a porous solid support. Versions of the valve devices include a displaceable spacer for preventing the gasket from sealing against at least one of the rotor and stator, wherein when the spacer is displaced, the gasket seals the rotor and stator together in a fluid-tight manner.

In one aspect, the invention provides a rotary valve 00 comprising (a) a stator 50 comprising a stator face 52 and a plurality of passages 54, each passage comprising a port 53 at the stator face; (b) a rotor 10 operably connected to the stator and comprising a rotational axis 16, a rotor valving face 12, and a flow channel 40 having an inlet 41 and an outlet 42 at the rotor valving face, wherein the flow channel comprises a porous solid support 45; and (c) a retention element 90 biasing the stator and the rotor together at a rotor-stator interface 02 to form a fluid tight seal.

In a preferred implementation, the cross-section of the flow channel 40 is not concentric with the rotational axis 16. In certain implementations, the rotor valving face 12 comprises a gasket 80 interposed at the rotor-stator interface 02. Such a gasket 80 can comprise an aperture 83 therethrough, and the gasket can be laterally constrained by an arcing rail 70 on the stator. Alternately, the stator face 52 can comprise a gasket 80 interposed at the rotor-stator interface 02.

In some implementations, the rotor valving face comprises a fluidic connector 86, wherein in a first rotor position a first port 53a of the stator is fluidically connected to a second port 53b of the stator via the fluidic connector 86. The rotary valve can further comprise a second rotor position, in which a third port 53c is fluidically connected to a fourth port 53d via the fluidic connector 86. The stator can comprise a plurality of proximal ports at a first radial distance from the rotational axis and a plurality of distal ports at a second, greater radial distance.

In some implementations, the rotor valving face comprises a fluidic selector 87 having an arcing portion having center line arcing equidistant from the rotational axis and a radial portion extending from the arcing portion radially toward the rotational axis or away from the rotational axis. In such implementations, in a first rotor position, a first port 53a at a first radial distance from the rotational axis 16 can be fluidically connected to a second port 53b at a second radial distance from the rotational axis via the fluidic selector 87, and in a second rotor position, the first port fluidically connected to a third port 53c at the second radial distance from the rotational axis via the fluidic selector, and wherein the first port remains fluidically connected with the fluidic selector while the rotor is rotated between the first rotor position and the second rotor position.

In some implementation, the rotor comprises a plurality of flow channels 40, each flow channel comprising an inlet 41, an outlet 42, and a porous solid support 45. In certain implementation, the rotor comprises a main body 11 and a cap 30 operably connected to the main body, and wherein one wall of the flow channel 40 is defined by the cap. The rotor comprises an outer face 13 opposite the rotor valving face, wherein the outer face can comprise an opening for engaging a spline.

In some implementations, the rotary valve further comprising a gasket 80 between the stator face 52 and the rotor valving face 12, and wherein the stator comprises a displaceable spacer 60 for preventing the gasket from sealing against at least one of the rotor 10 and stator 50, and wherein, when the spacer is displaced the gasket seals the rotor and stator together in a fluid-tight manner. The retention element 90 can comprises a retention ring 91 and a biasing element 96. In a preferred implementation, the retention ring 91 is fixedly coupled to the stator 50 and the biasing element 96 is a spring biasing the rotor and stator together.

Another aspect of the invention provides a rotor comprising (a) a rotor valving face 12 perpendicular to a rotational axis 16 of the rotor, the rotor valving face configured to contact a planar stator face in a fluid tight manner; and (b) a flow channel 40 configured to contain a porous solid support 45, wherein the flow channel has an inlet 41 and an outlet 42 at the rotor valving face. The flow channel 40 can comprise a porous solid support chamber 46 containing a solid support 45. In certain implementations, the rotor valving face comprises a fluidic connector 86. In some implementations, the rotor valving face comprises a fluidic selector 87 having an arcing portion having center line arcing equidistant from the rotational axis and a radial portion extending from the arcing portion radially toward the rotational axis or away from the rotational axis. The rotor can comprise a plurality of flow channels 40, each flow channel comprising a porous solid support 45. The rotor also can further comprise a gasket 80 operably connected to the rotor valving face 12.

Another aspect of the invention provides rotary valves comprising (a) a rotor 10 comprising a rotor valving face 12, an outer face 13 opposite the rotor valving face, and a rotational axis 16; (b) a stator 50; (c) a gasket 80 interposed between the stator and the rotor valving face; and (d) a displaceable spacer 60 for preventing the gasket from sealing against at least one of the rotor and stator, wherein, when the spacer is displaced the gasket seals the rotor and stator together in a fluid-tight manner. The rotary valve can further comprise a retention element 90 biasing the rotor and stator towards one another. In some implementations, the retention element 90 comprises a retention ring 91 and a biasing element 96. In some implementations, the retention ring 91 is fixedly coupled to the stator and the biasing element 96 is a spring. In certain implementations, the rotor 10 comprises at least one lip 21 and the displaceable spacer 60 comprises a plurality of tabs 61 displaceable from a storage configuration to an operational configuration, wherein each of the tabs 61 contact the at least one lip 21 and thereby prevent the gasket from sealing the rotor and stator in the storage configuration, and disengage with the at least one lip when the tabs are displaced from the storage configuration to the operational configuration. The at least one lip 21 can be an interior lip 23 and the rotor further comprises a displacer slot 28 adjacent to the interior lip, wherein the displacer slot accommodates the interior tabs 63 when displaced to the operational configuration. In some implementations, the rotor 10 comprises a curved outer wall 14 and the at least one lip 21 is a peripheral lip 22 located on the outer wall. In a preferred implementation, the rotor comprises one or more cams 24 which displace the plurality of tabs 60 from the storage configuration to the operational configuration and thereby disengages the plurality of tabs 61 from the at least one lip 21 when the rotor is rotated.

Another aspect of the invention provides microfluidic networks comprising (a) a valve as described herein; and (b) a plurality of microfluidic conduits 55 each fluidically connected to one of the ports 53.

Yet another aspect of the invention provides methods of purifying an analyte, the method comprising (a) providing a rotary valve as described herein; and (b) flowing a sample comprising analyte through the flow channel and retaining at least a portion of the analyte on the porous solid support to produce a bound analyte portion and a depleted sample portion. In some implementations, flowing the sample through the flow channel comprises placing the rotor at a first rotational position, thereby fluidically connecting the first port, the flow channel, and the second port. The sample can be flowed into the flow channel via the first port and the depleted sample portion exits the flow channel via the second port. A preferred implementation of the method comprises rotating the rotor to a second rotational position, thereby fluidically connecting the third port, the flow channel and the further port, and then flowing eluent into the flow channel via the third port and thereby releasing at least a portion of the analyte from the porous solid support to produce an analyte sample, which exits the flow channel via the fourth port.

Another aspect of the invention provides methods of producing a rotary valve, the method comprising (a) forming a stator comprising a stator face from a stator body material; (b) forming within the stator a plurality of passages, each passage comprising a port at the stator face; (c) forming a rotor comprising a rotor valving face from a rotor body material; (d) forming within the rotor a flow channel comprising an inlet and an outlet at the rotor valving face; and (e) inserting a porous solid support into the flow channel.

One aspect of the invention provides methods of storing a rotary valve, the method comprising (a) placing the valve according as described herein into a storage container; and (b) storing the valve for a period of time. In some implementation, storing the valve comprises maintaining the valve in a storage position wherein the gasket is spaced apart from at least one of the rotor and the stator. Preferably, the period of time is 30 days or more, and more preferably the period of time is 90 days or more.

In general, in one embodiment, a rotary valve 00 includes a stator 50, a rotor 10 and a retention element 90. A stator 50 includes a stator face 52 and a plurality of passages 54, each passage including a port 53 at the stator face. A rotor 10 operably connected to the stator and includes a rotational axis 16, a rotor valving face 12, and a flow channel 40 having an inlet 41 and an outlet 42 at the rotor valving face, wherein the flow channel includes a porous solid support 45. A retention element 90 includes biasing the stator and the rotor together at a rotor-stator interface 02 to form a fluid tight seal.

This and other embodiments can include one or more of the following features. A cross-section of the flow channel 40 may not concentric with the rotational axis 16. The porous solid support can be polymeric. The porous solid support can be selected from the group consisting of alumina, silica, celite, ceramics, metal oxides, porous glass, controlled pore glass, carbohydrate polymers, polysaccharides, agarose, Sepharose™, Sephadex™, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers, and any combination thereof. The rotor valving face 12 can include a gasket 80 interposed at the rotor-stator interface 02. The gasket 80 can include an aperture 83 therethrough and wherein the stator can include an arcing rail 70 for laterally constraining the gasket. The rotor valving face can include a fluidic connector 86, wherein in a first rotor position a first port 53a of the stator can be fluidically connected to a second port 53b of the stator via the fluidic connector 86. The first port can be located at a first radial distance from the rotational axis and the second port is located at a second, different, radial distance. In a second rotor position a third port 53c can be fluidically connected to a fourth port 53d via the fluidic connector 86. The rotor valving face can include a fluidic selector 87 having an arcing portion having center line arcing equidistant from the rotational axis and a radial portion extending from the arcing portion radially toward the rotational axis or away from the rotational axis. In a first rotor position, a first port 53a at a first radial distance from the rotational axis 16 can be fluidically connected to a second port 53b at a second radial distance from the rotational axis via the fluidic selector 87, and in a second rotor position, the first port can be fluidically connected to a third port 53c at the second radial distance from the rotational axis via the fluidic selector, and wherein the first port can remain fluidically connected with the fluidic selector while the rotor is rotated between the first rotor position and the second rotor position. The rotor can include a plurality of flow channels 40, each flow channel including an inlet 41, an outlet 42, and a porous solid support 45. The rotor can include a main body 11 and a cap 30 operably connected to the main body, and wherein one wall of the flow channel 40 can be defined by the cap. The rotary valve can further include a gasket 80 between the stator face 52 and the rotor valving face 12, and wherein the stator can include a displaceable spacer 60 for preventing the gasket from sealing against at least one of the rotor 10 and stator 50, and wherein, when the spacer is displaced the gasket seals the rotor and stator together in a fluid-tight manner. The retention element 90 can include a retention ring 91 and a biasing element 96. The retention ring 91 can be fixedly coupled to the stator 50 and the biasing element 96 is a spring biasing the rotor and stator together.

In general, in one embodiment, a rotary valve includes a rotor 10 including a rotor valving face 12, an outer face 13 opposite the rotor valving face, and a rotational axis 16, a stator 50, a gasket 80 interposed between the stator and the rotor valving face, and a displaceable spacer 60 for preventing the gasket from sealing against at least one of the rotor and stator, wherein, when the spacer is displaced the gasket seals the rotor and stator together in a fluid-tight manner.

This and other embodiments can include one or more of the following features. The valve can further includes a retention element 90 biasing the rotor and stator towards one another. The retention element 90 can include a retention ring 91 and a biasing element 96. The retention ring 91 can be fixedly coupled to the stator and the biasing element 96 is a spring. The rotor 10 can include at least one lip 21 and the displaceable spacer 60 including a plurality of tabs 61 displaceable from a storage configuration to an operational configuration, wherein each of the tabs 61 can contact the at least one lip 21 and thereby prevent the gasket from sealing the rotor and stator in the storage configuration, and disengage with the at least one lip when the tabs are displaced from the storage configuration to the operational configuration. The at least one lip 21 can be an interior lip 23 and the rotor can further include a displacer slot 28 adjacent to the interior lip, wherein the displacer slot accommodates the tabs 63 when displaced to the operational configuration. The rotor 10 can include a curved outer wall 14 and the at least one lip 21 is a peripheral lip 22 located on the outer wall. The rotor can include one or more cams 24 which displace the plurality of tabs 60 from the storage configuration to the operational configuration and thereby disengages the plurality of tabs 61 from the at least one lip 21 when the rotor is rotated. The gasket 80 can include an aperture 83 therethrough and wherein the stator can include an arcing rail 70 for laterally constraining the gasket. The rotor can further include a flow channel 40 having an inlet 41 and an outlet 42 at the rotor valving face, wherein the flow channel can include a porous solid support 45. The outer face 13 can include an opening for engaging a spline.

In general, in one embodiment, a method of storing a rotary valve includes: (1) placing the valve into a storage container; and (2) storing the valve for a period of time.

This and other embodiments can include one or more of the following features. Storing the valve can include maintaining the valve in a storage positon wherein the gasket can be spaced apart from at least one of the rotor and the stator.

In general, in one embodiment, a rotary valve includes a rotor 10, a stator 50, a gasket 80 and a retention element 90. A rotor 10 has an axis of rotation 16, an outer face 13 and a rotor valving face 12 opposite the outer face 13 and a pair of apertures 41, 42 through the rotor valving face 12. A stator 50 has a stator face 52 having a plurality of stator ports 53 in the stator face, each one of the plurality of stator ports 53 in communication with a fluid passage 54. A gasket 80 interposed between the stator face 52 and the rotor valving face 12, the gasket 80 having an inner gasket sealing face 81i and an outer gasket sealing face 81o and a pair of gasket openings 83 in alignment with the pair of apertures 42, 43. A retention element 90 biasing the rotor and the stator towards one another placing the inner gasket sealing face 81i and an outer gasket sealing face 81o in a fluid tight arrangement with the plurality of stator ports 53 in the stator face 52.

This and other embodiments can include one or more of the following features. The plurality of stator ports 53 can be arranged into a plurality of stator ports at a first radial spacing from the axis of rotation 16 and a plurality of stator ports at a second radial spacing from the axis of rotation 16 wherein fluid communication between one of the plurality of stator ports at the first radial spacing and one of the plurality of stator ports at the second radial spacing is provided by a fluid connector 86 extending between the inner gasket sealing face 81i and the outer gasket sealing face 81o. The plurality of stator ports 53 can be arranged into a plurality of stator ports positioned circumferentially about the axis of rotation at a first radial spacing from the axis of rotation 16 and a plurality of stator ports positioned circumferentially about the axis of rotation 16 at a second radial spacing from the axis of rotation 16 wherein fluid communication between one of the plurality of stator ports at the first radial spacing and one or more of the plurality of stator ports at the second radial spacing is provided by a fluid selector 87 extending between the inner gasket sealing face 81*i* and the outer gasket sealing face 81*o* and along a portion of the outer gasket sealing face 81*o*. The plurality of stator ports 53 can be arranged into a plurality of stator ports positioned circumferentially about the axis of rotation at a first radial spacing from the axis of rotation 16 and the gasket 80 further comprising a fluid selector 87 extending between the inner gasket sealing face 81*i* and the outer gasket sealing face 81*o* and along a portion of the outer gasket sealing face 81*o* wherein fluid communication between one of the plurality of stator ports at the first radial spacing and one or more of a plurality of stator ports at a second different radial spacing from the axis of rotation and different circumferential position from the one of the plurality of stator ports at the first radial spacing is provided by the fluid selector 87. The rotary valve, the gasket 80 can further include a fluid selector 87 extending between the inner gasket sealing face 81*i* and the outer gasket sealing face 81*o* and along a portion of the outer gasket sealing face 81*o*. The rotary valve, the gasket 80 can further include a fluid connector 86 extending between the inner gasket sealing face 81*i* and the outer gasket sealing face 81*o*. The rotary valve, the gasket 80 can further include a fluid selector 87 and a fluid connector 86 wherein in use each stator port 53 is in communication with one of: the fluid selector 87, the fluid connector 87, the inner gasket sealing face 81*i*, the outer gasket sealing face 81*o*, or a gasket opening 83. The rotary valve, the gasket 80 can further include a fluid connector 86 wherein in use each stator port 53 is in communication with one of: the fluid connector 87, the inner gasket sealing face 81*i*, the outer gasket sealing face 81*o*, or a gasket opening 83. The pair of apertures 41, 42 through the rotor valving face 12 can be an inlet and an outlet, respectively, of fluid channel 40 containing a porous solid support 45. The pair of apertures 41, 42 through the rotor valving face 12 can be a first pair of apertures in communication with a first fluid channel 40 having a first solid support chamber 46 and a second set of apertures 41, 42 through the rotor valving face 12 are in communication with a second fluid channel 40 having a second solid support chamber 46, wherein the first and the second solid support chambers 46 contain a porous solid support 45. The porous solid support 45 can be polymeric. The porous solid support 45 can be selected from the group consisting of alumina, silica, celite, ceramics, metal oxides, porous glass, controlled pore glass, carbohydrate polymers, polysaccharides, agarose, Sepharose, Sephadex, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers, and any combination thereof.

In general, a rotary valve includes a rotor 10, a stator 50 and a gasket 80. A rotor 10 includes an outer face 13 and a rotor valving face 12 opposite the outer face 13 and a pair of apertures 41, 42 through the rotor valving face 12. A stator 50 has a stator face 52 having a plurality of stator ports 53 in the stator face, each one of the plurality of stator ports 53 in communication with a fluid passage 54. A gasket 80 is interposed between the stator face 52 and the rotor valving face 12 wherein a pair of openings 83 in the gasket align with the pair of apertures 41, 42, wherein the gasket is spaced apart from the stator face 52 while in a storage condition and is maintained in fluid tight relation to the stator face by a retention element 90 when released from the storage condition.

This and other embodiments can include one or more of the following features. The rotary valve 42 can further include a retention ring about the rotor and coupled to the stator, the retention ring can have a pair of arcuate shapes along a surface adjacent to the rotor and the rotor having a pair of complementary accurate shapes corresponding to the pair of accurate shapes in the retention ring wherein engagement of the pair of arcuate shapes with the pair of complementary arcuate shapes maintains the rotary valve in the storage condition. The rotary valve can be released from the storage condition by relative movement between the rotor and the retention ring sufficient to disengage the pair of arcuate shapes along the surface adjacent to the rotor from the pair of complementary accurate shapes on the rotor. The rotary valve can further include a retention ring about the rotor and coupled to the stator. The retention ring can have a plurality of grooves about a portion of the retention ring adjacent to the rotor and the rotor having a plurality of complementary shapes in mating correspondence to the plurality of grooves in the retention ring wherein engagement of the plurality of grooves with the plurality of complementary shapes of the rotor maintains the rotary valve in the storage condition. The rotary valve can be released from the storage condition by relative movement between the rotor and the retention ring sufficient to disengage the plurality of grooves about a portion of the retention ring from the plurality of complementary shapes in mating correspondence on the rotor. The rotary valve can further include a spacer disposed along a gasket sealing face wherein the spacer maintains a gap between the gasket sealing face and the stator face and the rotary valve in the storage condition. The rotary valve can be released from the storage condition by relative movement between the rotor and the stator sufficient to displace the spacer to permit engagement between the gasket sealing face and the stator face. The rotary valve can further include a clip engaged with the rotary valve to maintain a gap between the gasket sealing face and the stator face and the rotary valve in the storage condition. The rotary valve can be released from the storage condition when the clip is removed allowing the retention element to move the gasket into a fluid tight relation to the stator face.

In general, in one embodiment, a rotary valve includes a rotor 10 having a rotational axis 16, a rotor valving face 12, an outer face 13 opposite the rotor valving face, a stator 50 having a stator valving face positioned opposite the rotor valving face, and a retention element 90 biasing the rotor and stator towards one another including a retention ring 91 and a biasing element 96, wherein the rotary valve is maintained in a storage condition while a threaded portion of the retention ring is engaged with a threaded portion of the rotor.

This and other embodiments can include one or more of the following features. Relative motion between the rotor and the stator can produce a fluid tight arrangement between the rotor valving surface and the stator valving surface. The relative motion between the rotor and the stator can be rotation of the rotor so as to move the rotor along the threaded portion of the retention ring. The rotation of the rotor to disengage the rotary valve from the storage condition can be less than one revolution, is half a revolution, is a quarter of a revolution or one-eighth of a revolution. The rotary valve can further include a gasket disposed between the rotor valving face and the stator valving face wherein while the rotary valve is in the storage condition the gasket does not form a fluid tight seal with the stator valving surface. Relative motion between the rotor and the stator can produce a fluid tight arrangement between the gasket, the rotor valving face and the stator valving surface. The relative motion between the rotor and the stator can be rotation of the rotor so as to move the rotor along the threaded portion of the retention ring. The rotation of the rotor to transition the rotary valve from the storage condition can be less than one revolution, is half a revolution, is a quarter of a revolution or one-eighth of a revolution. When the rotor is transitioned out of the storage condition and a sealed relationship between the rotor and the stator is formed, the threaded portion of the rotor can be free of any other threaded portion of the rotary valve.

In general, a rotary valve 00 includes a stator 50 including a stator face 52 and a plurality of passages 54, each passage comprising a port 53 at the stator face, a rotor 10 operably connected to the stator and comprising a rotational axis 16, a rotor valving face 12, and a flow channel 40 having an inlet 41, and an outlet 42 at the rotor valving face, a solid support chamber in communication with the inlet 41 and the outlet 42, a porous solid support 45 within the solid support chamber 45; and a retention element 90 biasing the stator and the rotor together at a rotor-stator interface 02 to form a fluid tight seal.

This and other embodiments can include one or more of the following features. The rotary valve, the solid support chamber can have a bottom and a sidewall and at least one flow channel spacer along the bottom. The at least one flow channel spacer can be raised above the bottom of the chamber. The at least one flow channel spacer can be recessed into the bottom of the chamber. The at least one flow channel spacer can be spaced apart from the outlet 42 and the chamber sidewall. The at least one flow channel spacer can be directly adjacent to the outlet 42. The at least one flow channel spacer can have an accurate shape corresponding to the curvature of the chamber sidewall. The at least one flow channel spacer can extend from the outlet 42 towards the sidewall. The chamber bottom can be flat. The chamber bottom can be sloped from the chamber sidewall towards the outlet 42. The porous solid support can be polymeric. The porous solid support can be selected from the group consisting of alumina, silica, celite, ceramics, metal oxides, porous glass, controlled pore glass, carbohydrate polymers, polysaccharides, agarose, sepharose, sephadex, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers, and any combination thereof. The rotary valve can be configured to remain in an initial stowed condition without a fluid tight seal between the rotor and the stator prior to the retention element biasing the rotor and the stator into a fluid tight sealing arrangement. A rotary valve can have a rotor cover 30 covering each support chamber 46 in the rotor 10. A rotary valve can include a rotor cover 30 covering the entire rotor outer face 13 with uncovered portions corresponding to one or more openings 17. A rotary valve can include a rotor cover 30 with a bottom surface 34 positioned to seal each solid support chamber 46 sufficient to complete a portion of the fluid channel 40.

In general, in one embodiment, a method of fluid processing using a rotary valve includes rotating the rotary valve about an axis of rotation 16 to align a gasket inlet 84 and a gasket outlet 85 of a gasket 80 with an inlet 41 and an outlet 42 respectively of a fluid channel 40 having a porous solid support 45 within a rotor 10 and aligning the gasket inlet 84 and the gasket outlet 85 with a first pair of stator ports 53 in a stator valving face 52, and sealing a second pair of stator ports 53 in the stator valving face 52 with a portion of the gasket 80.

This and other embodiments can include one or more of the following features. The method of fluid processing can further include rotating the rotary valve about the axis of rotation 16 to align the first pair of stator ports 53 in the stator valving face 52 with a fluid channel 86 formed in the gasket 80 or to align the second pair of stator ports 53 in the stator valving face 52 with the fluid channel 86 formed in the gasket 80. The method of fluid processing can further include rotating the rotary valve about the axis of rotation 16 to align at least one stator port of the first pair of stator ports 53 in the stator valving face 52 to at least one stator port 53 of the second pair of stator ports with a fluid channel 87 formed in the gasket 80. The method of fluid processing can further include rotating the rotary valve about the axis of rotation 16 to align at least one stator port of the first pair of stator ports 53 in the stator valving face 52 to at least one stator port 53 of a third pair of stator ports with a fluid channel 87 formed in the gasket 80. The method of fluid processing can further include rotating the rotary valve about the axis of rotation 16 for flowing a fluid through the first pair of stator ports 53 or the second pair of stator ports 53 before flowing the fluid through the fluid channel 40. The method of fluid processing can further include rotating the rotary valve about the axis of rotation 16 for flowing a fluid through the fluid channel 86 formed in the gasket 80 or through the fluid channel 87 formed in the gasket 80 before flowing the fluid through the fluid channel 40. The method of fluid processing can further include rotating the rotary valve about the axis of rotation 16 flowing a fluid through the first pair of stator ports 53 or the second pair of stator ports 53 after flowing the fluid through the fluid channel 40. The method of fluid processing can further include rotating the rotary valve about the axis of rotation 16 for flowing a fluid through the fluid channel 86 formed in the gasket 80 or through the fluid channel 87 formed in the gasket 80 after flowing the fluid through the fluid channel 40. The method of fluid processing can further include flowing a fluid through a first fluid passage 54 or a second fluid passage 54 after flowing the fluid through the fluid channel 40. The method of fluid processing can further include flowing a fluid through a first fluid passage 54 or a second fluid passage 54 before flowing the fluid through the fluid channel 40. The method of fluid processing can further include positioning the rotary valve for flowing a fluid through the fluid channel 86 formed in the gasket 80 to a fluid passage 54 or through the fluid channel 87 formed in the gasket 80 to a fluid passage 54 after positioning the rotary valve to flow a fluid through the fluid channel 40. The method of fluid processing can further include positioning the rotary valve for flowing a fluid through the fluid channel 86 formed in the gasket 80 or through the fluid channel 87 formed in the gasket 80 to a fluid passage 54, and storing a portion of the fluid in a storage chamber in communication with the fluid passage 54. The method of fluid processing can further include positioning the rotary valve for flowing a fluid through the fluid channel 86 formed in the gasket 80 or through the fluid channel 87 formed in the gasket 80 to a fluid passage 54, and mixing a portion of the fluid with a lysis buffer. The method of fluid processing can further include positioning the rotary valve for flowing the fluid from the mixing step through a fluid channel 86 formed in the gasket 80 or through the fluid channel 87 formed in the gasket 80 to the fluid channel 40. The method of fluid processing can further include positioning the rotary valve for flowing the fluid from the mixing step through the porous solid support 45. The method of fluid processing can further include positioning the rotary valve for flowing a fluid through the fluid channel 86 formed in the gasket 80 or through the fluid channel 87 formed in the gasket 80 to a waste chamber. The method of fluid processing can further include positioning the rotary valve to align a pneumatic source to the fluid channel 86 formed in the gasket 80 or to the fluid channel 87 formed in the gasket 80. The method of fluid processing can further include positioning the rotary valve to align a pneumatic source to the fluid channel 40. The method of fluid processing can further include positioning the rotary valve to flow water through the fluid channel 40. The method of fluid processing can further include positioning the rotary valve for flowing water through the fluid channel 86 formed in the gasket 80 or through the fluid channel 87 formed in the gasket 80. The method of fluid processing can further include positioning the rotary valve for flowing a positive sample to a positive metering channel and for flowing a negative sample to a negative meeting channel. The method of fluid processing can further include accessing a first fluid passage 54 via the first pair of stator ports 53 in the stator valving face 52 or accessing a second fluid passage 54 via the second pair of stator ports 53. The method of fluid processing can further include accessing a third fluid passage via the third pair of stator ports 53 in the stator valving face 52. The method of fluid processing can further include positioning the gasket inlet 84 and the gasket outlet 85 against a portion of the stator valving face 52 without stator ports 53. The method of fluid processing can further include moving the rotary valve from a stored condition to a ready to use condition before rotating step. The method of fluid processing can further include the step of moving the rotary valve from a stored condition to a ready to use condition further comprising:

Moving the gasket 80 to be in contact with the stator valving face 52. The method of fluid processing can further include the step of moving the rotary valve from a stored condition to a ready to use condition and can further include deflecting a displaceable spacer 60 that maintains a gap between the rotor and the stator, and moving the gasket 80 into a fluid tight relationship with the stator valving face 52. The method of fluid processing can further include the step of moving the rotary valve from a stored condition to a ready to use condition and can further include rotating the rotor in relation of a threaded retention ring, and moving the gasket 80 to be in contact with the stator valving face 52. The method of fluid processing can further include the step of moving the rotary valve from a stored condition to a ready to use condition and can further include moving the rotor to displace a sacrificial edge 180 of gasket 80, and moving the gasket 80 to be in contact with the stator valving face 52.

DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead placed upon illustrating the principles of various embodiments of the invention.

FIGS. 1A, 1B1 and 1B2 provides several views of one rotary valve according to the invention described herein. FIG. 1A provides a partial cut-away view of a rotary valve. FIGS. 1B1 and 1B2 provide an exploded perspective views of the same valve from a top down perspective (FIG. 1B1) and a bottom up perspective (FIG. 1B2).

FIGS. 2A, 2B, and 2C provide several perspective views of a rotor. FIG. 2A provides a perspective view of a rotor main body from the outer face side. FIG. 2B provides a view of the same rotor main body from valving face side. FIG. 2C provides a perspective view of the rotor main body with an attached gasket from the valving face side.

FIG. 3A provides a perspective drawing of a rotor comprising a plurality of flow channels. FIG. 3B provides a magnified view of a single solid support chamber within one of the flow channels.

FIG. 5A provides bottom up perspective of an exploded illustration of an embodiment of a valve having a rotor with a central column. FIG. 5B is a magnified view of the rotor cap for the rotor of FIG. 5A.

FIGS. 7A, 7B1 provide perspective views of embodiments of a gasket slidably engaging a stator.

FIG. 7B2 is a perspective view of the gasket of FIG. 7B1 attached to a rotor.

FIGS. 8A and 8B provide a perspective view and section view, respectively, of a valve as in FIG. 5D in a storage position.

FIGS. 9A and 9B provides a perspective view and a section view, respectively, of the valve in FIGS. 8A and 8B transitioned to an operational position.

FIG. 10A is a perspective view of a threaded rotor for a rotary valve.

FIG. 10C is a cross section view of a rotary valve having the threaded rotor in FIG. 10A within a threaded retention ring in a storage condition.

FIGS. 11A and 11B are perspective section and cross section views of a rotary valve with a threaded rotor in a storage condition.

FIG. 19 is a table depicting a series of sample processing steps that can be used to prepare a biological sample for analysis with a biological assay using a rotary valve described herein.

FIGS. 20A-30C depict rotary valve positions and operations for a rotary valve operated to perform exemplary steps as described in the table of FIG. 19.

DETAILED DESCRIPTION

Figure 1A:
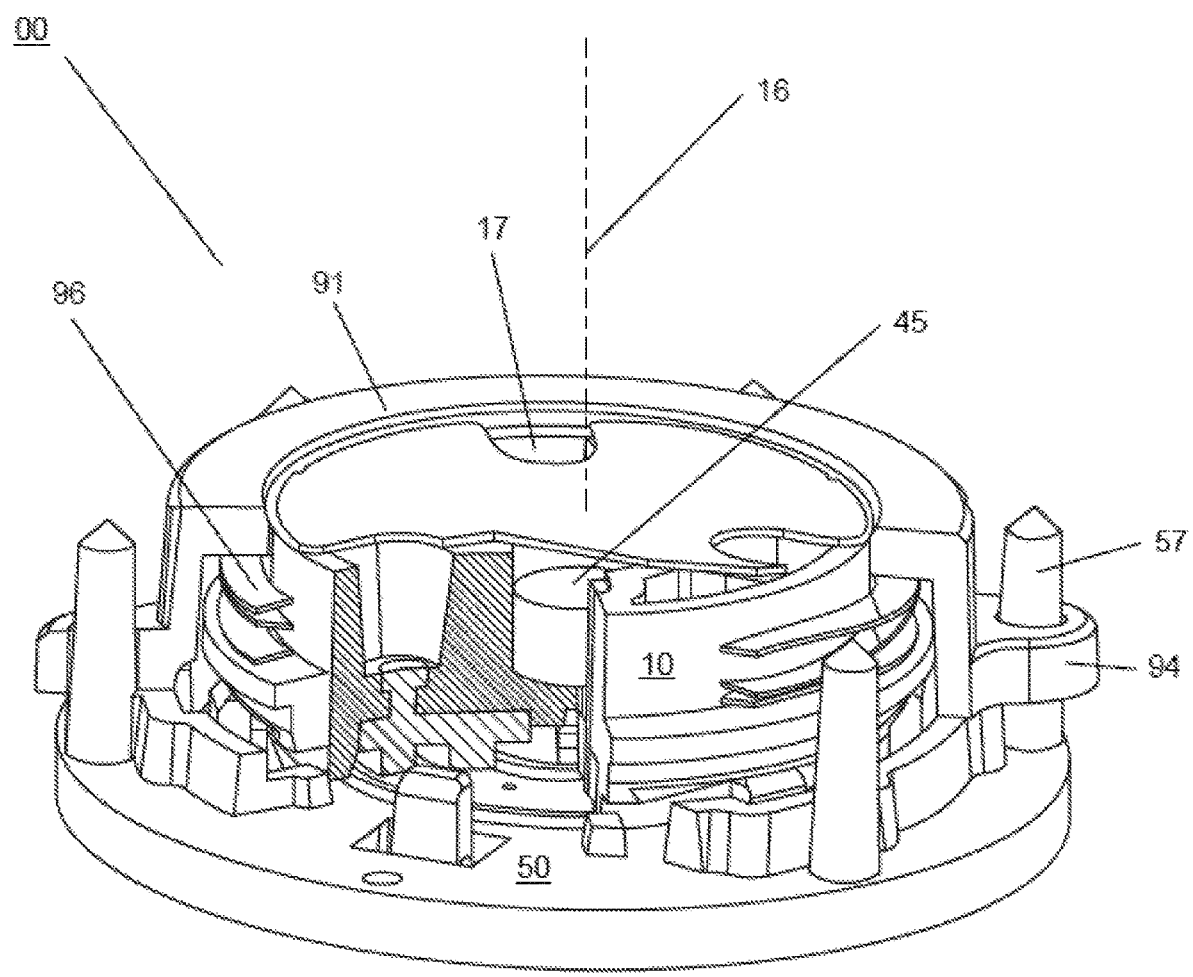

The details of various embodiments of the invention are set forth in the description below. Other features, objects, and advantages of the invention will be apparent from the description and the drawings, and from the claims.

Rotary valves and methods of using, manufacturing, and storing the same are provided herein. The rotary valve includes a rotor and a stator, biased toward one another to form a fluid tight seal. In some implementations, the rotor comprises an integrated flow channel containing a porous solid support. Frequently, the fluid-tight interface between rotor and stator is strengthened by a gasket. Some implementations of the rotary valve include a displaceable spacer to prevent the gasket from sealing against at least one of the rotor and stator prior to operation, wherein when the spacer is displaced, the gasket seals the rotor and stator together in a fluid-tight manner.

Before the present invention is described in greater detail, it is to be understood that this invention is not limited to particular embodiments described and, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Certain measurements or ranges may be presented herein with numerical values preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number can be a number which, in the context in which it is presented, provides the substantial equivalent of the specifically recited number.

Disclosed is a flexible, robust, valve for micro-fluidic or meso-fluidic applications. This valve is designed so that it's "fluidic programming" can easily be changed. This valve also includes the ability to have filtration of solid phase extraction elements built into the valve's rotor; this eases the design and layout requirements associated with fluidic circuit design. Further, the valve includes an optional shipping position which avoids the problems with compression set of the polymers in the valve surface.

Rotary Valve

Rotary valves, useful for moving, measuring, processing, concentrating and/or mixing one or more fluids or components thereof are provided herein. The rotary valves include at least one rotatable valve component, a rotor, which can be rotated with respect a fixed component, a stator. The term stator indicates the frame of reference for assessing movement within the rotor system. While the stator remains static and the rotor moves in the valve frame of reference, the stator may move relative to a larger piece of equipment or relative to the world as a whole.

In one aspect, the invention provides rotary valves comprising an integrated flow channel that can hold a porous solid support for filtering, binding and/or purifying analytes within a fluid stream. In one implementation, the rotary valve comprises a stator 50 comprising a stator face 52 and a plurality of passages 54, each passage comprising a port 53 at the stator face; a rotor 10 operably connected to the stator and comprising a rotational axis 16, a rotor valving face 12, and a flow channel 40 having an inlet 41 and an outlet 42 at the rotor valving face, wherein the flow channel comprises a porous solid support 45; and a retention element 90 biasing the stator and the rotor together at a rotor-stator interface to form a fluid tight seal.

Within a functioning rotary valve, the rotor is operably coupled to the stator through the action of a biasing element. By "operably connected," and "operably coupled," as used herein, is meant connected in a specific way that allows the disclosed devices to operate and/or methods to be carried out effectively in the manner described herein. For example, operably coupling can include removably coupling or fixedly coupling two or more aspects. As such, aspects that are operably connected can be fixedly connected to one another and/or slidably connected to one another such that they can slide along at least one surface of one another when the device is operated. Aspects that are operably connected can also be rotatably coupled so that one aspect, e.g., a rotor, rotates with respect to another aspect, e.g., a stator. Operable coupling can also include fluidically and/or electrically and/or mateably and/or adhesively coupling two or more components. Also, by "removably coupled," as used herein, is meant coupled, e.g., physically and/or fluidically and/or electrically coupled, in a manner wherein the two or more coupled components can be un-coupled and then re-coupled repeatedly.

The term "fluidic communication," as used herein, refers to any duct, channel, tube, pipe, or pathway through which a substance, such as a liquid, gas, or solid may pass substantially unrestricted when the pathway is open. When the pathway is closed, the substance is substantially restricted from passing through.

FIGS. 1A and 1B illustrate a rotary valve of the present invention, comprising a rotor 10, a stator 50 and a biasing element 96 to maintain the rotor and stator in fluid tight contact. The rotor and stator each comprises structures for handling and redirecting fluid streams. FIG. 1A provides a partial cutaway view in which a flow channel is partially exposed, revealing a solid support chamber 46 and the porous solid support 45 contained therein. FIGS. 1B1 and 1B2 illustrates the rotary valve in an exploded view, in which a flow channel 40 is exposed on the outer face (to be enclosed by rotor cap 30), and an inlet 41 and outlet 42 are visible at the valving face. The rotary valve of FIGS. 1B1 and 1B2 includes a gasket 80 at the rotor valving face to enhance the seal between rotor and stator. FIGS. 5A-5D provide additional details of another rotary valve embodiment having four flow channels. Additionally, the rotary valve embodiment illustrates the use of an inner biasing element 96a and an outer biasing element 96b.

Rotor

In one aspect, the rotary valves comprise a rotor with an integrated flow channel holding a solid support for purification, extraction and or concentration of analytes. FIGS. 2A, 2B, 2C, and 3 illustrate typical rotors useful in the rotary valves described herein. FIGS. 2A, 2B, and 2C illustrate a rotor comprising a single flow channel. The solid support chamber 46 is most clearly visible in FIG. 2A. FIG. 2B provides a view of the rotor from the rotor valving face 12, where the inlet 41 and outlet 42 of the flow channel can be seen. FIG. 2C illustrates a rotor comprising a gasket 80 at the valving face. Alternatively, as illustrated in FIG. 3, the rotor can comprise a plurality of flow channels. The rotor of FIG. 3 comprising four flow channels (46a-46d) that can vary from one another in size.

The rotor is configured to rotate about a rotational axis 16. For example, a rotor can rotate about a rotational axis with respect to the stator. Preferably, the rotor is symmetrical or substantially symmetrical centered upon the rotation axis. As used herein, "substantially" means to a great or significant extent, such as almost fully or almost entirely. In various aspects, a rotor is cylindrical or substantially cylindrical. While the main body of the rotor preferably is symmetric about the rotational axis, features such as displaceable spacer interfaces, propulsion engagement openings and fluid handling elements need not be symmetrically or substantially symmetrically placed relative to the rotational axis.

The rotor usable in the devices and methods described herein typically include a first face, e.g., a valving face 12, and a second face, e.g., outer face 13, opposite the first face. The valving face and/or outer face can each be planar or have a planar portion. In such circumstances, the rotational axis of the rotor is perpendicular or substantially perpendicular to the valving face and/or the outer face. Also, in a cylindrical rotor, a rotational axis can be defined by and/or be a portion of the rotor located equidistant or substantially equidistant from all points on an outermost radial edge of the rotor or on an outermost radial edge of the rotor and/or outer face. The rotor valve face 12 optionally comprises a gasket 80. The valving face typically also will comprise one or more fluid handling features, such as an inlet and/or outlet to a flow channel, a fluidic connector or a fluidic selector. In the event that the rotor valving face comprises a gasket, the fluid handling features typically are comprised in the gasket.

In some embodiments, the rotor optionally comprises a central opening 15 for receiving one or more portions of a stator, such as a central stator protrusion around which the rotor can rotate. The central opening of the rotor can also be configured to accommodate a biasing element and/or one or more displaceable spacers.

A rotor, e.g., a cylindrical rotor, has dimensions including a diameter, such as a cross-sectional diameter, which can range from 3 mm to 100 mm, 5 mm to 75 mm, or 10 mm to 50 mm. Such a diameter can also range from 3 mm to 50 mm, 5 mm to 40 mm, or 10 mm to 30 mm.

The rotor is configured to be rotated with a rotation propulsion element, such as a spline which is operably couplable with the rotor. In some aspects, the outer face of the rotor includes an opening defining an edge of a recess, a propulsion engagement opening 17. Operably coupling the rotor and the spline includes engaging the opening with a spline. Such engagement includes inserting at least a portion, e.g., protrusion, of the spline into the opening such that moving the protrusion in a rotational motion also exerts force on the rotor so that the rotor is rotated about the rotational axis. The portion of the spline can be inserted into the opening in a direction toward the stator and/or parallel with the rotational axis of the rotor. Also, in various embodiments, the rotor includes a propulsion protrusion and the rotation propulsion element includes an opening, such as an opening defining an edge of a recess, therein for receiving the rotor protrusion and thereby engaging the rotor with the propulsion element.

In some implementations, including the valve shown in FIGS. 2A and 3, the rotor 10 includes a plurality, e.g., two, three, four or more, propulsion engagement openings 17 for engaging a propulsion element. Such openings can be configured to receive a portion of a rotation propulsion element, such as a manual and/or automatic and/or electronic propulsion element, such as a spline therein, so that the propulsion element can thereafter exert force on the rotor to rotate the rotor. Typically, the propulsion engagement openings are arranged concentrically about the rotational axis of the rotor. In other implementations, the rotor comprises a single propulsion engagement opening that typically, but not necessarily, is coincident with the rotations axis. Such a centrally located propulsion engagement opening preferable is non-circular to permit an interaction with the propulsion element sufficient to generate the torque requires to rotate the rotor relative to the stator.

In some versions, the subject valves include a plurality of propulsion projections, such as projections forming a series of teeth protruding from a rotor, for example, an outermost peripheral wall or edge of a rotor. Such projections can be configured to operably engage with a series of receptacles for the teeth on a rotation propulsion element for rotation of the rotor. In various embodiments, the configuration is reversed and the rotor includes a series of receptacles for projections, such as teeth on a rotation propulsion element. As such, in some versions, a rotor portion forms a gear that interlocks with a propulsion element, or a portion thereof and the gear interaction drives rotation of the rotor.

Figure 4:
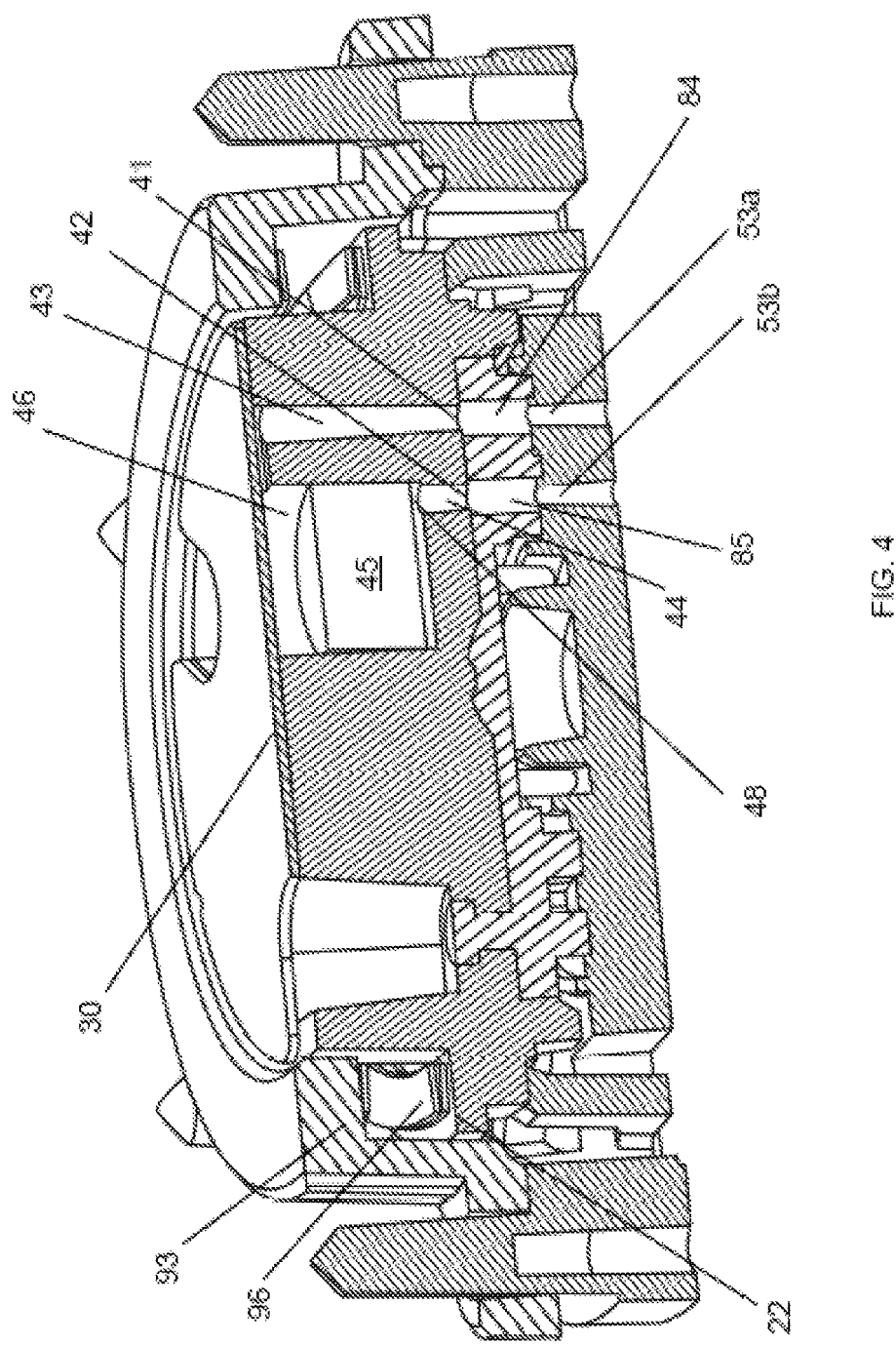
FIG. 4 provides a cross-sectional perspective view of a valve illustrating an interface between a rotor and a stator, according to an embodiment of the invention.
Figure 5C:
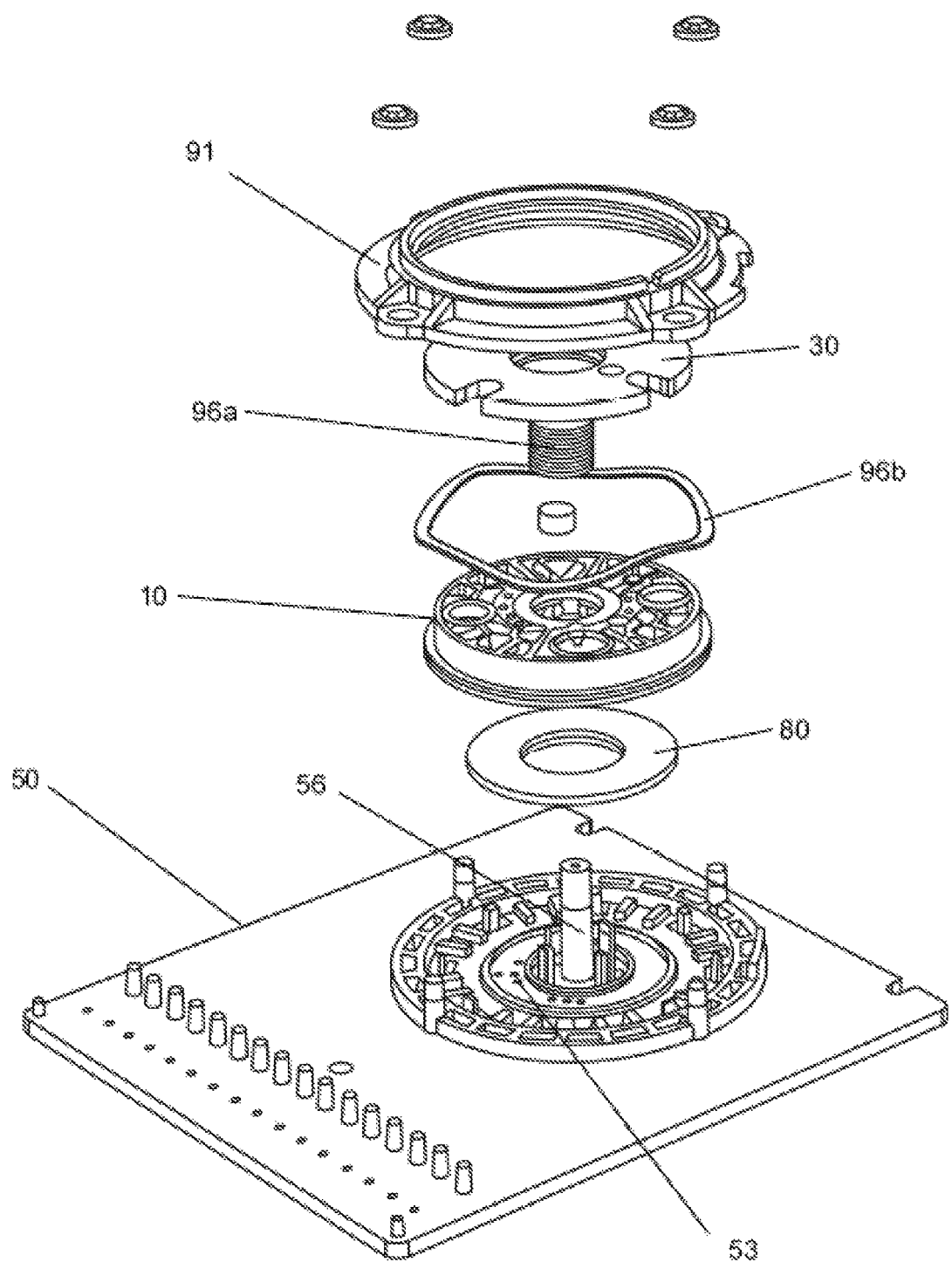
FIG. 5C is a top perspective exploded view corresponding to the bottom perspective view of FIG. 5A.
Figure 5D:
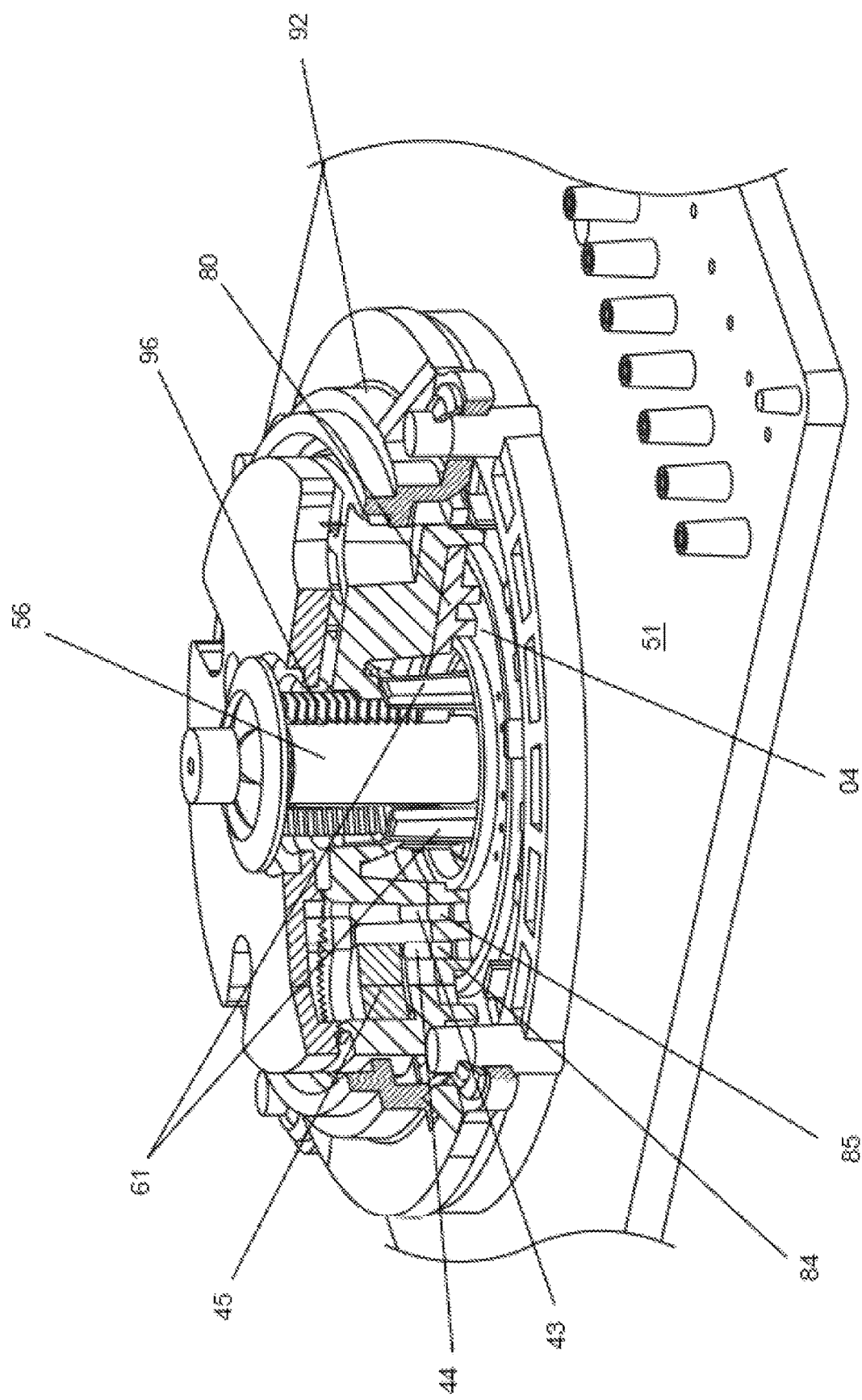
FIG. 5D is a partial cross section view of the assembled valve of FIGS. 5A-5C.

In various embodiments, a rotor includes one or more flow channels, which are configured for flow of one or more fluids, e.g., sample or sample-containing fluids, therethrough. As illustrated in FIG. 4, each flow channel 40 comprises an inlet 41, an outlet 42 at the rotor valving face 12, and a solid support chamber 46. In many implementations, the flow channel 40 further comprises a first conduit 43, which bridges from the inlet 41 to the solid support chamber 46. Such implementations may also comprise a second conduit 44, which bridges from the solid support chamber 46 to the outlet 42. The first and second conduits 43, 44 may have the same or different dimensions, e.g. length, volume or cross-sectional area. The cross-section of the first and second conduits can be uniform or can vary along the length of the conduit. In some implementations, one conduit extends the full thickness, or nearly the full thickness, of the rotor, i.e. from the valving face 12 to the outer face 13.

The cross section view of FIG. 4 illustrates an orientation of the rotor and the stator that establishes a fluid pathway between a stator fluid passage 54 via the stator ports 53a, 53b and the Chamber 46 containing the porous solid support 45. The stator fluid passage 54 are not shown in this view but are within the stator body 51 (see FIG. 1B2). As a result, a flow channel 40 within the rotor body 11 provides fluid communication with the porous solid support 45 within the chamber 46. The flow channel 40 is accessed whenever the gasket ports 84 and 85 are aligned with two stator ports 53 which in this embodiment occurs when the gasket ports 84, 85 are aligned to stator ports 53a, 53b.

The fluid flow pathway through the solid support chamber 46 is also visible in this view. An exemplary flow path begins at the stator 50 at the first port 53a. There is next a pathway through the gasket 80 via the gasket inlet port 84. Next, the fluid enters the rotor body 11 via inlet 41 and thence through the first fluid conduit 43. The outlet of the first conduit 43 leads to a fluid pathway defined by the spacing between the rotor upper surface 13 and the bottom surface 34 of the cap cover 30. The upper surface 13 in this region is shaped to provide a portion of desired flow path between the first fluid conduit 43 and the chamber 46. The partial flow path is completed when the cap cover 30 is secured to the rotor top surface 13. Next, the fluid enters into the chamber 46 containing the porous solid support 45. Fluid then passes to the bottom of chamber 46 to the second conduit 44 and then to rotor outlet 42. From rotor outlet 42 the fluid exits the rotor and passes through the gasket 80 via outlet port 85 and to the stator opening 53b. From the stator opening 53b the fluid passes on via a stator fluid pathway 54 as shown in FIG. 1B1.

As best seen in the view of FIG. 4, embodiments of the flow channel 40 may be present within the rotor main body 11. When provided, the flow channel 40 provides a fluid pathway between one or more ports in the rotor valving face 12 and a solid support chamber 46. With the rotor and stator aligned as illustrated in FIG. 4, the fluid pathways 54 of the stator accessed by the stator openings 53a, 53b are in communication with the porous solid support 45 via an embodiment of the fluid pathway 40 as described above.

As an integral part of the rotor, a flow channel is configured for rotational motion, rotating with the other portions of the rotor with respect to other valve aspects, such as a stator. In a preferred implementation, the flow channel is not concentric with the rotational axis of the rotor. As illustrated in FIG. 4, a flow channel can include one or more inlets 41 and one or more outlets 42 and provide fluidic communication between the inlet and the outlet. In a preferred implementation, each flow channel will comprise a single inlet and a single outlet. The inlet and outlet typically, but not necessarily, will adopt the same form as a cross-section of the flow channel immediately adjacent to that inlet or outlet. The inlet and/or outlet can be circular, rectangular or any other appropriate shape consistent with forming fluid-tight fluidic connections within the valve interface.

In many implementations, the subject devices are disposable and/or are intended for a single-use whereas other valves are not and are intended and used many times. Furthermore, the subject devices can support much more complex circuits in less space than existing valve designs. In addition, the integration of the porous solid support into the valve rotor improves the fluidic layout associated with use of valve.

In various embodiments, a flow channel 40 includes a porous solid support chamber 46 in which a porous solid support 45 is retained. The porous solid support chamber 46 can be cylindrical or can adopt any other shape to accommodate any configuration of the porous solid support(s) 45 provided herein. Additional shapes for a support chamber 46 include polygonal or other multiple sided shape including shapes with multiple curved sides or combinations of curved and straight sides. Additionally or optionally, the support chamber sidewalls may be straight or angled. In an angled arrangement the chamber 46 would be wider near nearer to the first conduit 43 and narrower adjacent second conduit 44. In addition to a porous solid support, a porous solid support chamber can also include a supplemental volume for containing a fluid flowed through the chamber before the fluid is flowed through the porous solid support. See, e.g., the head space in the chamber 46 above the porous solid support 45 in FIG. 4 between the upper surface of the porous solid support 45 and the cap bottom surface 34. The supplemental volume can have a volume equal to, smaller than or larger than the volume of the porous solid support 45. The flow channel 40 and solid support chamber 46 can be configured for fluid flow through the chamber substantially parallel to the rotational axis, e.g. as in FIG. 4. In some configurations, the first conduit 43 and the second conduit 44 are arranged within the rotor so as to provide flow paths that are parallel to the rotor axis of rotation 16. Alternatively, the flow channel and solid support chamber can be configured such that the flow of fluid through the chamber is parallel to a rotor valving face. While the volume of the solid support chamber predominantly is contained within the main body of rotor, one or more walls of the solid support chamber can be formed by a separate element, such as a rotor cap 30.

In various embodiments, including the embodiment shown in FIG. 3A, two or more, such as all of the flow channels, or portions thereof, e.g., porous solid support chambers, have a different cross-sectional diameter. For example, solid support chamber 46a has a narrower diameter than solid support chamber 46c. In some versions, none of the flow channels, or portions thereof, e.g., porous solid support chambers, have the same cross-sectional diameter. In other embodiments, two or more of a plurality of flow channels, or portions thereof, e.g., porous solid support chambers, have the same cross-sectional diameter. As with the flow channel, preferably, the solid support chamber is not concentric with the rotational axis of the rotor. It is to be appreciated that fluid channel spacer 29 within a flow channel may vary between flow channels on a rotary valve as further described with regard to FIGS. 17A-18C. One specific example of different fluid spacers on a single rotor is shown in FIG. 18A.

A zoomed-in view of a portion of a rotor is provided in FIG. 3. The rotor includes a flow channel 46b. Optionally, the flow channel also includes a flow channel spacer 49 for spacing a porous solid support from a surface, e.g., a bottom surface, of a porous solid support chamber. In various embodiments, a flow channel spacer can be crescent shaped and extend in an arcuate manner along its length. The flow channel spacer can facilitate fluid flow through the outlet by preventing the porous solid support, e.g., beads or fibers, from physically blocking the exit from the solid support chamber.

The solid support chamber 46 is configured to hold one or more porous solid supports 45. Porous solid supports can be configured to capture and thereby concentrate analyte, e.g., concentrate analyte from a first concentration to a second concentration, from a sample flowed therethrough by an amount of analyte concentration, such as 1000× or more in any of the time amounts described herein, such as in 30 min or less, such as 1 hour or less. In various embodiments, a porous solid support is bounded, such as bounded at an upstream face and/or a downstream face by a frit.

In some aspects, a porous solid support can be a selective membrane or a selective matrix. As used herein, the terms "selective membrane" or "selective matrix" as referred to herein is a membrane or matrix which retains one substance, e.g., an analyte, more effectively, e.g., substantially more effectively, than another substance, e.g., a liquid, such as portions of a sample other than the analyte and/or water and/or buffer, when the substances are exposed to the porous solid support and at least one of them is moved at least partially therethrough. For example, a porous solid support, such as a selective matrix, having a biological sample flowed therethrough can retain an analyte, e.g., nucleic acids, while the remainder of the sample passes through the porous solid support.

Examples of porous solid supports include, but are not limited to: alumina, silica, celite, ceramics, metal oxides, porous glass, controlled pore glass, carbohydrate polymers, polysaccharides, agarose, Sepharose™, Sephadex™, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers, or any combinations thereof. The choice of matrix material is based on such considerations as the chemical nature of the affinity ligand pair, how readily the matrix can be adapted for the desired specific binding.

In some embodiments, a porous solid support is a polymeric solid support and includes a polymer selected from polyvinylether, polyvinylalcohol, polymethacrylate, polyacrylate, polystyrene, polyacrylamide, polymethacrylamide, polycarbonate, or any combinations thereof. In one embodiment, the solid support is a glass-fiber based solid support and includes glass fibers that optionally can be functionalized. In some embodiments, the solid support is a gel and/or matrix. In some embodiments, the solid support is in bead, particle or nanoparticle form.

In various aspects, porous solid supports include a plurality of magnetic beads. Such beads can be of a size such that the beads are retained in flow channel during a loading step wherein a sample is flowed into a flow channel and/or porous solid support. The beads can also be retained in the flow channel during a washing step when a buffer is flowed through the channel and/or the porous solid support. The beads also can be of a size and/or magnetic content such that they can be released from a flow channel during an elution step. Such a release can be made by changing or removing a magnetic field in which the beads are held in the channel. In an elution step, the beads can flow out of the rotor and/or into a stator for a subsequent elution.

A myriad of functional groups can be employed with the subject embodiments to facilitate attachment of a sample analyte or ligand to a porous solid support. Non-limiting examples of such functional groups which can be on the porous solid support include: amine, thiol, furan, maleimide, epoxy, aldehyde, alkene, alkyne, azide, azlactone, carboxyl, activated esters, triazine, and sulfonyl chloride. In one embodiment, an amine group is used as a functional group. A porous solid support can also be modified and/or activated to include one or more of the functional groups provided that facilitate immobilization of a suitable ligand or ligands to the support.

In some embodiments, a porous solid support has a surface which includes a reactive chemical group that is capable of reacting with a surface modifying agent which attaches a surface moiety, such as a surface moiety of an analyte or ligand of a sample, to the solid support. A surface modifying agent can be applied to attach the surface moiety to the solid support. Any surface modifying agent that can attach the desired surface moiety to the solid support may be used in the practice of the present invention. A discussion of the reaction a surface modifying agent with a solid support is provided in: "An Introduction to Modern Liquid Chromatography," L. R. Snyder and Kirkland, J. J., Chapter 7, John Wiley and Sons, New York, N.Y. (1979), the entire disclosure of which is incorporated herein by reference for all purposes. The reaction of a surface modifying agent with a porous solid support is described in "Porous Silica," K. K. Unger, page 108, Elsevier Scientific Publishing Co., New York, N.Y. (1979), the entire disclosure of which is incorporated herein by reference for all purposes. A description of the reaction of a surface modifying agent with a variety of solid support materials is provided in "Chemistry and Technology of Silicones," W. Noll, Academic Press, New York, N.Y. (1968), the entire disclosure of which is incorporated herein by reference for all purposes.

In some implementations, the rotor comprises a cap at the outer face of the rotor. In some aspects, the cap is integrated with the rotor main body and as such, is composed of the same single integrated piece of material or materials as the main body. In other versions, the cap itself is an integrated plastic body that is operably couplable to the main body. In some implementations, the cap 30 is operably connected to the main body of the rotor and one wall of the flow channel is defined by the cap. A rotor cap 30 can cover each one of the solid support chambers as part of the fluid channel 40. As shown in FIG. 3B, each support chamber 46a-46d may vary in shape, size, dimension, volume or by the content of the solid support contained in a specific support chamber 46. The rotor cap 30 can be configured accordingly to cover the entire upper surface of the rotor or to cover only the solid support chambers.

In some versions, e.g. as illustrated in FIG. 4, the cap 30 includes a film such as a polymeric, e.g., plastic, and/or metallic film, e.g., foil. The film optionally can comprise openings 38 to permit access of a spline to the propulsion engagement openings in the rotor. Alternatively, the film can be puncturable by a spline of other implement.

In other versions, e.g. as illustrated in the inset of FIG. 5B, the cap 30 comprises an integrated plastic body. The cap of FIG. 5B includes a plurality of openings (i.e., cutouts) 38 to permit access of a propulsion element to the propulsion engagement openings of the rotor. In some implementations, the cap 30 also includes a central opening 36 for receiving one or more portions of a stator therein, such as a central stator protrusion around which the rotor can rotate. In a preferred embodiment, the portion of the cap, the flow channel surface 34, forms a wall of the flow channel or a portion thereof, e.g. the solid support chamber. The cap may be made of an opaque material. In such versions, the cap 30 further can include a plurality of flow channel mating elements 32 for operably connecting the cap with the flow channel. The flow channel mating elements can be a structure that engages with the flow channel and relies on friction to hold the cap in place. In another, preferred embodiment, the flow channel mating element can be welded to the main rotor body or incorporate an adhesive element to provide for a strong bond between main rotor body and cap structure and to prevent leakage of the flow channel when the valve is operational. In some versions, a cap is removably couplable and/or adhesively attached to a main body such that it can be removed and/or replaced by another cap.

Stator

The stator is an integral part of every rotary valve described herein. The stator usable in the devices and methods described herein include a first face, e.g., a stator face. The stator face is planar or has a planar portion. In an assembled valve, the stator face is perpendicular or substantially perpendicular to the rotational axis of the rotor and substantially complementary to valving face of the rotor. The stator face optionally comprises a gasket 80 to facilitate a fluid-tight seal at the rotor-stator interface. The stator can have additional faces, for example an anchoring face that defines a second surface of the stator.

Figure 6:
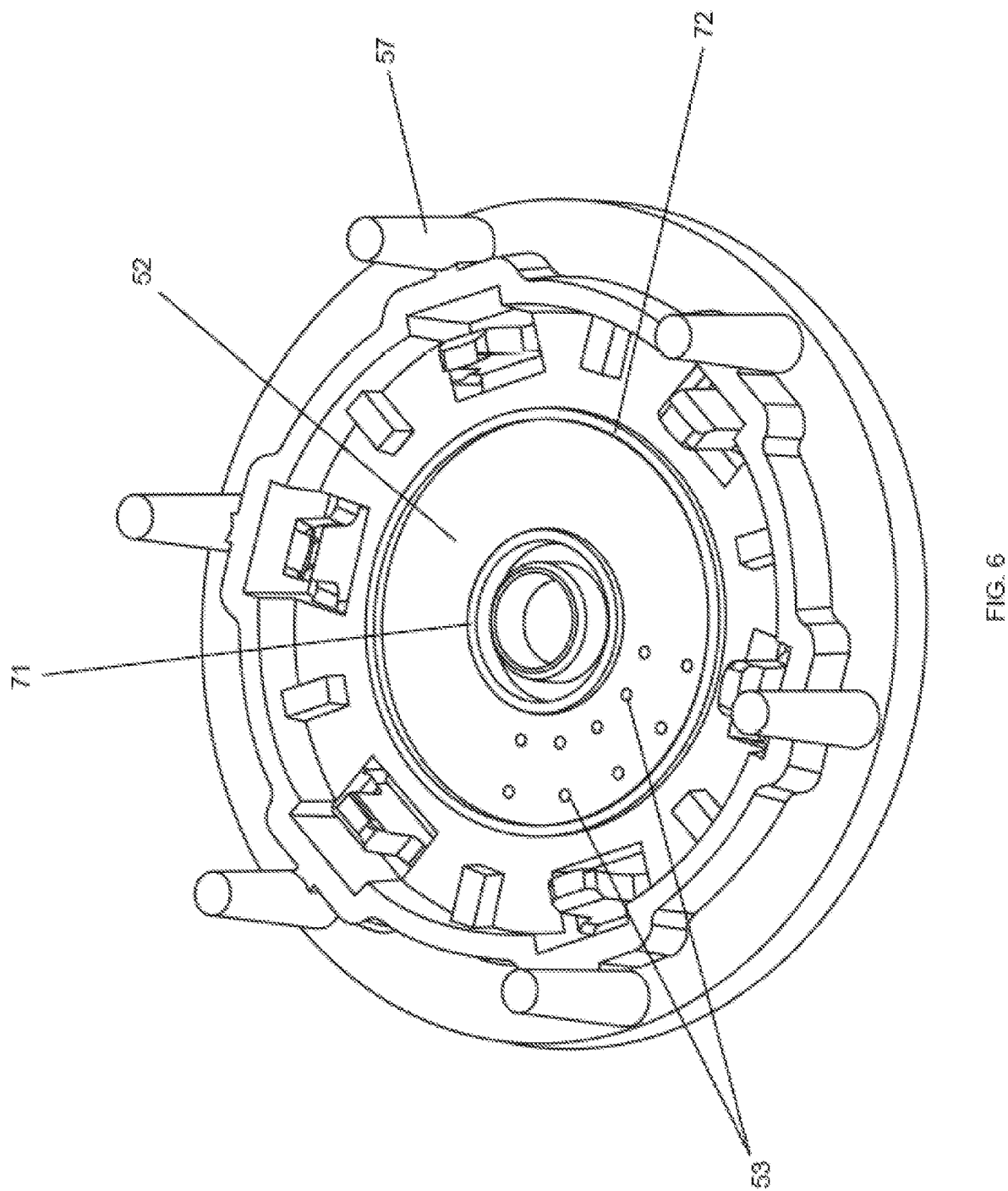
FIG. 6 provides a perspective view of a stator of a rotary valve as shown in FIG. 1B1 comprising arcing rails and several ports.

One embodiment of a stator of a rotary valve for use in practicing the subject methods is provided in FIG. 6. In various embodiments, the stator includes a stator face 52 and a plurality of passages, each passage including a port 53, e.g., an opening configured for passing fluid therethrough, at the stator face 52. The plurality of passages can range from 2 to 80, such as 2 to 36, such as 4 to 18. A port can be defined by edges of an opening in the stator face, such as a circular or rectangular opening. A port can have any of the dimensions, such as the cross-sectional diameter of any of the passages, e.g., microfluidic passages provided herein.

In one implementation, the stator ports are distributed radially around the center of the stator face. In a preferred implementation, the two or more stator ports are located at a first distance from the rotational axis of the rotor, when assembled as a rotary valve, and an additional two or more stator ports are located at a second, different, distance from the rotational axis. In some implementations, there are an equal number of stator ports at the first distance and at the second distance. Alternatively, there may be more or fewer stator ports located at a first distance and at a second distance from the rotational axis. FIG. 4 illustrates the certain features of the stator in the context of an assembled rotary valve. In particular, the cross-sectional view illustrates two stator ports at varying distances from the rotational axis. The first port 53*a* is farther from the axis and aligns with the inlet 41 of the flow channel in the rotor. The second port 53*b* is closer to the axis and aligns with the outlet 42 of the flow channel. In other configurations, stator ports at different distances from the rotational axis can interact with fluid handling features, such a connector or fluidic selectors. One of skill in the art will appreciation that additional stator ports can be located at a third, fourth, et seq distance from the rotational axis.

Each passage 54 in the stator comprises at least two termini, one at a stator valve face and the second terminating at an orifice to another structure (for e.g., a sample holding chamber, a lysis chamber or an outlet to the environment) or also emerging at the stator valve face. In certain implementations, the second termini can comprise a frangible seal that initially resists flow through the passage but can be ruptured during operation of the device to permit flow through the passage. In a preferred implementation, the passage is a microfluidic feature having a smallest dimension of 750 µm or less. In other implementations, the smallest dimension can be 600 µm or less, 500 µm or less, 400 µm or less, 200 µm or less, or 100 µm or less. The passage can comprise any cross-sectional shape, preferably rectangular. In some implementations, each passage, excluding the termini, is entirely embedded within the stator main body. In other implementations, at least one passage extends through the stator main body to an anchoring face, and then extends as an exposed conduit along the anchoring face of the stator. Such exposed passages may terminate on the anchoring face or, alternatively, may pass through the stator to an orifice at a structural feature such as a chamber, well or tubing connector.

Rotor-Stator Interface

In the subject embodiments, the rotor contacts the stator at an interface to form a fluid-tight seal. In such embodiments, the fluid-tight seal entirely or substantially prevents a fluid from leaking out via the interface during device operation. Such a fluid can be a sample, buffer, or other fluid flowed through the device components including the rotor and the stator according to the subject embodiments. The fluid-tight seal is maintained as the rotor is rotated with respect to and slides along the stator.

According to various embodiments, the valves include a retention element biasing the stator and the rotor together. A retention element can include a retention ring and/or a biasing element. The retention element (1) holds the rotor and stator in proximity to one another and (2) biases these two elements together to form a leak-tight interface. In some implementations, a single structure both mains proximity and provides a biasing force. In other implementations, a first structure, e.g., a retention ring, aligns the rotor and stator and a second structure, e.g. a biasing element, presses the rotor and stator together.

A retention element can be mobile or stationary relative to the stator. For example, the propulsion element, in addition to spinning the rotor, can push the rotor into the stator to form a leak-tight interface. In a preferred embodiment, at least a portion of the retention element is stationary relative to the stator. In one embodiment, the retention element comprises a retention ring and a biasing element, wherein the retention ring is fixedly coupled to the stator such that the rotor is held between the retention ring and the stator. In some implementation, the retention ring provides sufficient force to form a leak-tight seal between the rotor and stator.

In other implementations, the retention element comprises and retention ring 91 and separate a biasing element 96. The retention ring is coupled to a stator, e.g., via one or more coupling protrusions 57 on the stator and corresponding retention ring attachment element 94 (see, e.g. FIG. 1A). By such coupling, the retention ring can be configured to be fixed in a position while a rotor rotates with respect to it and the stator. The retention ring can be coupled to the stator by any method known in the art, e.g., by heat staking or ultrasonic welding the coupling protrusions or using a standard retainer, such as a push nut 98 (see e.g., FIG. 8).

Retention rings are configured to provide a stationary base for the biasing element such that the biasing force can act to maintain the rotor in contact with the stator. In one implementation, the retention rig comprises a face such as a planar and/or annular lip 93 for contacting a biasing element 96 such as a spring. Such a face can be in a plane parallel with that of an outer face and/or a valving face and/or a stator face. Similarly, the biasing element will typically engage the rotor along a face such as a planar and/or annular lip 21 on the rotor. The planar lip can be a peripheral protrusion on the rotor, i.e. a peripheral lip 22, (see, e.g. FIG. 3A and FIG. 8). In some embodiments, the planar face can be formed more centrally, such as the interior lip 23 illustrated in FIGS. 8A and 8B.

A retention ring can also include a spline access opening, which can be a circular opening opposite a stator. A spline access opening can be configured to receive a portion of a rotation propulsion element, e.g., spline, therethrough while the spline engages the rotor to rotate the rotor.

A biasing element be shaped as a ring positioned around at least a portion of a rotor. A basing element can also be substantially circular, e.g., ring-shaped, and/or cylindrical and/or can have a central axis which is or is not concentric with a rotational axis of a rotor. Preferably, the biasing element provides a substantially symmetrical force relative to the rotational axis so as to bias the rotor uniformly against the stator without canting.

A biasing element can be one or more springs. In an embodiment in which the biasing element is a spring, the spring can be a compression spring or a tension spring made of metal, plastic or other polymer. In various embodiments, a biasing element is a ribbon spring, such as a ring-shaped ribbon spring. In various embodiments, a biasing element is a wave spring, such as a ring-shaped wave spring. A biasing element can also be shaped as a cylindrical column and can be contained within, e.g., between two portions of, a rotor and/or a stator and/or a retention element.

A biasing element can be a mass of an elastic material such as rubber or foam in the shape of a block, cylinder, ring, sphere, or other shape. The biasing element can be in the form of one or more bands of rubber. The biasing element can be in the form of a piece or pieces of metal, plastic or other polymer that are shaped to exert sufficient force against other device components. Such a shaped piece of metal can include a metal band that arcs within for example, the rotating ring. The biasing element can be in the form of a magnet or series of magnets configured to repel or attract each other and thereby assert sufficient force against the device components. The biasing element can be made out of the same material as any of the other valve components, e.g., a gasket. In some embodiments, the biasing mechanism can be a part of, such as integral with, another component, such as a rotor and/or retention ring and/or stator. As used herein, by "integral" and "integrated with" is meant composed of a single piece of integrated material or materials.

Gasket

In some aspects, a rotary valve includes a gasket between the stator face and the rotor valving face. A gasket is a mechanical seal that fills a space between two or more mating surfaces of objects, generally to prevent leakage from or into the joined objects while the gasket is under compression. In various aspects, the gasket is composed, e.g., entirely composed, of an elastic and/or compressible material. In some versions, the rotor comprises the gasket and in other versions, the stator comprises the gasket. In embodiments wherein the rotor comprises a gasket, is fixedly, e.g., adhesively, attached to a rotor and forms a sliding interface along the stator. Also, in those embodiment where the stator comprises the gasket, the gasket is fixedly, e.g., adhesively, attached to a stator and forms a sliding interface along the rotor.

One embodiment of a valve device component is shown in FIGS. 7A and 7B. Specifically, FIGS. 7A and 7B illustrate a gasket 80 slidably engaging a stator. The gasket 80 also includes a first aperture 84 aligned with the inlet 41 of the rotor's flow channel, and a second aperture 85 aligned with the outlet 42.

In various aspects, a gasket is substantially cylindrical and/or disk-shaped wherein the distance between the axis of rotation and the outer circumference of the gasket is greater than the distance between the axis of rotation to the most distant port on the stator. In some embodiments, such as illustrated in FIGS. 7A and 7B, the gasket is annular having an outer circumference beyond the most distant stator port as described above and wherein the distance between the axis of rotation and inner circumference of the annulus is less than the distance between the axis and the most proximal stator port. A gasket can have an outer cross-sectional diameter such as any of the rotor diameters provided herein. A gasket can have an out cross-sectional diameter, for example, of 100 mm or less, such as 45 mm or less, such as 50 mm or less, such as 40 mm or less, such as 20 mm or less, such as 10 mm or less. The inner and outer gasket diameters can range, for example, from 1 mm to 100 mm, 3 mm to 50 mm, 3 mm to 25 mm or 5 mm to 35 mm. A gasket can also have a thickness such as any of the thicknesses of device components provided herein, such as 10 mm or less, such as 5 mm or less, such as 1 mm or less or 1 mm or more, 5 mm or more, or 10 mm or more.

In various aspects, a gasket is composed, e.g., entirely composed, of one or more polymeric materials (e.g., materials having one or more polymers including, for example, plastic and/or rubber and/or foam). A gasket can also be composed of a silicone material. A gasket can be composed of any of the elastic materials provided herein. Gasket materials of interest include, but are not limited to: polymeric materials, e.g., plastics and/or rubbers, such as polytetrafluoroethene or polytetrafluoroethylene (PTFE), including expanded polytetrafluoroethylene (e-PTFE), polyester (Dacron™), nylon, polypropylene, polyethylene, polyurethane, etc., or any combinations thereof. In some embodiments, the gasket comprises Neoprene (polychloroprene), a polysiloxane, a polydimethylsiloxane, a fluoropolymer elastomer (e.g. VITON™), a polyurethane, a thermoplastic vulcanizate (TPV, such as Santoprene™) butyl, or a styrenic block copolymer (TES/SEBS).

According to some embodiments, a gasket includes one or more apertures fully penetrating the thickness of the gasket. In those implementations, wherein the gasket is affixed to the stator, the gasket comprises an aperture corresponding to and aligned with each stator port, to permit fluid flow therethrough. In implementations wherein the gasket is affixed to the rotor, the gasket comprises an aperture corresponding to and aligned with each of the flow channel inlet and outlet, if present, to permit flow across the rotor-stator interface.

When fluids are forced through the apertures of the gasket, the pressures mobilizing the fluid can distort the inherently elastic material of the gasket. To minimize such distortion, which can lead to leaking at the rotor-stator interface, some versions of the stator include one or more arcing rails, such as a first and a second arcing rail, for laterally engaging the gasket to inhibit distortion of the gasket when one or more fluid handling elements, such as grooves or apertures, of the gasket are pressurized. By laterally engaging is meant contacting another element and exerting a force thereon in a direction substantially radially outward and/or inward with respect to a rotational axis of a rotor and/or within a plane concentric with the rotational axis of a rotor and having the same thickness as the axis. Laterally engaging can also refer to contacting another element and exerting a force thereon in a direction substantially perpendicular to the rotational axis of a rotor.

In various embodiments, one or both of the arcing rails are ring-shaped and can be concentric with the rotational axis. In various embodiments, arcing rails are circular and a first arcing rail has a diameter that is smaller than a second arcing rail. In one embodiment, the stator 50 comprises two arcing rails, wherein a proximal rail 71 is proximal of the passage and constrains the gasket from distorting toward the rotational axis and wherein a distal rail 72 is distal of the passage and constrains the gasket from distorting away from the rotational axis. In implementation having two arcing rails, the rails preferably are located to bracket the fluidic features of the gasket. For example, FIG. 6 illustrates a stator having two arcing rails. On rail, the proximal rail 71, is located closer to the rotational axis than the gasket aperture that engages the stator port. The second rail, the distal rail 72, is located further from the rotations axis that the more distal gasket aperture that engages a stator port. In an alternative implementation, the gasket is affixed to the stator and the arcing rails are integrated into the rotor.

Pressurizing can include increasing the pressure in the one or more port from a first pressure, e.g., one atmosphere or substantially one atmosphere, to a second pressure greater than the first. The second pressure can be more than one atmosphere, such 1.2 atm or more, 1.5 atm, or more 2 atm or more, or 5 atm or more. The pressurizing can include laterally engaging, such as by contacting, at least one of the arcing rails and at least one of the gaskets to form a fluid-tight seal between the arcing rail and the gasket. Laterally engaging can include moving at least a portion of a gasket, e.g., a protruding ring, toward the arcing rail which it laterally engages. When a fluid-tight seal is formed, no liquid or substantially no liquid leaks across the seal throughout device operation. Also, in some versions, the stator further includes a second arcing rail concentric with a first arcing rail. In such embodiments, pressurizing the port includes laterally engaging the second arcing rail and the gasket to form a fluid-tight seal therebetween.

Fluid Handling

The rotary valves described herein are useful for directing fluid flows within a device, especially a microfluidic device. As such, the rotary valves comprise at least one fluid handling feature. In some embodiments, the fluid handling feature is comprised within the rotor valving face. In implementations wherein the rotor comprises a gasket, one or more fluid handling features can be comprised with the gasket.

As used herein, a fluid handling feature is a physical structure in the rotor or gasket that, when aligned with two stator ports, fluidically connect the two ports and associated passages to form a continuous fluidic path. In some embodiments, the fluid handling feature is a fluidic connector 86. A fluidic connector is configured to fluidically connect a first stator port to a second stator port. In implementations, such as illustrated in FIG. 7, the fluidic connector is an elongated groove in the rotor or gasket with the longest dimension along a line radiating from the center of the rotor. Such a radially aligned fluidic connector is capable of sequentially connecting a plurality of pairs of stator ports, such as illustrated in FIG. 6, wherein each of the plurality of pairs has one proximal port and one distal port, wherein all proximal ports are one distance from the rotational axis and all distal ports are a second, larger, distance from the axis. In some embodiments, the fluid handling feature is a flow channel, wherein when the flow channel inlet is aligned with one stator port and the flow channel outlet is aligned with a second stator port, the full volume of the flow channel fluidically connects the two stator ports. Accordingly, the flow channel can act as a fluidic connector. In some embodiments, the fluid handling feature is a fluidic selector 77 having a first portion that is an arc with all points along the first portion being equidistant from the rotational axis, and a second portion extending radially toward or away from the center of the rotor.

One aspect of the invention provides a rotary valve having a rotor wherein the rotor valving face comprises a first fluidic connector, wherein in a first rotor position a first port of the stator is fluidically connected to a second port of the stator via the first connector. In a second rotor position, a third port is fluidically connected to a fourth port via the first fluidic connector. Optionally, in a third rotor position, a fifth port is fluidically connected to a sixth port via the first fluidic connector. In one implementation, the fluidic connector is an elongate groove. In another implementation, the fluidic connector is a flow channel in the rotor.

One aspect of the invention provides methods of purifying an analyte, the method comprising (1) providing a rotary valve comprising a stator 50 comprising a stator face 52 and a plurality of passages 54, each passage comprising a port 53 at the stator face; (b) a rotor 10 operably connected to the stator and comprising a rotational axis 16, a rotor valving face 12, and a flow channel 40 having an inlet 41 and an outlet 42 at the rotor valving face, wherein the flow channel comprises a porous solid support 45; and (c) a retention element 90 biasing the stator and the rotor together at a rotor-stator interface to form a fluid tight seal; and (2) flowing a sample comprising analyte through the flow channel and retaining at least a portion of the analyte on the porous solid support to produce a bound analyte portion and a depleted sample portion. In some implementations, the method further comprises rotating the rotor about the rotational axis to a first position and thereby fluidically connecting the first port, the flow channel, and the second port. In this first position, the sample flows into the flow channel via the first port and the depleted sample portion exits the flow channel via the second port. In a further implementation, the stator comprises four ports and the method further comprises rotating the rotor to a second position and thereby fluidically connecting a third port, the flow channel and a further port. In this second position, an eluent flows into the flow channel via the third port, thereby removing at least a portion of the analyte from the porous solid support to produce an analyte sample, which exits the flow channel via the fourth port. As used herein, the term "eluent" refers to a solvent used in order to effect separation of an analyte from solid support by elution.

In some versions, the disclosed valve devices are fluidic sample handling devices and/or sample processing devices which can be biological assay devices, such as biological assay sample preparation or processing devices. As used herein, a "biological assay" is test on a biological sample that is performed to evaluate one or more characteristics of the sample. A biological sample is a sample containing a quantity of organic material, e.g., one or more organic molecules, such as one or more nucleic acids e.g., DNA and/or RNA or portions thereof, that can be taken from a subject. A biological sample can include one or more of blood, urine, mucus, or other body fluid. Accordingly, biological assay sample preparation devices, according to some embodiments, are devices that prepare a biological sample for analysis with a biological assay. Also in some aspects, a biological sample is a nucleic acid amplification sample, which is a sample including one or more nucleic acids or portions thereof that can be amplified according to the subject embodiments.

Method of Manufacture

One aspect provides methods of producing a rotary valve, the method comprising: (a) forming a stator 50 comprising a stator face 52 from a stator body material; (b) forming within the stator a plurality of passages 54, each passage comprising a port 53 at the stator face; (c) forming a rotor 10 comprising a rotor valving face 12 from a rotor body material; (d) forming within the rotor a flow channel 40 comprising an inlet 41 and an outlet 42 at the rotor valving face; and (e) inserting a porous solid support 45 into the flow channel. In some implementations, the method further comprises operably connecting the stator and the rotor so that the rotor is configured to rotate about a rotational axis.

Each of the components of the subject devices or aspects thereof, such as stators, rotors, gaskets, displaceable spacers, biasing elements, retention rings, caps, and/or cams, can be composed of a variety of materials, such as a single material, or a plurality of materials, such as two, three, four, five, or ten or more materials. Such components can, in various aspects, also include one or more rigid materials, such as a polymeric material, such as plastic. Such components can, in some aspects, include one or more flexible materials, such as a layer of flexible material coating a core composed of one or more rigid materials. Such components can, in various aspects, include one or more elastic materials. Elastic materials are materials that are flexible and also biased to remain in their initial shape when force is exerted thereon. For example, a gasket can be composed, such as composed entirely, of an elastic material.

Components of the subject devices can also include one or more polymeric materials (e.g., materials having one or more polymers including, for example, plastic and/or rubber and/or foam) and/or metallic materials. Such materials can have characteristics of flexibility and/or high strength (e.g., able to withstand significant force, such as a force exerted on it by use, without breaking and/or resistant to wear) and/or high fatigue resistance (e.g., able to retain its physical properties for long periods of time regardless of the amount of use or environment).

According to the subject embodiments, the components of the subject devices, can each be composed of a variety of materials and can be composed of the same or different materials. Materials that any of the device components described herein can be composed of include, but are not limited to: polymeric materials, e.g., photopolymer materials such as TangoPlus™, and Veroclear™, and/or plastics, such as polytetrafluoroethene or polytetrafluoroethylene (PFTE), including expanded polytetrafluoroethylene (e-PFTE), polyester (Dacron™), polypropylene, nylon, polyethylene, high-density polyethylene (HDPE), polyurethane, etc., metals and metal alloys, e.g., chromium, titanium, stainless steel, etc., and the like. In various embodiments, such materials can be or include one or more thermoplastic materials. Such materials can include acrylonitrile butadiene styrene (ABS), acrylic, such as poly (methyl methacrylate) (PMMA), polyoxymethylene (POM), also known as acetal, polyacetal and polyformaldehyde, aliphatic or semi-aromatic polyamide (PA), polyethylene (PE), polypropylene (PP), polyetheretherketone (PEEK), cyclic olefin copolymer (COC), cyclic olefin polymer (COP), polycarbonate (PC), and blends thereof.

The materials can be transparent or semi-transparent such that a device user can observe a sample and/or a solution throughout device operation, such as during mixing or sample processing. By utilizing translucent materials, fluids are visible as they are transported among one or more chambers of the device, providing visual feedback during device operation. Alternatively, some or all of the materials can be opaque such that a device user can observe the sample while minimizing contaminating background light.

Materials of the devices according to the subject embodiments can be materials that are effectively injection-molded. Materials employed according to the subject embodiments can also be materials that are effectively printed, such as by melting and dispensing in an ordered manner, using a 3D printer. For example, all parts can be designed according to the subject embodiments using 3D CAD software (SOLIDWORKS) and fabricated using an Objet 260 multi-material 3D printer (STRATASYS, Eden Prairie, Minn., USA).

In some implementations, forming the stator from the stator body material comprises performing injection molding of the stator body material. In some implementations, forming the stator from the stator body material comprises embossing, reaction molding, or thermoforming the stator body material. In some implementations, forming the stator from the stator body material comprises 3-dimensionally (3D) printing the stator. Forming the plurality of passages can comprise performing etching or computer numeric control (CNC) machining of the stator body material In some implementations, forming the rotor from the rotor body material comprises performing injection molding of the rotor body material. In some implementations, forming the rotor from the rotor body material comprises embossing, reaction molding, or thermoforming the stator body material. In some implementations, forming the rotor from the rotor body material comprises 3-dimensionally (3D) printing the rotor. Forming the flow channel comprises performing etching or computer numeric control (CNC) machining of the rotor body material As noted above, methods of fabricating, such as by manufacturing, the subject devices are provided herein. In some versions, one or more components of the devices are fabricated using a manufacturing method such as injection molding of one or more materials, e.g., plastics. The materials, e.g., plastics, can include at least one regular plastic, such as, but not limited to acrylonitrile butadiene styrene (ABS), acrylic, polyoxymethylene (POM), aliphatic or semi-aromatic polyamide (PA), polyethylene (PE), polypropylene (PP), polyetheretherketone (PEEK), polycarbonate (PC), cyclic olefin polymers, cyclic olefin copolymers or any of the other materials provided herein.

In some embodiments, the methods include forming a device component body, such as a stator body, a rotor body or a gasket body. A device component body is a portion of a device composed of a single integrated uniform material or combination of materials, or a portion thereof from a first, e.g., body, material. Forming a component body or a portion thereof can be performed by reaction molding, injection molding, embossing, etching, blow molding, rotational molding, thermoforming and/or machining, e.g., computer numeric control (CNC) machining.

The subject methods also can include forming one or more features, e.g., microfluidic features, in a component. Microfluidic features can be formed in a component body using any of the same methods used in forming a body. For example, microfluidic features can be formed by performing embossing, injection molding, reaction molding, etching, blow molding, rotational molding, thermoforming and/or machining, e.g., computer numeric control (CNC) machining, or any combination thereof. When microfluidic features are formed by injection molding, a container providing a mold includes one or more reciprocal microfluidic features around which a molten body material forms. When the molten material becomes solid, the features remain defined in the resulting body.

In various embodiments, the methods include operably connecting valve device components, such as the stator, rotor, gasket, and/or porous solid support, for device operation and/or storage and/or transport. In some versions, the methods include operably connecting the stator and the rotor so that the rotor is configured to rotate about a rotational axis. Such operable connection can include inserting the rotor into a rotor-receiving cavity of the stator. In some aspects, the methods include operably connecting the gasket and the rotor by adhesively attaching them or by press-fitting or contact-fitting them together. The methods can also include operably connecting the gasket and the stator by adhesively attaching them or by press-fitting or contact-fitting them together.

Making it Shippable

In some versions of the rotary valve, in addition to a rotor, stator and retention element, the valve includes a gasket between the stator face and the rotor valving face, and a structure for maintaining the valve in a storage configuration wherein the rotor and stator are spaced apart such that the gasket is not compressed at the rotor-stator interface. Gaskets, typically formed of compressible, elastomeric materials, are susceptible to compression-set and adhesion to adjacent surfaces if stored under compression for extended periods of time. Accordingly, described herein is a preferred implementation of a rotary valve that includes a displaceable spacer for preventing the gasket from sealing against at least one of the rotor and stator, wherein when the spacer is displaced, the gasket seals the rotor and stator together in a fluid-tight manner. In such a storage configuration, the gasket is not deformed by force exerted thereon and thus not subject to permanent deformation or undesired adhesions to the rotor or stator, which could affect the valve's effectiveness.

One aspect of the invention provides a rotary valve comprising (a) a rotor 10 comprising a rotor valving face 12 and a rotational axis 16; (b) a stator 50; (c) a gasket 80 interposed between the stator and the rotor valving face; and (d) a displaceable spacer 60 for preventing the gasket from sealing against at least one of the rotor and stator, wherein, when the spacer is displaced the gasket is configured to facilitate a fluid-tight interface between the rotor and stator. In certain implementations, the valve further comprises a retention element 90 biasing the rotor and stator towards one another.

Displaceable spacers according to the subject embodiments are aspects configured for preventing the gasket from sealing against at least one of the rotor and the stator. When the spacers are displaced, e.g., displaced from a pre-activated configuration to an activated configuration, the gasket seals the rotor and stator together in a fluid-tight manner. According to the subject embodiments, displaceable spacers can be part of and/or integral with a stator or rotor.

In one implementation, in the storage configuration, a displaceable spacer comprises a plurality of tabs that contact a lip on the rotor to hold the rotor away from the stator. Each of the plurality of tabs is displaceable to disengage from the lip in the operational configuration. In one embodiment, the displaceable spacer 60 comprises a plurality of tabs displaceable from a first tab configuration to a second tab configuration. FIG. 8 illustrates one embodiment of a valve in a storage position. The stator comprises a plurality of tabs. In this embodiment, the stator comprises a plurality of tabs 61. In this implementation, a subset of the plurality of tab is arranged around the periphery of the rotor-stator interface, i.e., peripheral tabs 62. The remaining tabs are placed to interface inward of the end of the rotor, i.e., interior tabs 63. The displaceable spacer can comprise peripheral tabs, interior tabs or a combination of both interior and peripheral tabs.

Displaceable spacers, such as tabs, can be shaped substantially as a three-dimensional box or rectangular shape. Each of the spacers, such as tabs, can include a planar face for reciprocally contacting a lip of a rotor as provided herein, in a pre-activated configuration. Such a planar face can be perpendicular to a plane defined by the stator face and/or the rotor valving face. Such a planar face can be configured to exert a force on a rotor lip in a direction parallel or substantially parallel with the rotational axis of the rotor.

Displaceable spacers can be composed of any of the same materials as stators, rotors, or other device components provided herein. For example, in various embodiments, displaceable spacers are composed of a polymeric material such as plastic and can be integral with a stator body. As such, in some instances, a stator can include a main body and one or more displaceable spacers operably coupled thereto and/or integral therewith.

In various aspects, a rotor suitable for use in the storable rotary valve comprises at least one lip 21 to interact with a plurality of tabs 61 displaceable from a storage configuration to an operational configuration, wherein each of the tabs 61 contact the at least one lip 21 and thereby prevent the gasket from sealing the rotor and stator in the storage configuration, and disengage with the at least one lip when the tabs are displaced from the storage configuration to the operational configuration. In one implementation, the rotor includes a curved outer wall including at least one lip. Such a peripheral lip 22 is configured to engage with a plurality of peripheral tabs. In some implementations, e.g., as illustrated in FIGS. 8 and 9, the rotor can comprise a lip located within the body of the rotor, i.e. an interior lip 23, and the rotor further comprises a displacer slot 28 adjacent to the interior lip for each of the plurality of tabs 63, which is a negative space within the body of the rotor capable of accommodating the tabs when displaced to the operational configuration.

According to various embodiments, each of the tabs contact the at least one lip and thereby prevent the gasket from sealing the rotor and stator in the first tab configuration, and disengage with the at least one lip when the tabs are displaced from the first tab configuration to the second tab configuration. In the second tab configuration, the gasket seals against the rotor and/or stator in a fluid-tight manner.

To facilitate displacement of the spacer when transitioning from a storage configuration to an operational configuration, the rotor can comprise one or more cams 24 adjacent to a lip that interacts with the displaceable spacer. Each of the cams can be a ramp that upon rotation acts to displace the spacer. For implementations wherein the stator comprises a plurality of peripheral tabs, each of the cams has a length and progressively slopes along its length from a first radial distance from the rotational axis of the rotor to a second radial distance greater than the first radial distance. As such, each of the cams can be a ramp which progressively slopes radially outward, for example, from a rotational axis of a rotor, along the circumference of the rotor or a portion thereof. In such embodiments, the one or more cams exert a force in an outward or substantially outward direction, such as a direction away from a rotational axis of a rotor, on the displaceable spacers, e.g., plurality of tabs when the rotor is rotated. Typically the second radial distance is equal to or beyond the distance of a furthest edge of the lip from the main body of the rotor. One embodiment of the rotor is illustrated in FIGS. 2B and 2C, wherein the cam has a length that slopes from a distance interior of the outer edge of the lip to a distance even with the edge of the peripheral lip.

For implementations wherein the stator comprises a plurality of interior tabs, each of the cams has a length and progressively slopes along its length from a first radial distance from the rotational axis of the rotor to a second radial distance less than the first radial distance. In various aspects, the one or more cams exert a force in an inward or substantially inward direction, such as a direction toward a rotational axis of a rotor, on the displaceable spacers, e.g., plurality of tabs, and thereby actuate the displaceable spacers when the rotor is rotated.

Upon rotation, the tab slides along the ramp of the cam, which thereby displaces the plurality of spacers 60 from a storage configuration to an operational configuration thereby disengaging the plurality of spacers 60 from the at least one lip 21. In one implementation, the plurality of tabs 61 are irreversibly disengaged from the at least one lip 21 when the rotor is rotated.

As indicated above, in various aspects, the subject valves are activatable from a pre-activated shipping or storage configuration to an activated operational configuration for receiving one or more fluids therein. FIGS. 8A and 8B depict a device in a storage configuration. FIGS. 9A and 9B depict the valve embodiment of FIGS. 8A and 8B in an operational configuration. In the embodiment illustrated in FIGS. 8A, 8B, 9A and 9B, the stator comprises a plurality of peripheral tabs 62 and a plurality of interior tabs 63. The interior lip 22 of the rotor rests upon the interior tabs 62 and the peripheral lip 23 rests upon the peripheral tabs 63. Thus, in the storage configuration, the rotor is held away from the stator, such that the gasket is not compressed at the rotor-stator interface.

FIGS. 9A and 9B illustrates the rotary valve in an operational configuration. After rotation of the rotor and engagement of the tabs with the cams, as described above, the tabs have been deflected beyond the edge of the peripheral and interior lips. The retention element provides a biasing force, in the form of two wave springs 96. This biasing force presses the rotor towards the stator to generate a fluid tight seal at the rotor-stator interface.

In various embodiments, the one or more displaceable spacers, e.g., plurality of tabs, or other structures provided to maintain a rotary valve in a storage condition are irreversibly disengaged from the at least one lip or other corresponding structure when the rotor is rotated. In such embodiments, the rotor actuates toward the stator in a direction along the rotational axis when the displaceable spacers are displaced. However, the rotor is prevented from actuating in the opposite direction away from the stator by the biasing element. As such, once a valve device is activated as described herein, it is not reversibly un-activatable to again be maintained in a storage/shipping position by, for example, rotation a rotor, such as rotation a rotor in an opposite direction which it was rotated to activate the valve device. Accordingly, once a stator is sealed with the gasket and/or rotor in a fluid-tight manner, it does not unseal during device operation or subsequent use. Accordingly, a device is discarded after a use, such as by flowing one or more fluids such as liquids, such as a sample therethrough rather than re-stored or further shipped in a shipping position. As such, embodiments of valve devices disclosed herein are single-use devices, wherein single-use refers to a single period of use not interrupted by substantial storage, e.g., storage for 1 day or more, or 2, 5, 10, 20, or 50 days or more, 180 days or more, or 365 days or more and/or shipping of the device.

In various aspects, the subject valves transition from a from a pre-activated shipping or storage configuration to an activated configuration for device operation utilizing structures other than the tab embodiments illustrated in FIGS. 8A, 8B, 9A and 9B. In such embodiments, a rotor can be operably connected to a stator by a pin-and-track coupling. In such an attachment, the rotor includes one or more pin which moves in a track in the stator such that the rotor is held away from the stator in the storage position and then drops out of the track when the rotor is rotated. In another embodiment, the stator includes the one or more pin which moves in a track in the rotor while the rotor is rotated. A rotor can also be operably connected to a stator by a thread-and-groove coupling wherein the rotor includes one or more threads which mateably connect to one or more reciprocal grooves on the stator. Alternatively, the stator includes one or more threads which mateably connect to one or more reciprocal grooves on the rotor. In such implementations, the biasing element will facilitate the rotor disengaging from the pin-track or thread structure to form the fluid-tight seal and prevent re-transition of the valve to its storage configuration.

In some embodiments, further to the use of pin-and-track or pin-and-guide structures, the rotary valve transitions from a pre-activated or stowed condition to a gasket engaged and a ready for use condition using a pin and groove structure arrangement between the rotor and the stator. The pin rests within the groove or guide structure when stored or during shipment. Then, to prepare the valve for use, the rotor moves into engagement with the stator so as to seal the gasket to the stator valve surface. This motion from the stowed condition can be guided by one or more guiding structures. Guiding structures can comprise guides which interface with one or more docking or pin structures. For example, a rotor can comprise one or more docking structures (e.g., pins) adapted to engage with a complementary guide, track or rail associated with a stator.

Alternatively, a stator can comprise a guide that engages with one or more docking structures associated with a rotor. In either configuration, the interaction between the docking structure(s) and the guide(s) can direct the relative motion of the rotor and the stator during the transition from the stowed/storage condition and the gasket sealed/ready for use condition. As a result, it is to be appreciated that the shape of the guiding structure coupled with the relative movement of the rotor—stator will thereby control the manner of gasket engagement with the stator valve surface during the transition. For example, a rotor can be rotated such that the stator guiding structure directs the rotor down to engage with the stator. In various embodiments of this alternative configuration, a rotary valve may comprise 1, 2, 3, 4, 5, 6, 7, 8, 9, 10, or more docking structures. Docking structures can include but are not limited to pins, pegs, posts, nails, hooks, and locks. Docking structures may be used on a rotor or a stator based on specific configurations. Additionally, the rotor-stator relative motion is also controlled by guides. A guide can guide the relative motion such that when a rotor is moved in one direction (e.g., rotationally), the guide also causes relative movement between rotor-stator in another direction (e.g., down or to decrease gasket—stator spacing). Such guidance results in the desired contact between the gasket and the stator. A rotary valve in this configuration can comprise 1, 2, 3, 4, 5, 6, 7, 8, 9, 10, or more guides. Guides can include but are not limited to rails, tracks, slots, and grooves. The guide and docking structure for a rotor—stator combination are complementary.

Additionally and further to the advantageous long term storage capabilities of the rotary valve embodiments described herein, it is to be appreciated that rotary valves having including complementary docking structures and guides as described above may remain engaged in the stowed condition for extended periods of time.

One aspect provides methods of storing a rotary valve, the method comprising: (a) placing the valve as described herein into a storage container; and (b) storing the valve for a period of time. In some implementations, storing the valve comprises maintaining the valve in a storage positon wherein the gasket is spaced apart from at least one of the rotor and the stator. In some implementations, the rotor comprises the gasket and in the storage configuration the gasket is spaced apart from the stator. In some implementations, the stator comprises the gasket and in the storage configuration the gasket is spaced apart from the rotor. The methods can include placing a valve in a storage location, such as within a storage container and/or on a tray or shelf, and then storing the valve device for a period of time. A storage container can include, for example, a bag, a box, such as an open-top box, a plastic mold, or another component having a recess for receiving the valve or a portion thereof. A storage container can also be an intermodal container, which is a ship or train cargo-shipping container, or a room such as a room of a storage facility. A plurality of valves can be stored in the same container.

In various embodiments, the methods include storing, such as storing in a storage location, the valve device for a period of time. The period of time can range, for example, from 1 day to 2 years, such as 10 days to 1 year, such as 30 days to 300 days. The period of time can be 1 day or more, 30 days or more, 90 days or more, 180 days or more, 1 year or more, or 2 years or more. The period of time can also be 1 day or less, 30 days or less, 90 days or less, 180 days or less, 1 year or less, or 2 years or less. The period of time can range, for example, from 1 month to 24 months, such as 10 months to 20 months, such as 12 months to 18 months. The period of time can be 6 months or more, such as 9 months or more, such as 12 months or more. The period of time can also be 6 months or less, 9 months or less, 12 months or less, 15 months or less, 18 months or less, or 24 months or less. In such embodiments, the months are consecutive months.

Some embodiments of a rotary valve described herein provide for long term storage or reliable shelf life. In some aspects, there is provided a structure to maintain a desired spacing between the rotor and the stator during storage. As a result, during storage the rotor and the stator and any intervening gasket are maintained in a spaced apart or non-fluid tight relationship. The transition from storage to ready for use or to establish a fluid tight relationship is accomplished by relative motion between the rotor and stator. FIGS. 8A, 8B illustrate the use of a displaceable spacer 60 such as one or more tabs 61 to maintain the rotor and stator in the stored condition. Stator rotation engages and deflects the tabs thereby allowing sealing between the rotor and the stator. FIGS. 10A-12B detail the configuration and use of a threaded rotor to maintain the storage condition and transition to a fluid seal between rotor and stator. In addition to these configurations and methods, additional configurations and methods may be used to maintain a rotary valve in a storage condition as described herein.

Rotary Valve with Threaded Rotor-Stator Engagement

Figure 10B:
FIG. 10B is a side view of the threaded rotor in FIG. 10A.

In some embodiments of the rotary valve, the storage condition is maintained using a threaded feature between components of the rotary valve. In some embodiments, the threaded relationship exists between a threaded portion of a rotor and another threaded component of the rotary valve. FIGS. 10A, 10B and 10C illustrate perspective, side and cross section views of a rotary valve having a threaded rotor.

Figure 11B:
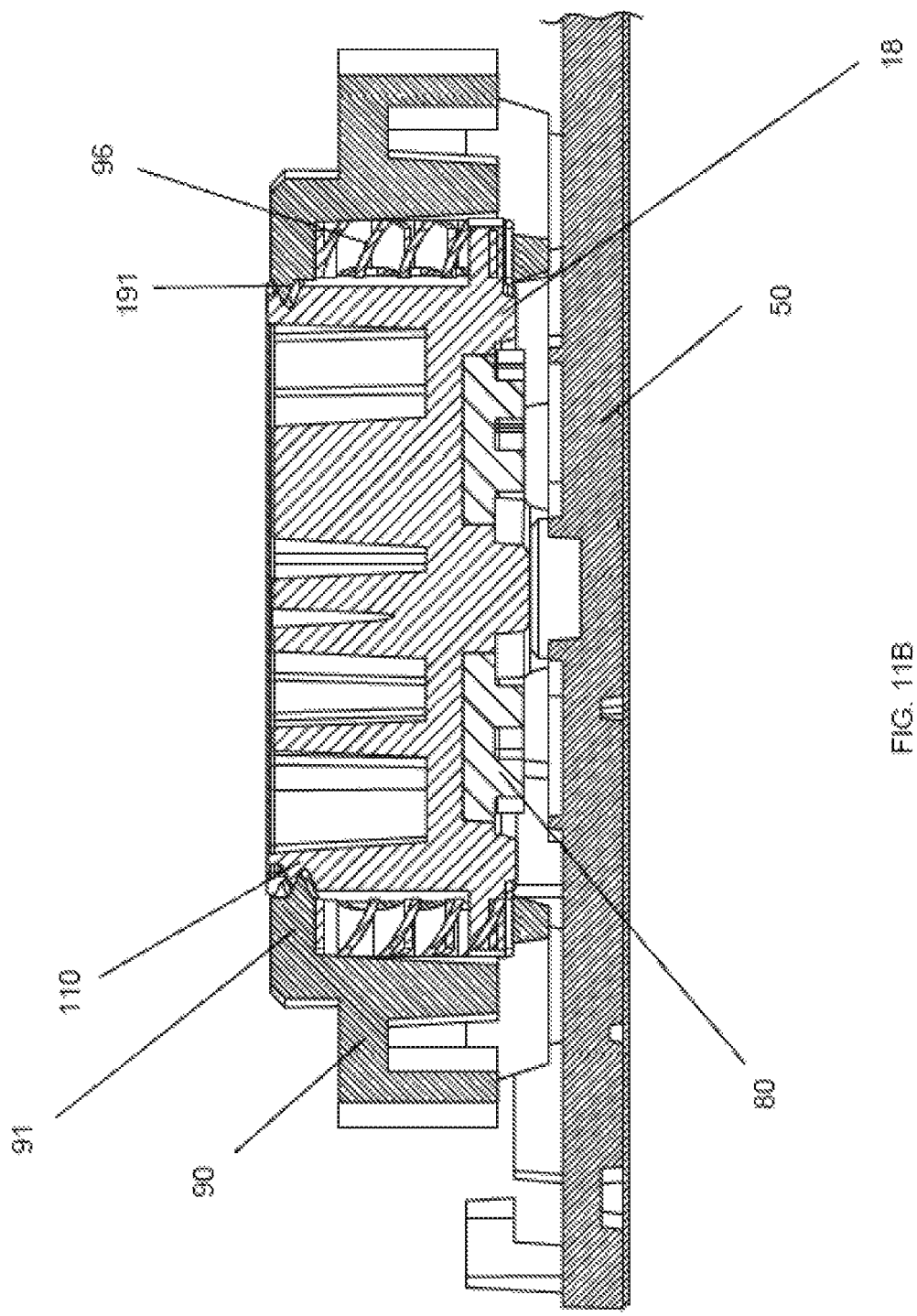
Figure 12A:
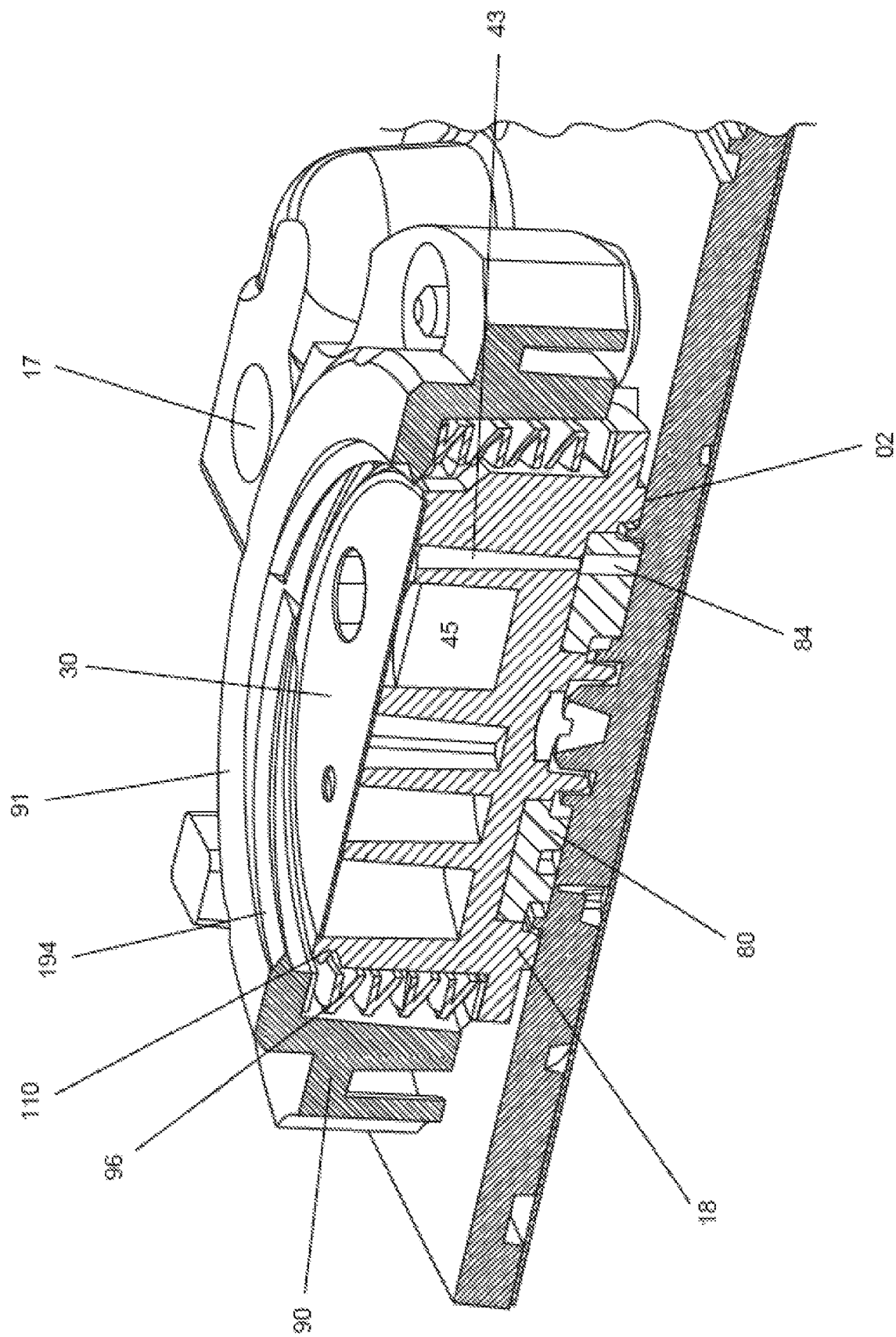
FIGS. 12A and 12B are perspective section and cross section views of the rotary valve of FIGS. 11A and 11B showing the threaded rotor transitioned out of the storage condition and ready for use with a gasket forming a fluid tight seal with the stator.
Figure 12B:
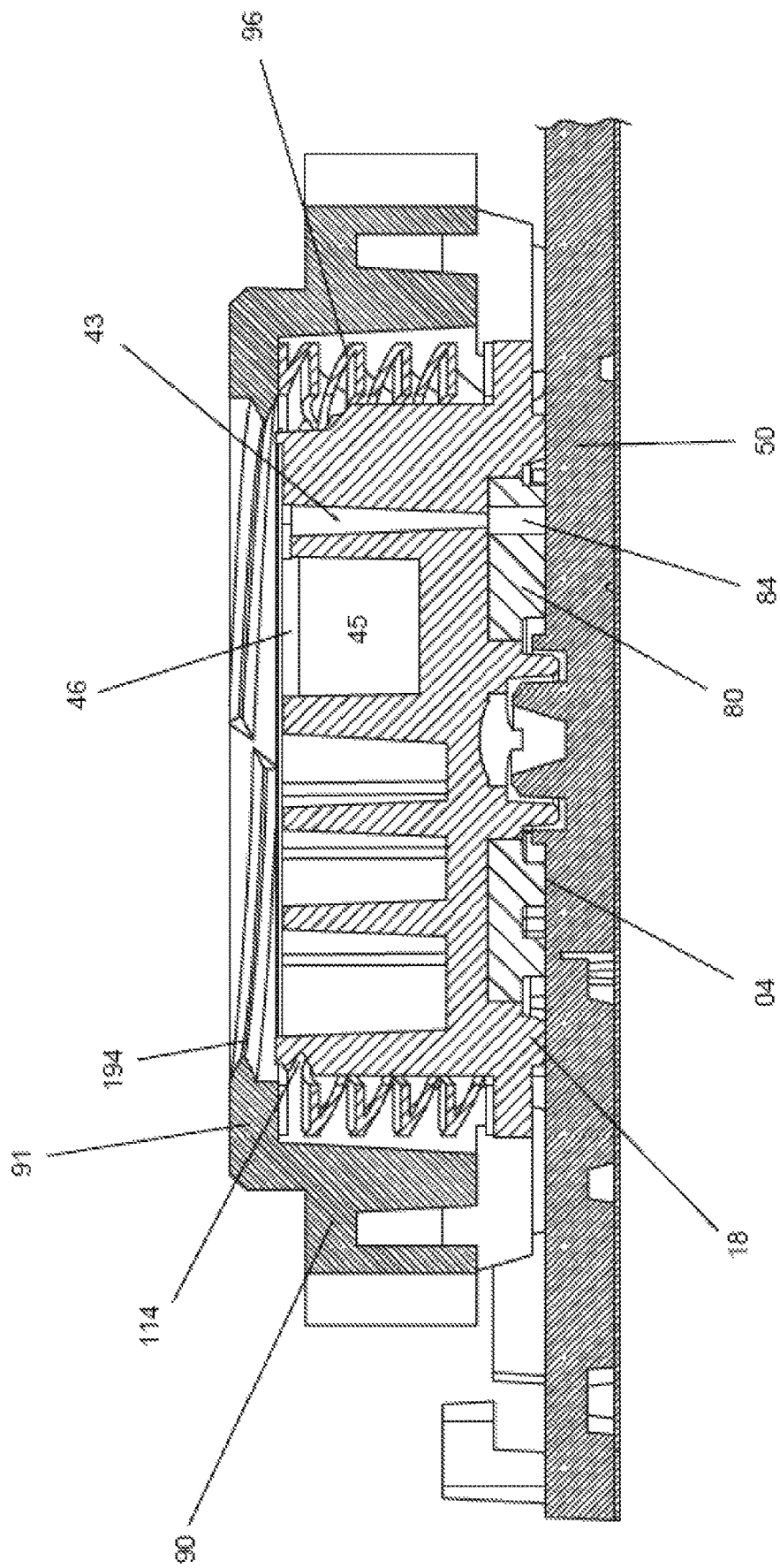

FIGS. 11A, 11B, 12A and 12B illustrate an embodiment of a rotary valve having a threaded engagement between a portion of a rotor 10 and a retention ring 91. FIGS. 11A and 11B illustrate perspective section and cross section view respectively of a threaded rotary valve embodiment in a storage condition. FIGS. 12A and 12B illustrate perspective section and cross section view respectively of the threaded rotary valve embodiment of FIGS. 11A, 11B transitioned out of the storage condition as a result of relative motion between the threaded components. The rotary valve in the various views of FIGS. 11A-12B are similar to the rotary valve of FIG. 4.

As best seen in FIG. 11A, a retention ring 91 includes a threaded portion 191. In the illustrated embodiment, the threaded portion 191 includes threads 194. A rotor 10 includes an outer wall 11 having a threaded portion 110. In the illustrated embodiment, the threaded portion 110 includes grooves 114 that correspond to the threads 194. In the stowed configuration shown in FIGS. 11A and 11B, a biasing element 96 maintains engagement between threads 194 and grooves 114 aiding in maintain the desired gap between the rotor sealing surface (gasket 80) and the stator valving face 52. As best seen in FIG. 11B, the top of rotor cap 30 is substantially flush with an upper surface of retention ring 91 maintaining a low-profile rotary valve design factor. Rotation of the rotor relative to the retention ring 91 moves the rotor towards the stator and into the operational condition shown in FIGS. 12A and 12B. The transition out of the storage condition is clear in this view as the rotor cap is recessed below the top surface of the retention ring and the gasket 80 provides a fluidic seal between the rotor and the stator. Also visible in FIG. 12B it is that the rotor is detached from the threaded portion 194 of the retention ring 91. Movement of the threaded rotor into this position ensures that the rotor is free to be indexed relative to the stator as described herein.

In consideration of FIGS. 11A-12B, there is provided a rotary valve comprising a rotor 10 having a rotational axis 16, a rotor valving face 12, an outer face 13 opposite the rotor valving face. Additionally, there is a stator 50 having a stator valving face 52 positioned opposite the rotor valving face. The rotary valve also includes a retention element 90 biasing the rotor and stator towards one another comprising a retention ring 91 and a biasing element 96. The rotary valve is maintained in a storage condition while a threaded portion of the retention ring is engaged with a threaded portion of the rotor. In one configuration, a relative motion between the rotor and the stator produces a fluid tight arrangement between the rotor valving surface and the stator valving surface or the relative motion between the rotor and the stator is rotation of the rotor so as to move the rotor along the threaded portion of the retention ring until released to seal against the stator. As such, a rotary valve having a threaded rotor used for engagement in a storage condition may be configured to transition to provide a fluid tight seal within the rotary valve with a rotation of less than one revolution, half a revolution, a quarter of a revolution or one-eighth of a revolution of the threaded rotor. Still further, it is to be appreciated that while the threaded components of a threaded rotor rotary valve are engaged a gasket disposed between the rotor valving face and the stator valving face does not form a fluid tight seal with the stator valving surface.

With regard to the various views of the rotary valves of FIGS. 13-16, each one is similarly configured rotary valve to others described herein. Each one relates to a rotary valve having a rotor 10 with an outer face 13 and a rotor valving face 12 opposite the outer face 13. There are a pair of apertures 41, 42 through the rotor valving face 12. The stator 50 has a stator face 52 with a plurality of stator ports 53 in the stator face. Each one of the plurality of stator ports 53 in communication with a fluid passage 54. In addition, in some configurations, there is also a gasket 80 interposed between the stator face 52 and the rotor valving face 12. Within the gasket 80 there are a pair of openings 83 that align with the pair of apertures 41, 42. The gasket is spaced apart from the stator face 52 while in a storage condition and is maintained in fluid tight relation to the stator face by a retention element 90 when released from the storage condition.

Figure 13:
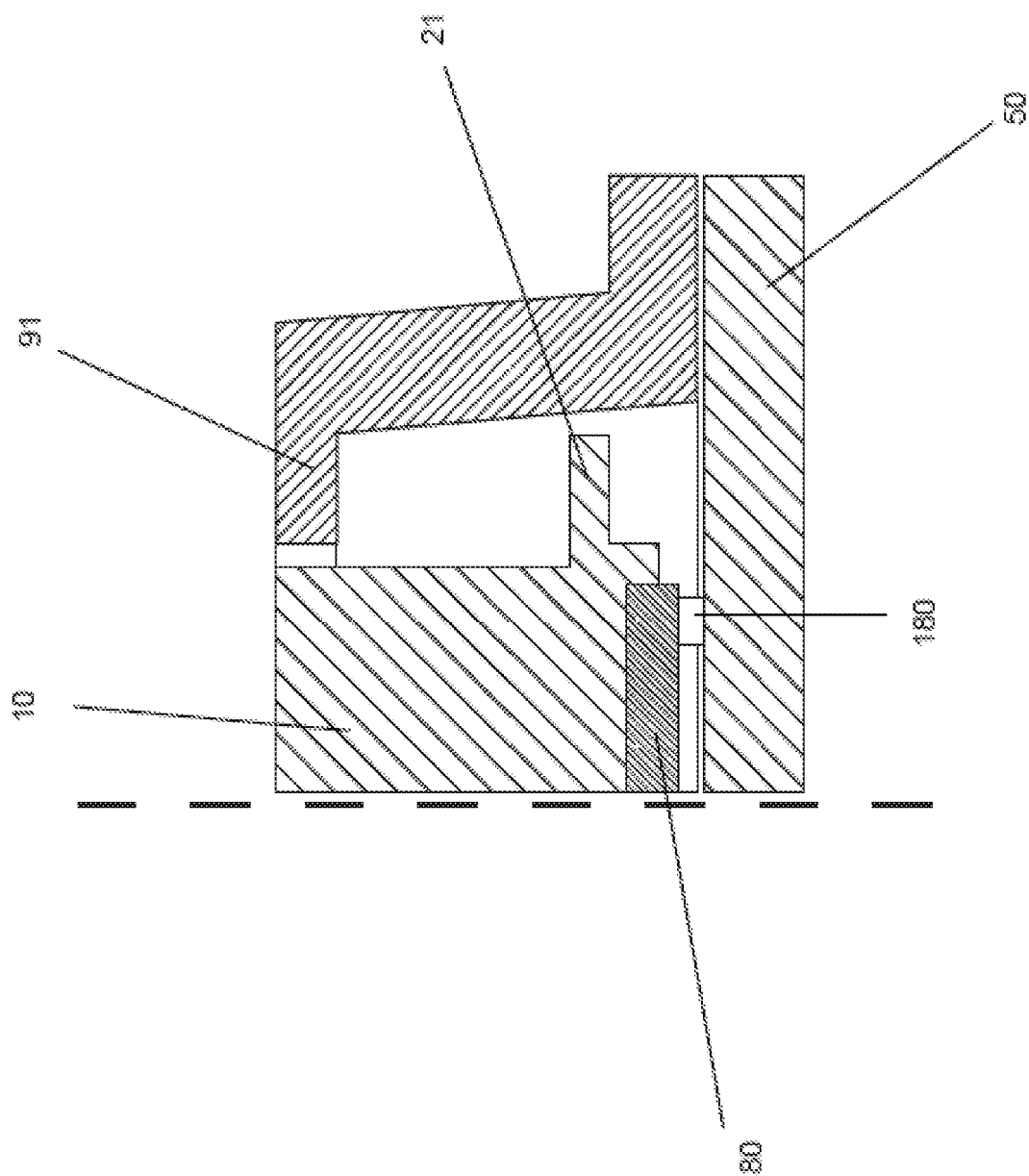
FIG. 13 is a partial cross section view of a rotary valve in a storage condition showing a spacer between a rotor and a stator.

FIG. 13 is a partial cross section view of a rotary valve in a storage condition. In this embodiment, there is a spacer 180 between a rotor and a stator. In one embodiment, the spacer 180 is positioned between the gasket 80 and the stator valving surface. The spacer 180 may be configured as a disc or an o-ring that is formed integral to or is attached to the gasket 80. Additionally, the spacer 180 may be disposed along a gasket sealing face such that the spacer 180 (a) maintains a gap between the gasket sealing face and the stator face and (b) the rotary valve in a storage condition. In one aspect, the rotary valve adapted for use with a spacer 180 is released from the storage condition by relative movement between the rotor and the stator sufficient to displace the spacer to permit engagement between the gasket sealing face and the stator face.

Figure 14A:
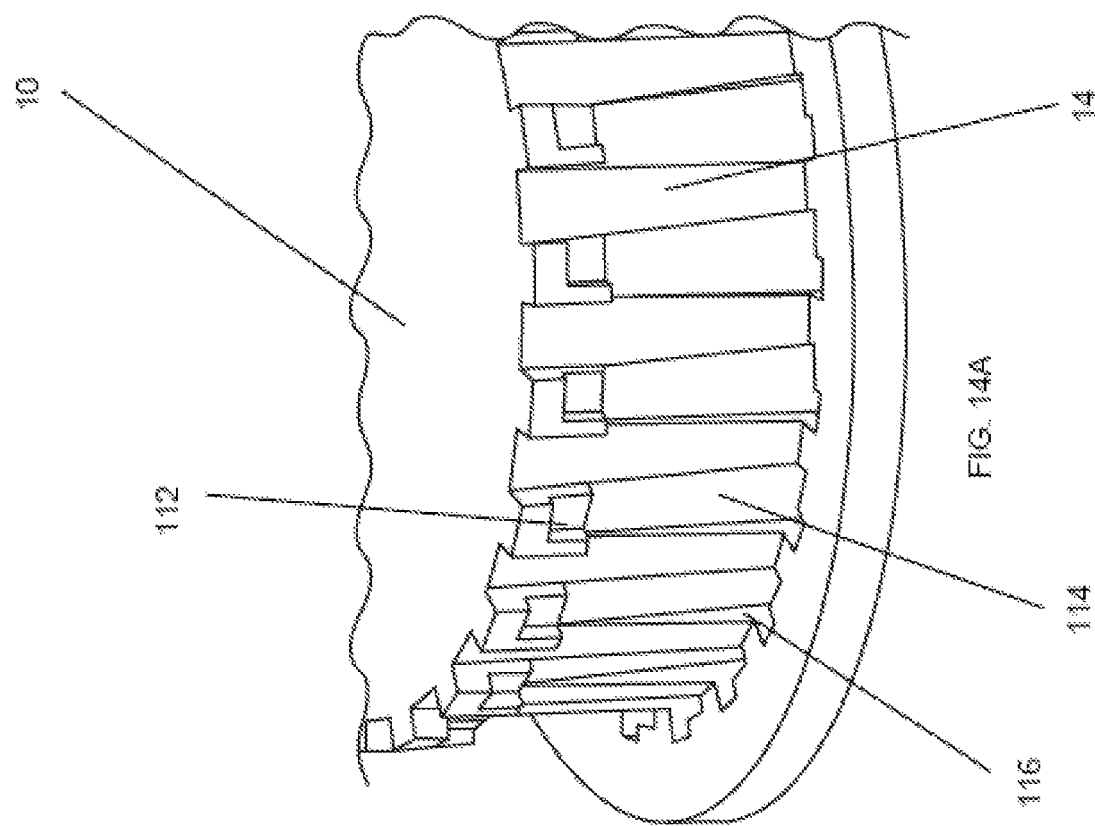
FIGS. 14A and 14B illustrate perspective views of a rotary valve having a notched rotor in a stored condition (FIG. 14A) and sealed/ready for use condition (FIG. 14B).
Figure 14B:
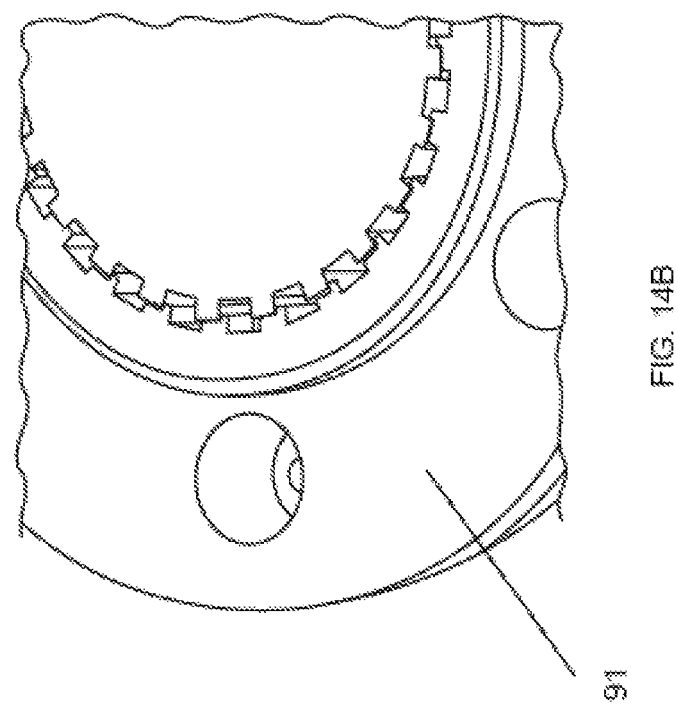

FIGS. 14A and 14B illustrate perspective views of a rotary valve having a notched rotor in a stored condition (FIG. 14A) and sealed/ready for use condition (FIG. 14B). FIG. 14A illustrates the rotor in a stored condition. Arranged around the rotor outer wall 14 are a plurality of notches 112 and sloped features 114. The retaining ring 91 includes corresponding grooves 116 which engage with the rotor outer wall. As shown in the view of FIG. 14A, the rotary valve remains in the storage condition by the engagement between the grooves 116 and a portion of the sloped feature 114. Rotation of the notched rotor results in the rotor transitioning from the storage condition in FIG. 14A to the sealed/ready for use condition shown in FIG. 14B. With regard to this configuration, there is illustrated a retention ring 91 about the rotor 10 and coupled to the stator. The retention ring 91 has a plurality of grooves 116 about a portion of the retention ring adjacent to the rotor 10. Additionally, the rotor is configured to have a plurality of complementary shapes in mating correspondence to the plurality of grooves in the retention ring as is best seen in FIG. 14A. The rotary valve remains in the storage condition as a result of the engagement of the plurality of grooves with the plurality of complementary shapes. The rotary valve is released from the storage condition shown in FIG. 14A by relative movement between the rotor and the retention ring sufficient to disengage the plurality of grooves about a portion of the retention ring from the plurality of complementary shapes in mating correspondence on the rotor. As a result of this relative movement, typically by rotation, the rotary valve transitions to the sealed/ready for use configuration as in FIG. 14B.

Figure 15:
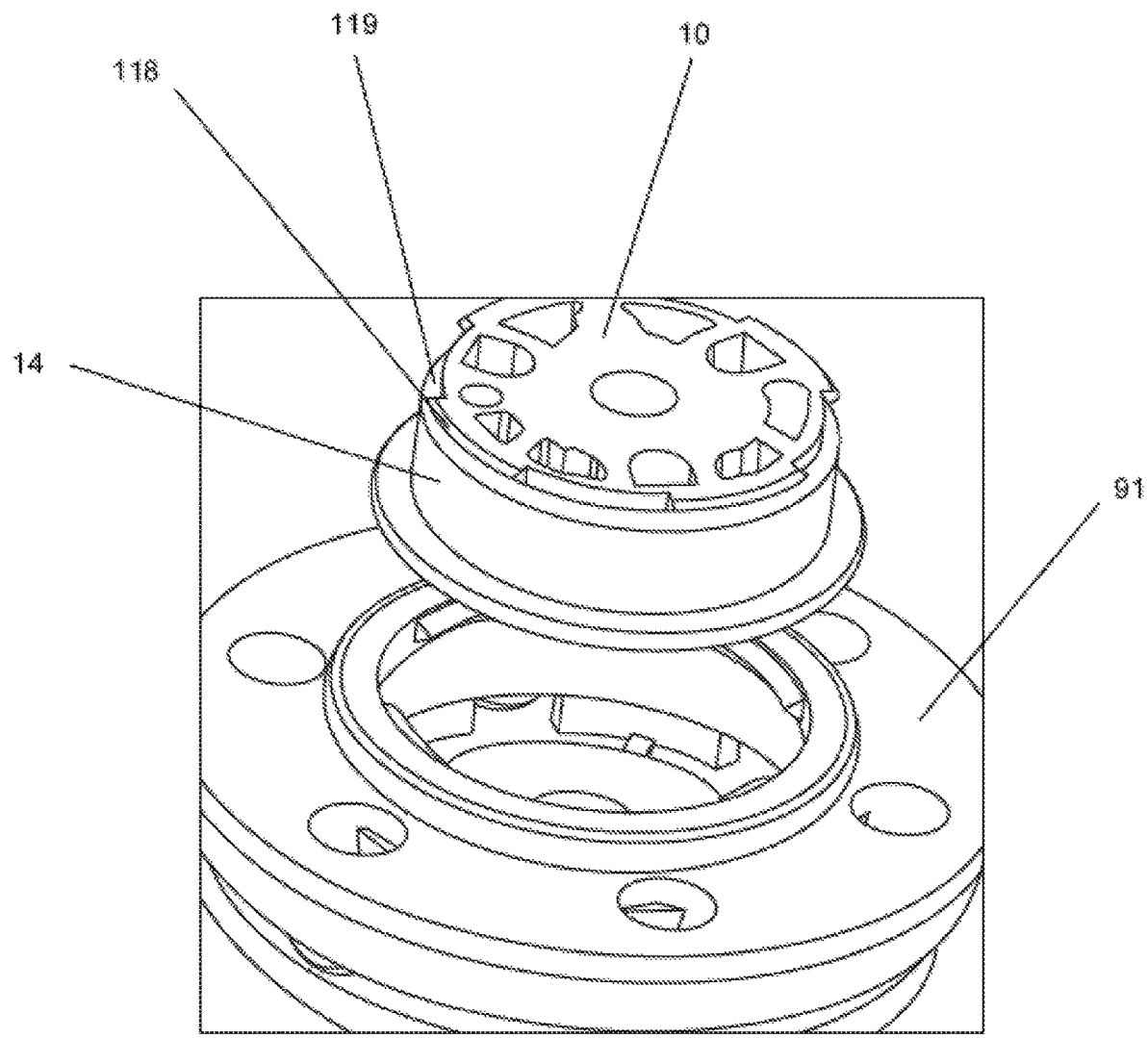
FIG. 15 is an exploded view of a rotary valve with a rotor spaced above and outside of a retaining ring.

FIG. 15 is an exploded view of a rotary valve with a rotor spaced above and outside of a retaining ring. Similar to the threaded cap rotor of FIGS. 11A-12B, the rotor in FIG. 15 engages with complementary threaded sections in the rotor and retaining ring to provide a storage condition and a simple transition out of the storage condition. The rotor 10 includes ridges 118 and spaces 119 along the outer wall 14 adjacent the upper circumference of the rotor. The ridges and spaces together form a complete circumference about the rotor. In this embodiment there are pairs of ridges 118 and spaces 119 which are across from each other as shown. A similar configuration exists on the retention ring 91. The retention ring 91 includes a complementary ridge 195 and space that correspond to those on the rotor. When in a storage condition, the rotor ridge 118 is engaged with the retention ring ridge 195 to maintain a spacing between the rotor and the stator. Rotation of the rotor by a quarter of a turn will move the rotor ridge 118 into a gap in the retention ring and the rotor will drop into a sealed condition and be ready for use. As such, these embodiments relate to a rotary valve having a retention ring about the rotor and coupled to the stator. The retention ring has a pair of arcuate shapes along a surface adjacent to the rotor and the rotor has a pair of complementary accurate shapes corresponding to the pair of accurate shapes in the retention ring. The storage condition for this rotary valve is maintained during engagement between the pair of arcuate shapes with the pair of complementary arcuate shapes of the rotor and retention ring. A rotary valve configured as in FIG. 15 is released from the storage condition by relative movement between the rotor and the retention ring sufficient to disengage the pair of arcuate shapes along the surface adjacent to the rotor from the pair of complementary accurate shapes on the rotor.

Figure 16:
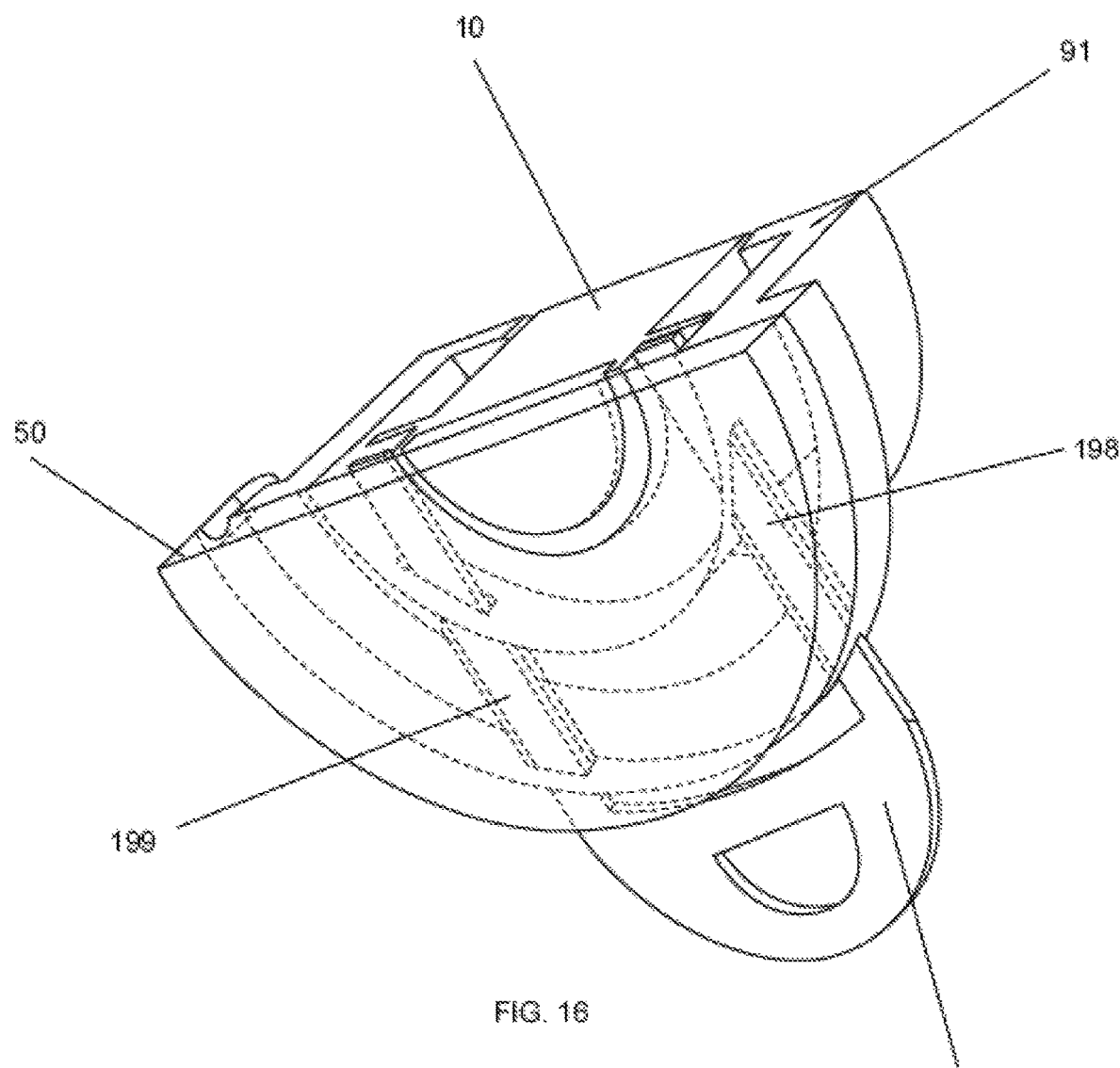
FIG. 16 is a bottom up, sectioned view of a clip used to maintain a rotary valve in a storage condition. The clip includes a pair of prongs shown in a position within the rotary valve to maintain the desired gap between the stator and the rotor.

FIG. 16 is a bottom up, sectioned view of a clip used to maintain a rotary valve in a storage condition. The clip 197 includes a pair of prongs 198, 199 that are positioned within the rotary valve to maintain the desired gap between the stator and the rotor. As is shown in FIG. 16 the rotary valve includes a clip 197 engaged with the rotary valve to maintain a gap between the gasket sealing face and the stator face. Portions of the rotary valve supported by the prongs 198, 199 maintain this rotary valve embodiment in a storage condition. The rotary valve of FIG. 16 is released from the storage condition when the clip 197 is removed. Removal of the clip 197 allows the retention element to move the gasket into a fluid tight relation to the stator face.

FIGS. 17A-17E and 18A-C provide various alternative configurations for flow channel spacers within the solid support chamber 46. The fluid flow within the chamber 46 depends upon a number of factors such as the type of solid support 45 and the function being performed in the chamber 46 or overall functionality of an embodiment of a rotary valve. Flow channel spacers may aid in ensuring fluid flow through the chamber 46 as well as through and about a solid support 45 within a chamber 46. As such, an array of different flow channel spacer configurations may be advantageously employed to enhance rotary valve functionality and performance.

FIG. 3B illustrates one version of a flow channel spacer 49 configured as a structure raised above the bottom 39 of the solid support chamber 46. The bottom 39 in this embodiment is flat but sloped chamber bottoms may be used in other configurations as described herein. The flow channel spacer 49 in this embodiment has an arcuate shape corresponding to the general curvature of the interior walls of solid support chamber 46. The flow channel spacer 49 is separated from both the walls of the chamber 46 as well as the exit 48 from the chamber 46. Other flow channel spacer shapes, orientations and within chamber configurations are possible. Illustrious flow channel spacer variations include: (a) a flow channel spacer may be segmented rather than a continuous structure; (b) a flow channel spacer may include more than one structure along a surface of the solid support chamber such as a sidewall or bottom 39; (c) a flow channel spacer may be spaced apart from the chamber exit 48 or terminate at the edge of the exit 48; and (d) a flow channel spacer may be raised above a chamber interior surface such as a bottom or a sidewall, recessed into a chamber interior surface such as a bottom or a sidewall. These and other flow channel spacer 49 and chamber 46 configurations—including various combinations of one or more embodiments—are further described in FIGS. 17A-18C.

Figure 17A:
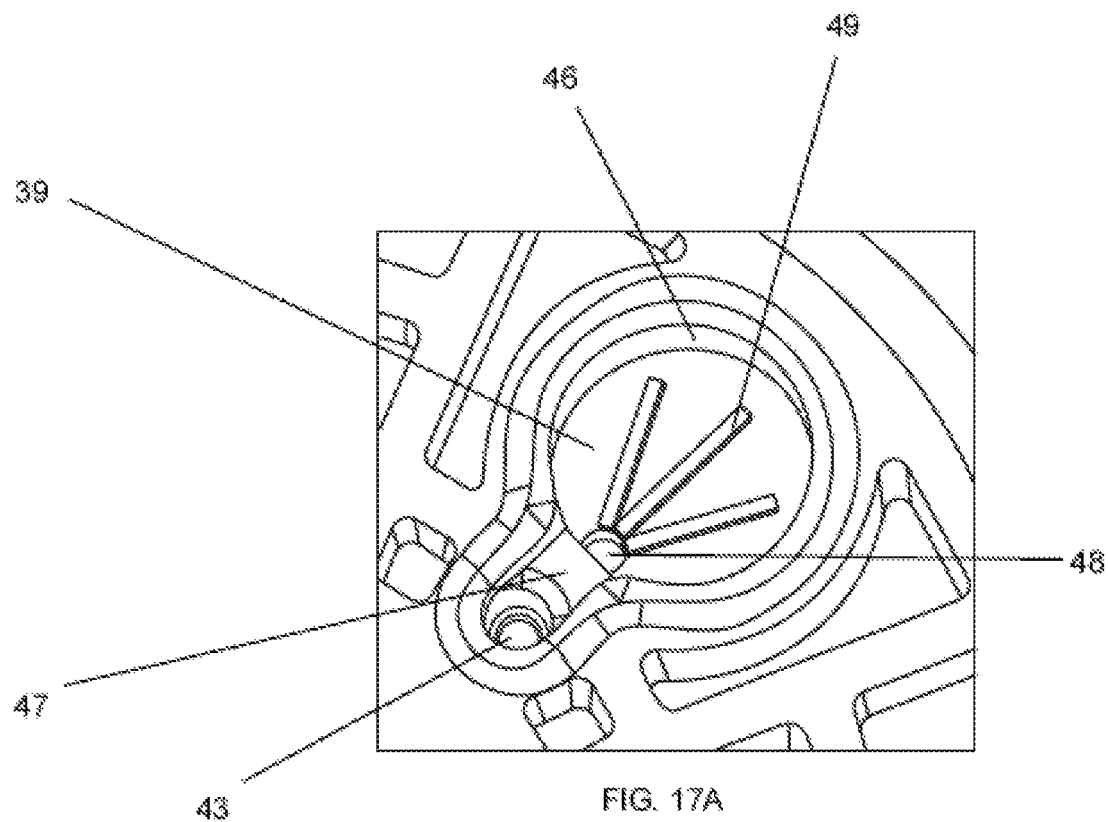
FIGS. 17A and 17E provide top down isometric views of alternative configurations for flow channel spacers within the solid support chamber.
Figure 17E:
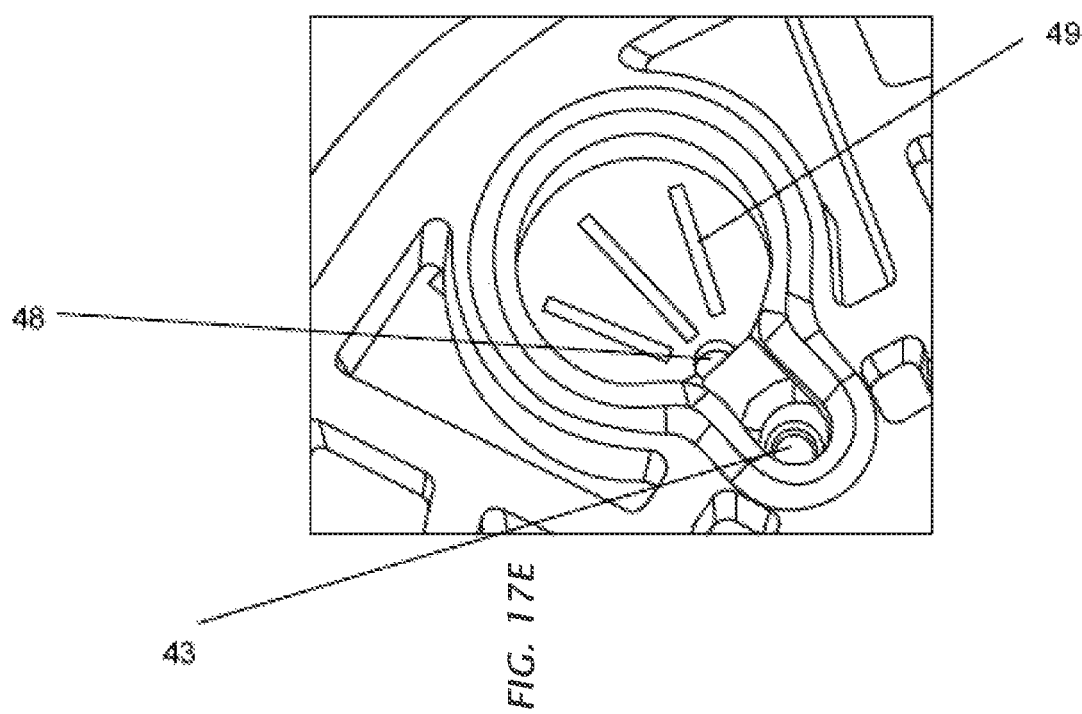
Figure 17B:
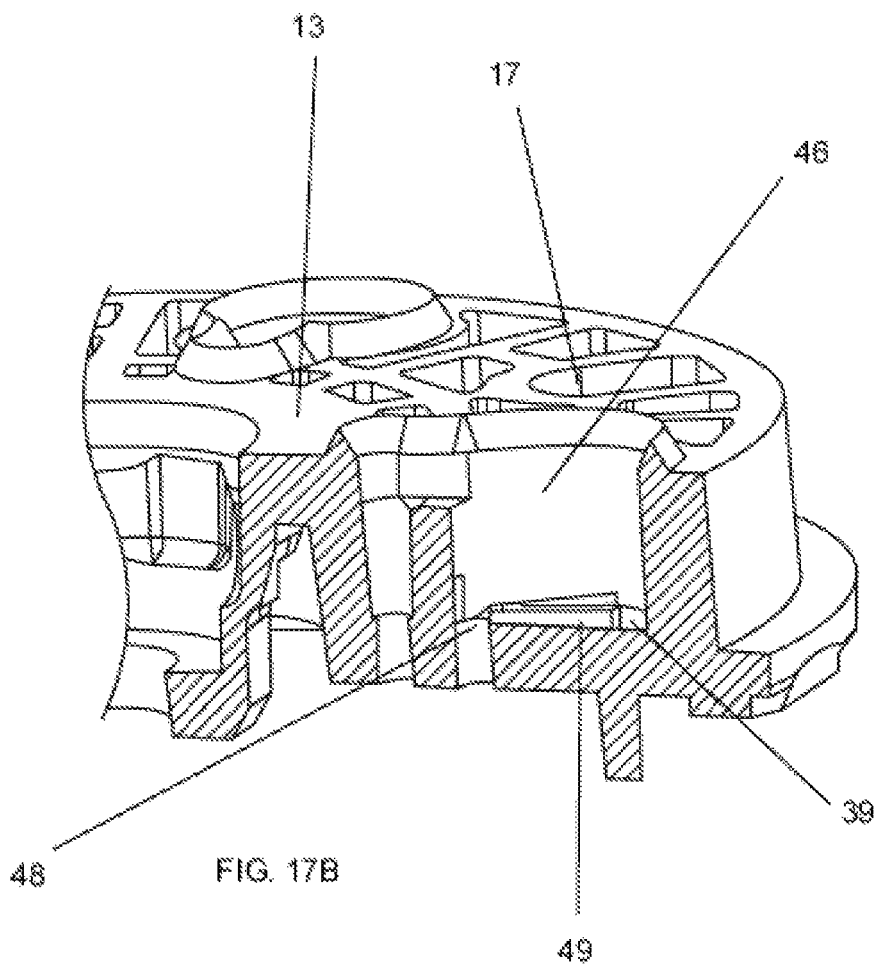
FIG. 17B is a cross section view of the solid support chamber with the flow channel spacer of FIG. 17A.

FIGS. 17A-17E illustrate views of a flow chamber 46 having a plurality of flow channel spacers 49 arrayed about the support chamber exit 48. FIG. 17A is a top down view of a solid support chamber 46 as shown in FIG. 3B having three raised flow channel spacers 49 arranged in a radial pattern about the support chamber exit 48. Each of the flow channel spacers 49 initiates at the support chamber exit 48, extends along the chamber bottom 39 and terminates before reaching the sidewall of chamber 46. FIG. 17B is a cross-section view of the solid support chamber 46 of FIG. 17A.

Figure 17C:
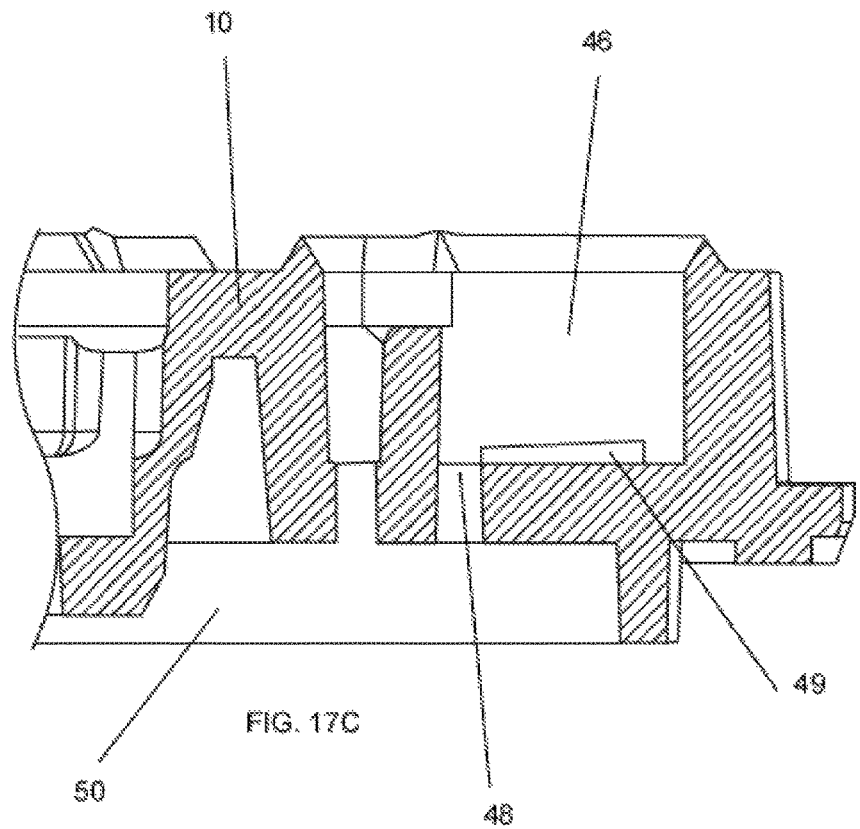
FIGS. 17C and 17D are cross section views of the solid support chamber having a flat bottom (FIG. 17C) or a sloped bottom (FIG. 17D) having a tapered or wedge shaped flow channel spacer thereon.
Figure 17D:
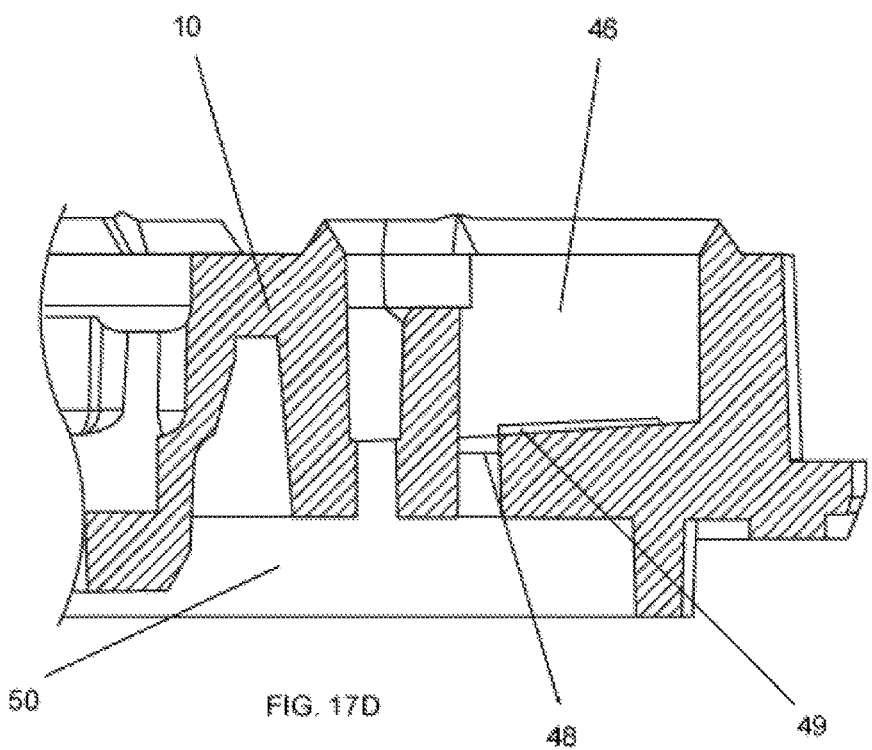
Figure 18A:
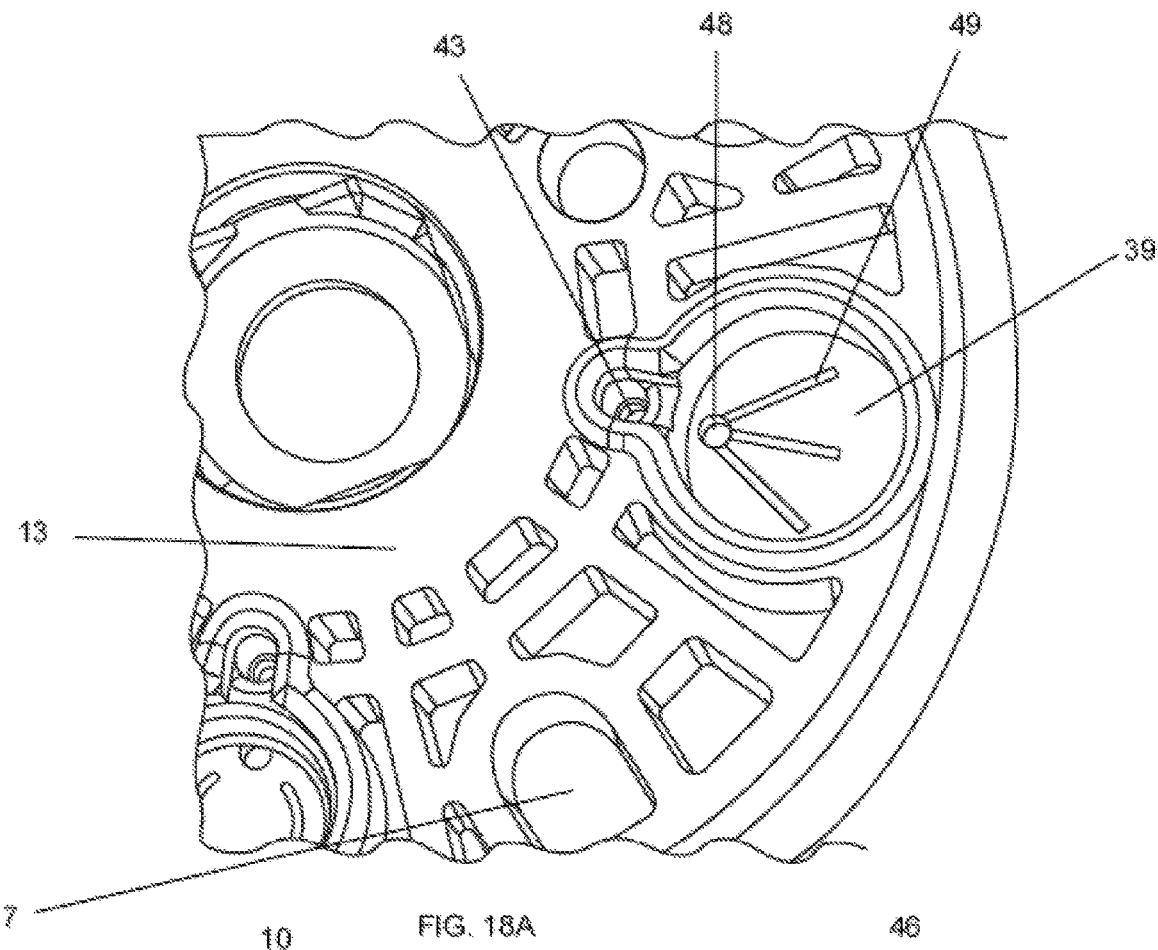
FIGS. 18A-18C illustrate top, cross section views, respectively of a flow chamber having a plurality of flow channel spacers arrayed about the support chamber exit similar to those described above with regard to FIGS. 17A-17D but are recessed into the bottom of the support chamber.

This view makes clear that the chamber bottom 39 is flat and that the flow channel spacer 49 is aligned with the flow channel exit 48 and ends so as to have a spacing to the chamber sidewall. FIG. 17C is a cross section view of the solid support chamber 46 similar to FIG. 17B. Like FIG. 17C, the embodiment of the flow channel spacer 49 in FIG. 17C illustrates that the chamber bottom 39 is flat and that the flow channel spacer 49 is aligned with the flow channel exit 48 and ends so as to have a spacing to the chamber sidewall. FIG. 17C illustrates a sloped or wedge shaped flow channel spacer 49. In this embodiment, a wedged or sloped flow channel spacer is used in combination with a chamber bottom 39 that is flat. In this embodiment, the flow channel spacer 49 has a height above the chamber bottom 39 that is smaller closer to the chamber exit 48 and larger height away from the chamber exit 48. FIG. 17D is a cross section view similar to FIGS. 17B and 17C in that the flow channel spacer 49 is aligned with the flow channel exit 48 and ends so as to have a spacing to the chamber sidewall. FIG. 17D illustrates a sloped chamber bottom 39. The sloped chamber bottom 39 may be used alone, as in without any flow channel spacer 49, or with any flow channel spacer embodiment described herein. In the illustrative embodiment of FIG. 17D, the sloped chamber bottom 39 is used in conjunction with a sloped or wedge shaped flow channel spacer 49. In contrast to the sloped or wedge shaped flow channel spacer of FIG. 17C, the flow channel spacer embodiment illustrated in FIG. 17D is sloped to have a greater height adjacent to the chamber exit 48 and a smaller height nearest to the side wall. In one aspect, as is clear from the cross section views of FIGS. 17C and 17D, a flow channel spacer 49 may appear in cross section as a rectangle (FIG. 17B), a triangle (FIG. 17D) or a trapezoid (FIG. 17C). FIG. 17E illustrates a top down view of a solid support chamber 46 having a plurality of flow channel spacers 49 similar to those in FIG. 17A in that the flow channel spacers are along the chamber bottom 39 and arrayed about the chamber exit 48 and spaced apart from the chamber sidewall. The flow channel spacer 49 embodiment in FIG. 17E illustrates the position of the flow channel spacer that is spaced apart from both the chamber sidewall and the chamber exit 48. The flow channel spacers 49 shown in this configuration may also be modified into other configurations as described above with regard to FIGS. 17A-17D.

Figure 18B:
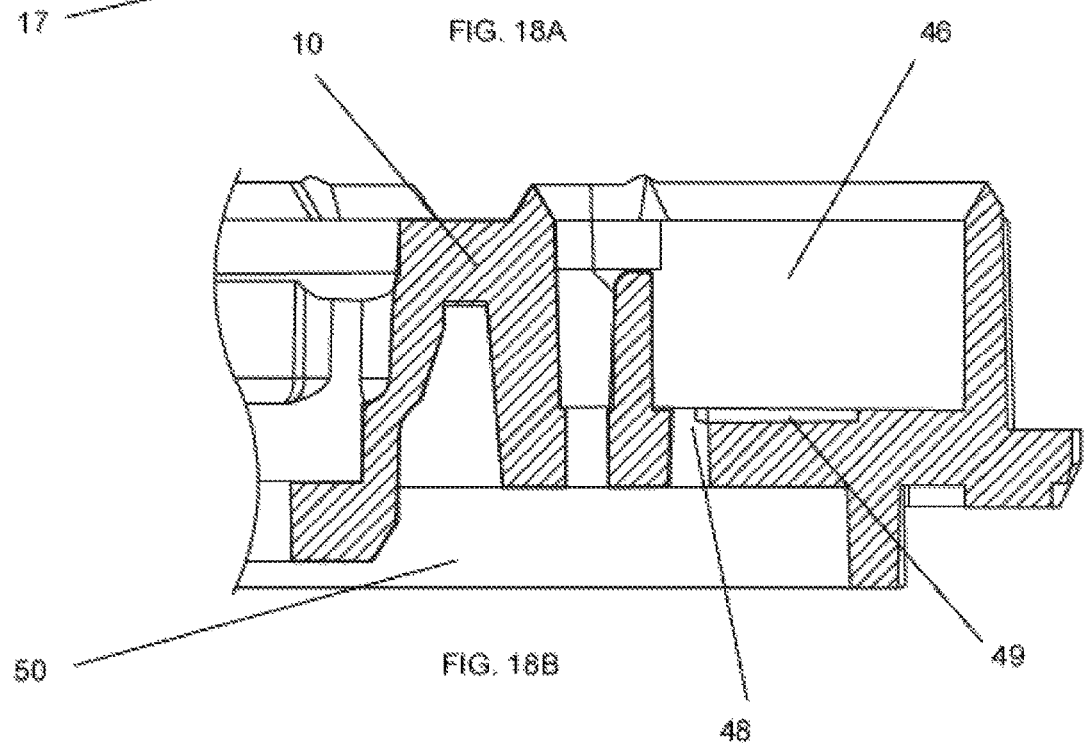
Figure 18C:
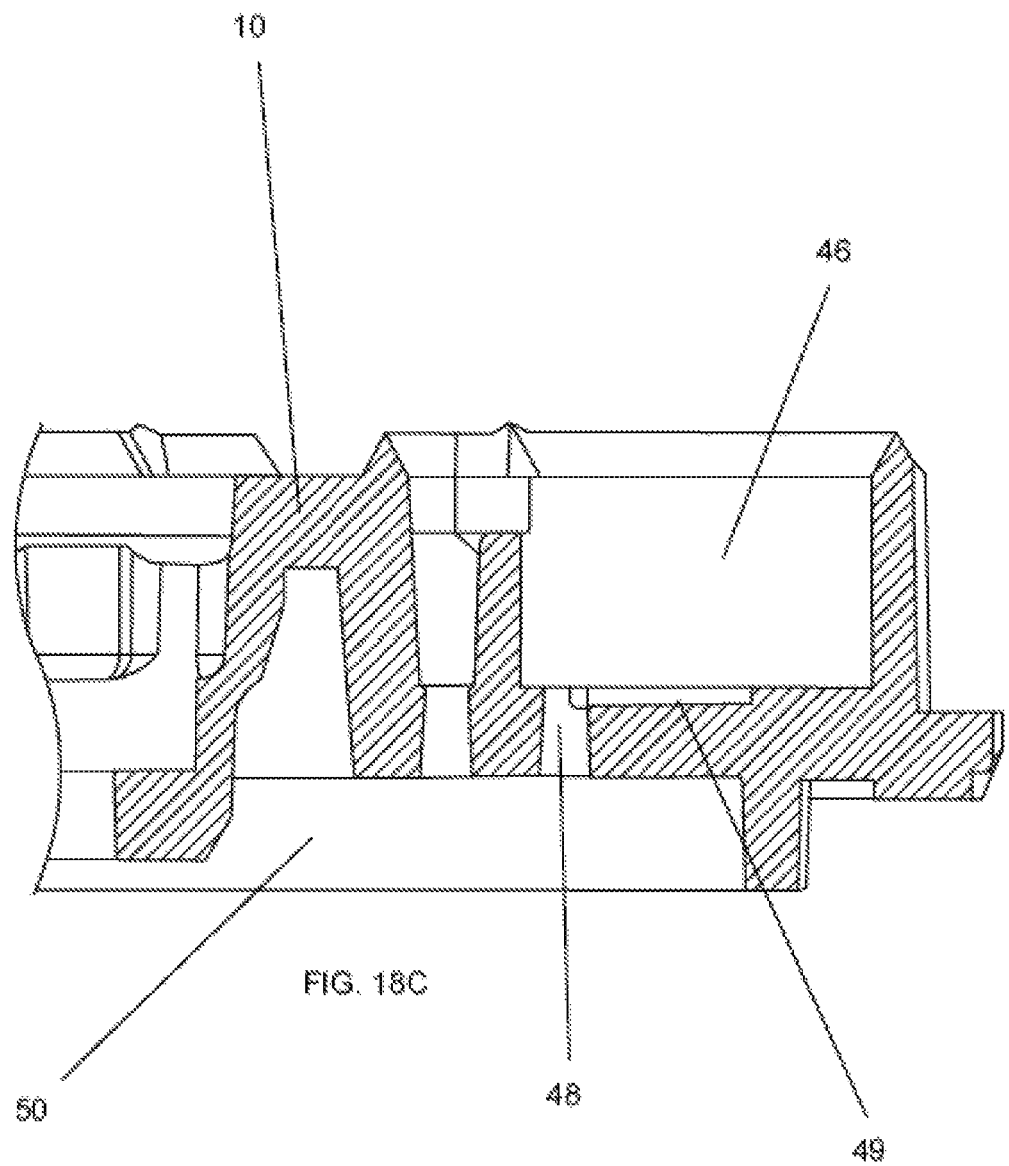

FIGS. 18A-18C illustrate views of a flow chamber 46 having a plurality of flow channel spacers 49 arrayed about the support chamber exit 48 similar to those described above with regard to FIGS. 17A-17D in being directly adjacent to the chamber exit 48 and end spaced apart for the chamber sidewall. The embodiments of FIGS. 18A-18C illustrate a flow channel spacer 49 that is recessed into the chamber bottom 39. FIG. 18A is a top down view of the recessed flow channel spacers 49 adjacent to the chamber exit 48. FIG. 18B is a cross section view of the support chamber 48 in FIG. 18A. The view of FIG. 18B illustrates the flat bottom of the flow channel spacer 49. In an alternative to the flat bottom recessed flow channel spacer of FIG. 18B, FIG. 18C is a cross section view of a support chamber 46 having a recessed flow channel spacer that slopes or is wedge shaped. In the illustrated embodiment, the sloped recessed flow channel spacer is deeper closer to the chamber exit 48 and shallower it approaches the chamber sidewall. In other alternative embodiments, the recessed flow channel spacer is configured similar to the various embodiments of slope, shape, flat chamber bottom and sloped chamber bottom as described in relation to FIGS. 17A-17D or may optionally be spaced apart from the chamber exit 48 as in FIG. 17E.

As will be appreciated from the above disclosure, the use of flow channel spacers in rotary valve embodiments provides a wide assortment of support chamber 46 configurations to accommodate a wide array of different possible solid support 45 embodiments as well as the desire for robust rotary valve functionality. Accordingly, a solid support chamber 46 may have a flat or a sloped chamber bottom 39 without any flow channel support. A flat chamber bottom 39 without flow channel support is illustrated in FIG. 4. In such configurations, the solid support 45 rests on the flat or sloped chamber bottom 39. Optionally, a solid support chamber 46 may include one or more flow channel spacers 49 as illustrated and described in FIGS. 3A, 3B 17A-18C. Additionally or optionally, various flow channel spacer embodiments may be raised above or recessed into a flat or sloped chamber bottom 39. Furthermore, it is to be appreciated that these various different support chamber and flow channel spacer combinations may be further combined to enhance rotary valve operations and functionality. In a rotary valve having more two, three, four or more solid support chambers 46, each one of the support chambers may have a unique configuration of the above elements of chamber bottom and flow channel spacer characteristics. In other words, each one of the solid support chambers along with its corresponding flow channel 40 may be configured based on the overall rotary valve functionality. FIG. 18A provides an exemplary embodiment of one such combination where one solid support chamber 46 includes a raised accurate flow channel spacer 49 while another chamber 46 illustrates an array of recessed flow channel spacers 49. It is to be appreciated that all of the various variations of flow channel spacer, solid support chamber and support chamber bottom describe herein may be combined and modified as needed based on the type of solid support 45 used and the overall rotary valve function and performance.

Rotary Valve Operation Examples

The table in FIG. 19 depicts one series of sample processing steps that can be used to prepare a biological sample for analysis with a biological assay using rotary valve 00 of FIGS. 1B-1C. A valving sequence using rotary valve 00 with gasket 80, configuration shown in FIG. 7B1, is depicted in FIGS. 20A-30C. The following example illustrates a variety different functions that can be performed by each aperture shape formed within the gasket to establish fluidic communication between different ports 53 on the stator 50. The larger strip of area in the following figure 171 represents the total rotor-stator interface, while the smaller rectangles positioned within the strip 172 represent locations along the stator face 52 capable of supporting a port 53. Circles over the smaller rectangles 173 represent the locations of actual ports present in the stator 50. All other shapes located over the strip represent gasket features, as depicted in FIG. 7B1 use corresponding reference number designations. These various gasket features are used to provide a wide assortment of fluidic communication with ports 43 on the stator 50 as will be made clear in the description that follows.

| Step | Position |
|---|---|
| 0 | Storage |
| 1 | Home |
| 2 | Sample Loading |
| 3 | Lysis/Mixing |
| 4 | Sample Binding to Matrix |

| Step | Position |
|------|----------|
| 5 | Matrix Wash |
| 6 | Matrix Drying |
| 7 | Analyte Elution |
| 8 | Reagent Mixing - 1 |
| 9 | Reagent Mixing - 2 |
| 10 | Amplification Well Filling |

In FIGS. 20 to 30 the following designations will be used. Figures labeled with an "A" depict the rotor-stator interface available for use during a valving sequence, viewed as if the circumference of the rotor-stator interface were unwound to form a straight line. Figures labeled with a "B" depict the rotor-stator interface available for use during a valving sequence as viewed from the rotor outer face 13. Figures labeled with a "C" depict which ports are pressurized and to what measurement.

FIGS. 20A-B shows a rotary valve in its storage configuration, wherein the gasket 80 is prevented from sealing against at least one of the rotor 10 or stator 50. FIG. 20C indicates that no pressure is applied and all pneumatic sources P1-P4 are opened to vent.

FIGS. 21A-B show the rotary valve as it is first indexed from a storage configuration to an operational configuration to form a fluid tight seal between the stator 50 and rotor 10. The fluid tight seal is a result of the gasket, depicted in FIG. 7B1, being compressed between the stator face 52 and the rotor valving face 12. As seen in FIG. 21C, no pressure is applied to the system and all pneumatic sources are blocked in this home position.

Figure 22C:
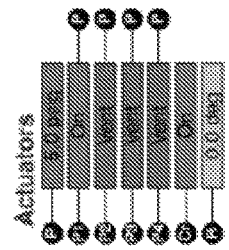
Figure 22B:
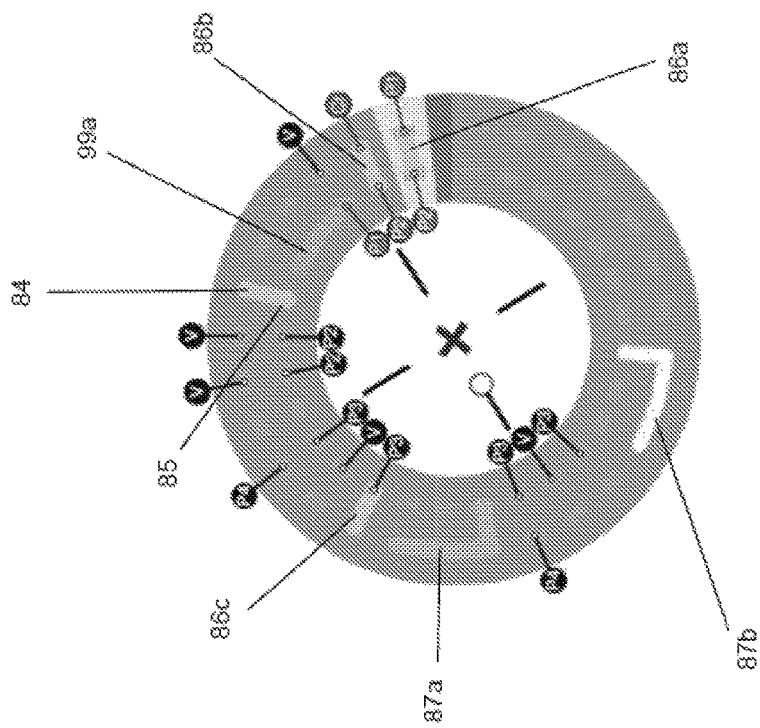
Figure 22A:
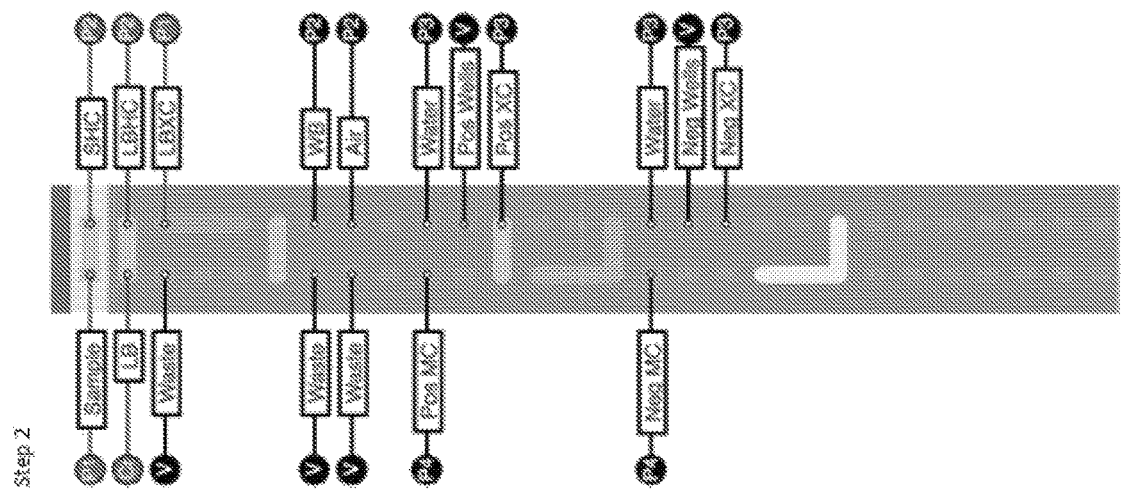

FIGS. 22A-B represents when the rotary valve is indexed to load a biological sample and lysis buffer. Pneumatic source P1 is pressurized to flow a sample via a first connector groove 86a from the sample port to the sample holding chamber (SHC) port. The first connector groove 86a allows a port located at a larger radial distance to fluidically communicate with another port located at a smaller radial distance along the same radial line. The first connector groove 86a enables the redirection of sample across the stator 50. Similarly, source Cr is pressurized to flow lysis buffer via a second connector groove 86b from its source (LB) to the lysis buffer holding chamber. The second connector groove 86b connects the lysis buffer port with the lysis buffer holding chamber (LBHC) port, located at two different distances along the same radial line, in the stator 50. For ports not actively communicating with gasket apertures (i.e., the wash buffer port and waste port), the gasket 80 seals against all ports not actively being currently used. Only ports which are actively communicating with gasket apertures can move fluid between port to port in the stator 50. FIG. 22C shows pneumatic source P1 and Cr are on and pressurized to 5.0 psig.

FIGS. 23A-B illustrates the rotary valve in its lysis/mixing position. Pneumatic source P2 is pressurized to flow the sample from the sample holding chamber and the lysis buffer from the lysis buffer holding chamber into the lysis mixing chamber. A radial connector groove 99a is used to connect the sample holding port, lysis buffer holding port, and lysis mixing chamber port together. The radial connector groove 99a allows multiple ports in the stator 50 along one radial distance, but along different radial lines, to fluidically communicate among one another. This allows the sample and lysis buffer to flow under pressure from their respective holding chambers through the lysis mixing chamber port and into the mixing chamber (LB XC). FIG. 23C shows that pneumatic source P2 is on and pressurized to 5.0 psig. Pneumatic sources P1, P3, and P4 are venting to atmosphere, while pneumatic source Cr is blocked.

Figure 24A:
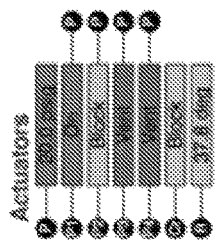
Figure 24B:
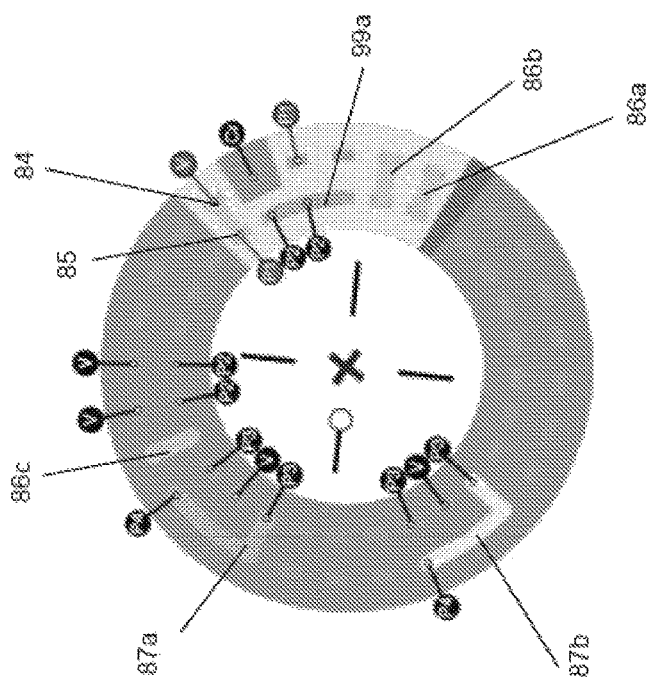
Figure 24C:
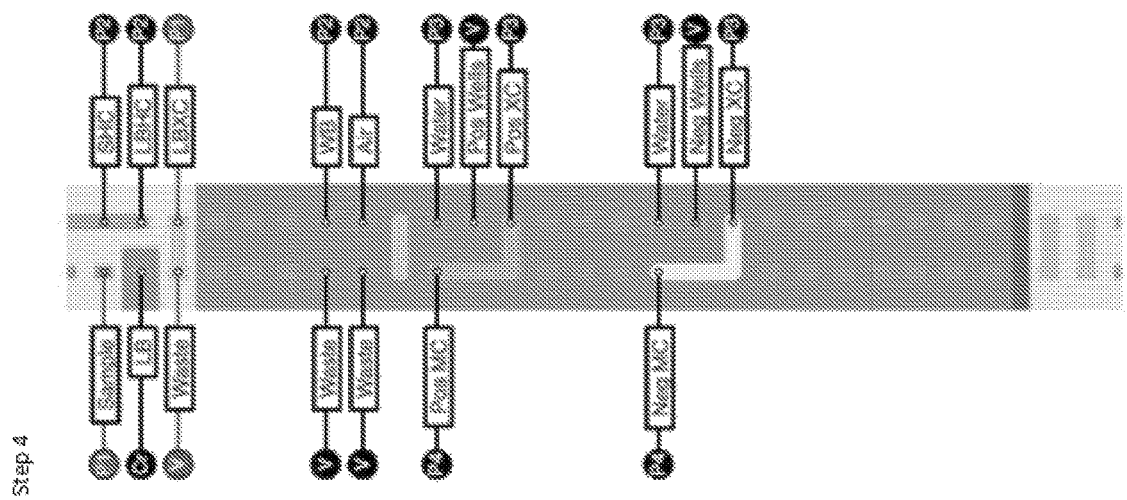

FIGS. 24A-B illustrate the rotor in position to load lysed sample onto the matrix. Pneumatic source P1 is pressurized to push the lysed sample from the lysis mixing chamber (LBXC) through the lysis mixing chamber port aligned with gasket inlet 84. As the lysed sample ipasses through the porous solid support 45 in the solid support chamber 46. Target analyte is bound to the porous solid support 45, while the remainder of the lysed sample, e.g. cell debris, travels out of the flow chamber outlet, through the gasket outlet 85 and is directed to a waste collection element ("waste") by a waste port located in stator 50. FIG. 24C shows that pneumatic source P1 is pressurized to 20.0 psig. Pneumatic sources P2 and Cr are blocked. Pneumatic sources P3 and P4 are venting to atmosphere.

FIGS. 25A-B illustrates the rotary valve in its matrix washing position. The rotor has moved to connect the wash buffer (WB) port with a waste port via the flow chamber holding the matrix, which previously was loaded with the target analyte. The pneumatic source is changed from P1 to P2 to push wash buffer through the wash buffer port aligned with gasket inlet 84. Wash buffer flows over the porous solid support 45 to remove undesired contaminants, while target analyte remains bound to the porous solid support 45. The wash buffer carrying contaminants travels out of the flow chamber outlet, through the gasket outlet 85 and is directed to a waste collection element by a waste port located in stator 50. FIG. 25C shows that pneumatic source P2 is pressurized to 20.0 psig. Pneumatic sources P1 and Cr are blocked, and pneumatic sources P3 and P4 are venting to atmosphere.

Figure 26C:
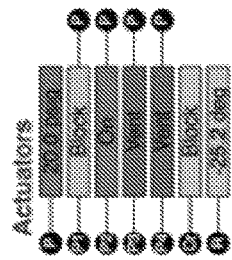
Figure 26B:
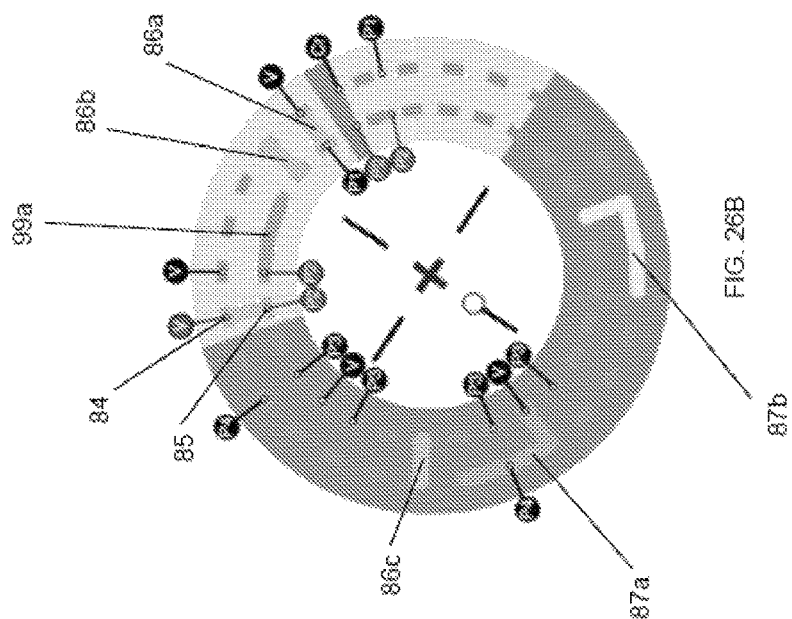
Figure 26A:
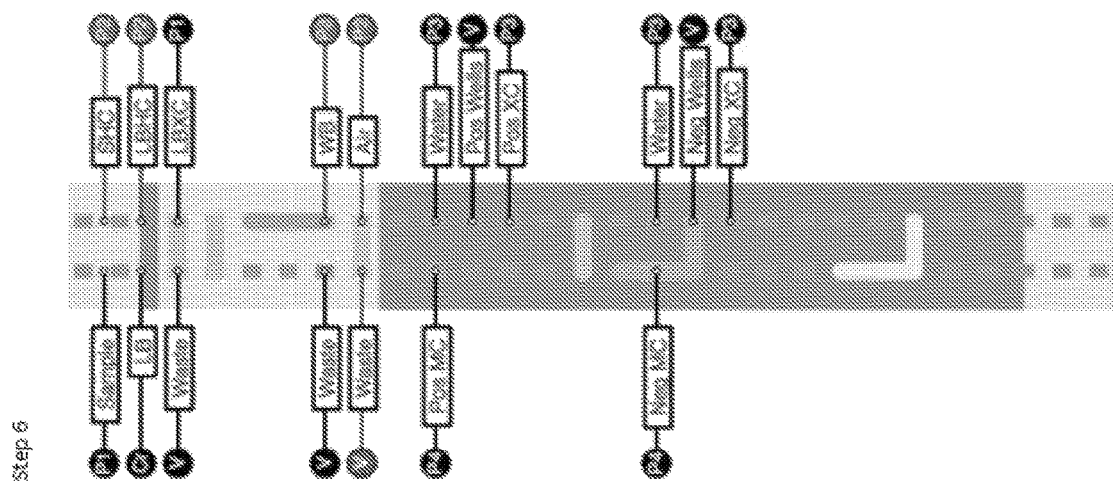

FIGS. 26A-B shows when the rotary valve 10 is indexed in a matrix drying position. An air-drying step is applied to the porous solid support 45 to remove residual wash buffer from the solid support chamber 46. Pneumatic pressure source P2 is applied to the air port through gasket inlet 84. Air passing through the solid support chamber 46 then exits out of the flow chamber outlet, through the gasket outlet 85 and is directed to a waste collection element by a waste port located in stator 50. FIG. 26C shows that once again, pneumatic source P2 is pressurized to 20.0 psig. Pneumatic sources P1 and Cr are blocked, and pneumatic sources P3 and P4 are venting to atmosphere.

Figure 27C:
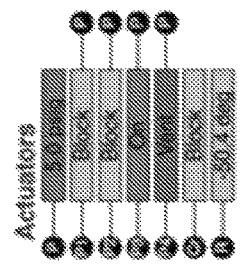
Figure 27B:
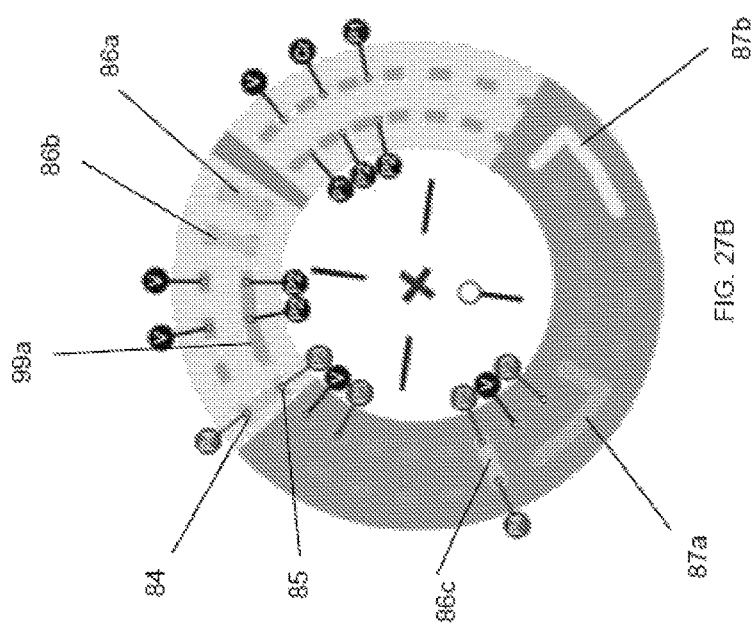
Figure 27A:
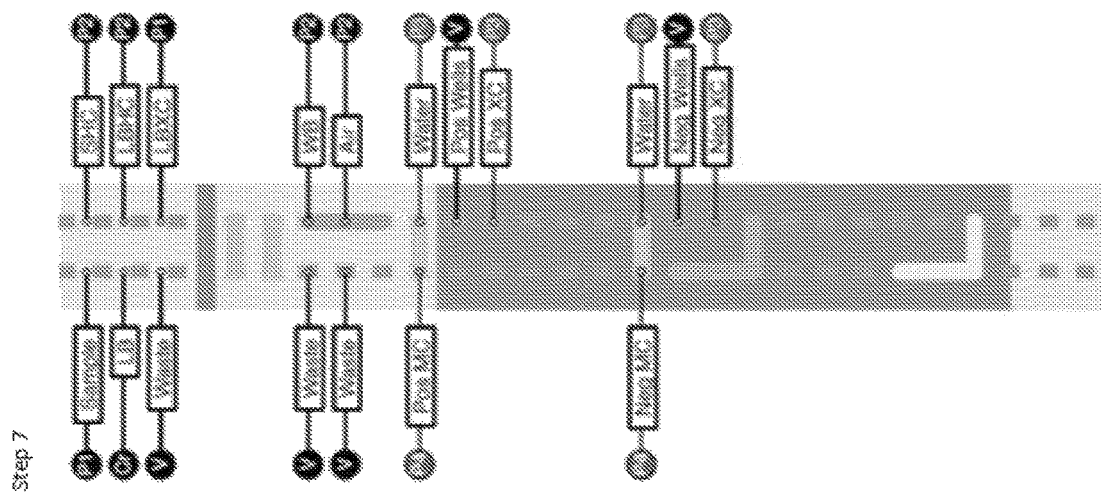

FIGS. 27A-B shows the rotary valve indexed to elute the matrix for eluting analyte from the porous solid support 45. Pneumatic source P3 is pressurized to send water, or other eluant, through the water port and into the gasket inlet 84. Water flows through the porous solid support 45 in the solid support chamber 46 to release the target analyte from the solid support. The eluate, containing the target analyte, exits the solid support chamber 46 from the flow chamber outlet, through the gasket outlet 85 and into a positive sample metering channel ("Pos MC") via a positive sample metering channel port in the stator 50.

Simultaneously, pneumatic pressure source P3 pressurizes a negative water port to move water, i.e. a negative control sample, to the negative metering channel port. This additional water port is used to load a negative control for the assay performed. A third selector groove 86c in the gasket allows the water port and negative control metering channel ("Neg MC") port to fluidically communicate, thus filling the negative metering channel. FIG. 27C shows pneumatic sources P1, P2, and Cr are blocked. Pneumatic source P3 is pressurized to 5.0 psig and pneumatic source P4 is venting to atmosphere.

FIGS. 28 and 29 both illustrate the rotary valve in it reagent mixing position, but differ in effect due to activating or venting different pneumatic sources. In FIGS. 28A-B, rotary valve flows the positive and negative samples from each respective metering channel to separate positive and negative mixing chambers ("Pos XC" and "Neg XC," respectively). Pneumatic source P4 pressurizes the positive metering channel port to transfer the positive sample into the positive mixing chamber via a first selector groove 87a. The first selector groove 87a allows a port along one radial line at a first radial distance from the rotational axis to fluidically communicate with a port along a different radial line at a second, and smaller, radial distance from the rotational axis. Simultaneously, pneumatic source P4 pressurizes the negative metering channel port to transfer the negative sample into the negative mixing chamber via a second selector groove 87b. FIG. 28C shows that pneumatic sources P1, P2, and Cr are blocked. Pneumatic source P3 is venting to atmosphere and pneumatic source P4 is pressurized to 5.0 psig.

In FIGS. 29A-B, the rotary valve remains in the same reagent mixing position. After mixing is complete, pneumatic source P3 is pressurized to move the fluid back into each of the respective metering channels. The first selector groove 87a allows fluidic communication between the positive mixing chamber port and the positive metering channel port to fill the positive metering channel. Likewise, the second selector groove 87b allows fluidic communication between the negative mixing chamber port and the negative metering channel port to fill the negative metering channel. FIG. 29C shows that pneumatic sources P1, P2, and Cr are blocked. Pneumatic source P3 is pressurized to 5.0 psig and pneumatic source P4 is venting to atmosphere.

Figure 30C:
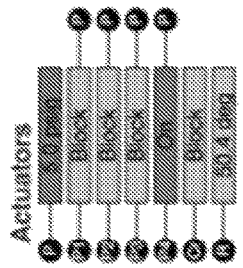
Figure 30B:
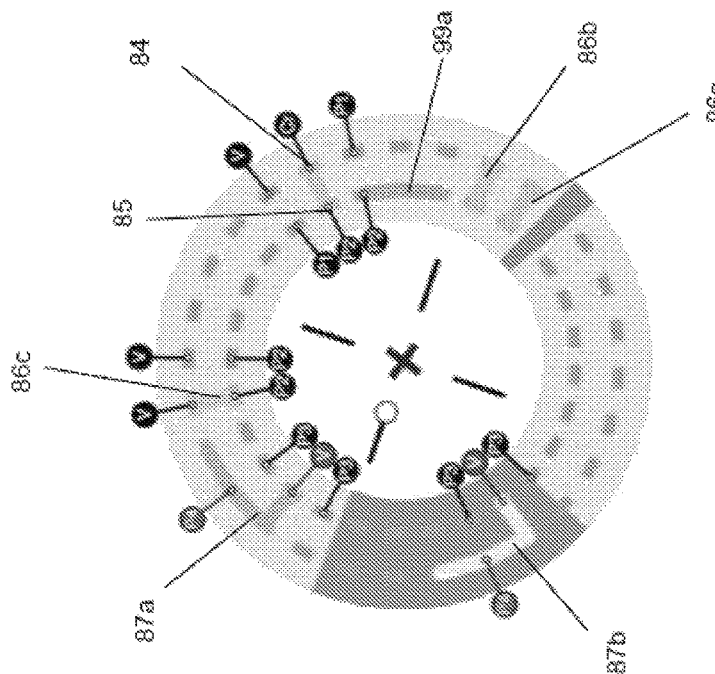
Figure 30A:
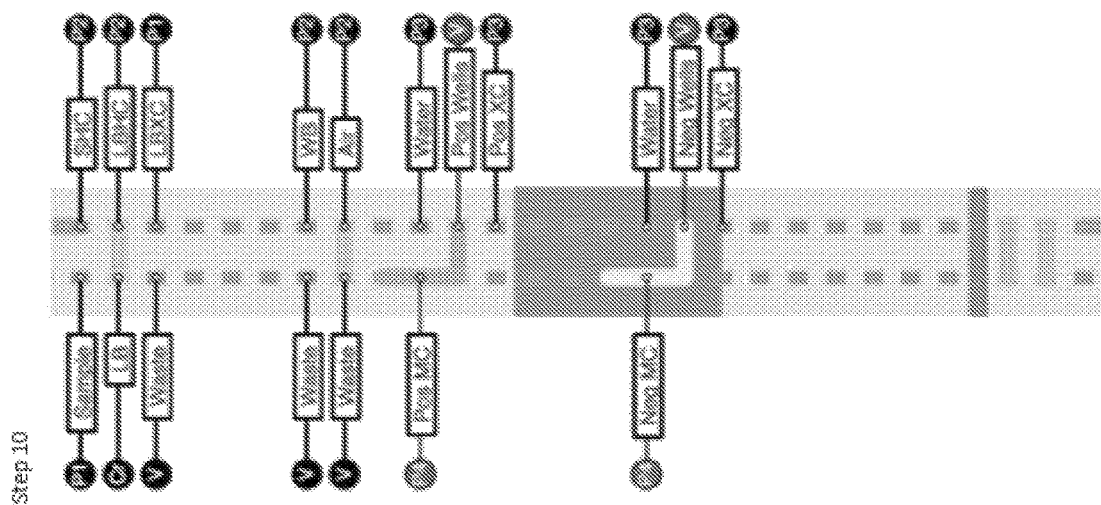

FIGS. 30A-B illustrates the rotary valve's final configuration, wherein positive sample and negative control are passed to the amplification wells. The first selector groove 87a now connects the positive metering channel port with the positive wells port to load positive amplification wells ("Pos Wells"). While the fluidic path between the positive metering channel port and positive wells port is shorter than the fluidic path between the positive metering channel port and positive mixing chamber port, the first selector groove 87a again connects two ports along different radial lines and different radial distances. Simultaneously, the second selector groove 87b connects the negative metering channel port with the negative wells ("Neg Wells") port to load the negative amplification wells. FIG. 30C shows that pneumatic sources P1, P2, P3, and Cr are blocked while pneumatic source P4 is pressurized to 5.0 psig.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

| # | Structure |
|---|---|
| 00 | rotary valve |
| 02 | rotor-stator interface |
| 04 | gasket-stator interface |
| 10 | rotor |
| 11 | rotor main body |
| 12 | rotor valving face |
| 13 | rotor outer face |
| 14 | rotor outer wall |
| 15 | rotor central opening (axle) |
| 16 | rotor rotational axis |
| 17 | propulsion engagement openings |
| 18 | compression limiter |
| 20 | displaceable spacer interface |
| 21 | lip |
| 22 | peripheral lip |
| 23 | interior lip |
| 24 | cam |
| 25 | interior cams |
| 26 | peripheral cam |
| 28 | displacer slots |
| 30 | rotor cap |
| 32 | rotor mating elements |
| 34 | cap flow channel surface |
| 36 | cap central opening |
| 38 | cap spline access |
| 40 | flow channel |
| 41 | flow channel inlet |
| 42 | flow channel outlet |
| 43 | $1^{st}$ conduit |
| 44 | $2^{nd}$ conduit |
| 45 | solid support |
| 46 | solid support chamber |
| 47 | entry to solid support chamber |
| 48 | exit from solid support chamber |
| 49 | flow channel spacer |
| 50 | stator |
| 51 | stator main body |
| 52 | stator face |
| 53 | stator port |
| 54 | passage |
| 55 | passage orifice |
| 56 | stator central protrusion (axle) |
| 57 | coupling protrusion (ret. elem. Post) |
| 60 | displaceable spacer |
| 61 | tab |
| 62 | peripheral tab |
| 63 | interior tab |
| 70 | arching rail |
| 71 | proximal rail |
| 72 | distal rail |
| 80 | gasket |
| 81 | gasket (sealing) face |
| 82 | gasket protrusion/wall |
| 83 | gasket aperture |
| 84 | gasket inlet (see gasket port) |
| 85 | gasket outlet (see gasket port) |
| 86 | connector groove |
| 87 | selector groove |
| 90 | retention element |
| 91 | retention ring |
| 92 | retention ring body |
| 93 | retention ring lip |
| 94 | retention ring attachment elements |
| 96 | biasing element |
| 98 | retainer (push nut) |
| 99 | radial connector groove |
| 110 | rotor threaded portion |
| 112 | notches |
| 114 | sloped feature |
| 116 | grooves (retaining ring) |
| 118 | ridges (rotor) |
| 171 | rotor-stator interface (unwound) |
| 172 | locations capable of supporting a port |
| 173 | port location |
| 180 | spacer |
| 191 | threaded portion (retention ring) |
| 194 | threads (retention ring) |
| 195 | complementary ridge |
| 197 | clip |
| 198 | $1^{st}$ prong |
| 199 | $2^{nd}$ prong |

The invention claimed is:

1. A rotary valve comprising:
   a. a rotor 10 comprising an outer face 13 and a rotor valving face 12 opposite the outer face 13 and a pair of apertures 41, 42 through the rotor valving face 12;
   b. a stator 50 having a stator face 52 having a plurality of stator ports 53 in the stator face, each one of the plurality of stator ports 53 in communication with a fluid passage 54 wherein the rotor valving face 12 is spaced apart from the stator face 52 while the rotary valve is in a storage condition;
   c. a retention element 90 comprising a retention ring 91 and a biasing element 96 biasing the rotor and stator towards one another;
   wherein the rotary valve is maintained in the storage condition while a portion of the retention ring is engaged with a portion of the rotor; and
   wherein a relative motion between the rotor and the stator disengages the portion of the retention ring engaged with the portion of the rotor to produce a fluid tight arrangement between the rotor valving surface and the stator face.

2. The rotary valve of claim 1 wherein a rotation of the rotor about a rotational axis transitions the rotary valve from the storage condition to an operational condition.

3. The rotary valve of claim 2 wherein the rotation of the rotor about the rotational axis is less than one revolution, is half a revolution, is a quarter of a revolution or one-eighth of a revolution.

4. The rotary valve of claim 1 wherein, when the rotor is in an operational condition with a sealed relationship between the rotor and the stator, the rotor freely rotates relative to the retention ring.

5. The rotary valve of claim 1 further comprising:
   a gasket 80 interposed between the stator face 52 and the rotor valving face 12 wherein a gasket inlet 84 and a gasket outlet 85 align with the pair of apertures 41, 42, wherein the gasket is spaced apart from the stator face 52 while in the storage condition.

6. The rotary valve of claim 5 wherein the relative motion between the rotor and the stator disengages the portion of the retention ring engaged with the portion of the rotor to produce a fluid tight arrangement between the rotor valving surface, the stator face and the gasket.

7. The rotary valve of claim 5 wherein a rotation of the rotor about a rotational axis transitions the rotary valve from the storage condition to an operational condition.

8. The rotary valve of claim 7 wherein the rotation of the rotor about the rotational axis is less than one revolution, is half a revolution, is a quarter of a revolution or one-eighth of a revolution.

9. The rotary valve of claim 5 wherein, when the rotor is in an operational condition with a sealed relationship between the rotor and the stator, the rotor freely rotates relative to the retention ring.

10. The rotary valve of claim 1 the retention ring having a pair of arcuate shapes along a surface adjacent to the rotor and the rotor having a pair of complementary accurate shapes corresponding to the pair of accurate shapes in the retention ring wherein engagement of the pair of arcuate shapes with the pair of complementary arcuate shapes maintains the rotary valve in the storage condition.

11. The rotary valve of claim 10 wherein the rotary valve is released from the storage condition by the relative movement between the rotor and the retention ring sufficient to disengage the pair of arcuate shapes along the surface adjacent to the rotor from the pair of complementary accurate shapes on the rotor.

12. The rotary valve of claim 1 the retention ring having a plurality of grooves about a portion of the retention ring adjacent to the rotor and the rotor having a plurality of complementary shapes in mating correspondence to the plurality of grooves in the retention ring wherein engagement of the plurality of grooves with the plurality of complementary shapes of the rotor maintains the rotary valve in the storage condition.

13. The rotary valve of claim 12 wherein the rotary valve is released from the storage condition by the relative movement between the rotor and the retention ring sufficient to disengage the plurality of grooves about a portion of the retention ring from the plurality of complementary shapes in mating correspondence on the rotor.

14. The rotary valve of claim 1 the retention ring having a threaded portion along a surface adjacent to the rotor and the rotor having a threaded portion wherein engagement of the retention ring threaded portion with the rotor threaded portion maintains the rotary valve in the storage condition.

15. The rotary valve of claim 14 wherein the rotary valve is released from the storage condition by the relative movement between the rotor and the retention ring sufficient to disengage the threaded portion of the retention ring from the threaded portion from the rotor.

16. The rotary valve of claim 1 wherein when the rotary valve is released from the storage condition, the rotary valve is maintained in an operational condition by the retention element 90.

17. The rotary valve of claim 1 having a rotational axis 16 wherein the biasing element 96 provides a substantially symmetrical force of the rotor and stator towards one another in relation to the rotational axis.

18. The rotary valve of claim 1 wherein the biasing element 96 extends around the circumference of the rotor and is one of a compression spring, a tension spring, a ribbon spring and a wave spring.

19. The rotary valve of claim 1 wherein the pair of apertures 41, 42 through the rotor valving face 12 are an inlet and an outlet, respectively, of fluid channel 40 containing a porous solid support 45.

20. The rotary valve of claim 19, wherein the porous solid support 45 is selected from the group consisting of alumina, silica, celite, ceramics, metal oxides, porous glass, controlled pore glass, carbohydrate polymers, polysaccharides, agarose, Sepharose, Sephadex, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers, and any combination thereof.

21. A method of rotating a rotary valve from a storage condition using the rotary valve according to claim 1, comprising:
   Maintaining the rotary valve in the storage condition while a portion of the retention ring is engaged with a portion of the rotor;
   Wherein the relative motion between the rotor and the stator is rotating the rotary valve about an axis of rotation 16 to disengage the portion of the retention ring from the portion of the rotor;
   Reducing a spacing between the rotor valving face 12 and the stator face 52; and Sealing the pair of apertures 41, 42 through the rotor valving face 12 to a pair of stator ports 53 in the stator face 52.

22. The method of rotating a rotary valve from a storage condition according to claim 21 wherein during the step of rotating the rotary valve about an axis of rotation 16, the rotation of the rotary valve about the rotational axis is less than one revolution, is half a revolution, is a quarter of a revolution or one-eighth of a revolution.

23. The method of rotating a rotary valve from a storage condition according to claim 21 wherein during the reducing a spacing step the biasing element moves the rotor and the stator towards one another.

24. The method of rotating a rotary valve from a storage condition according to claim 21 further comprising: positioning the rotary valve to align the pair of apertures 41, 42 with a fluid channel having a porous solid support 45 within the rotor.

25. The method of rotating a rotary valve from a storage condition according to claim 24 further comprising:

Positioning the rotary valve to align a pneumatic source to the fluid channel having the porous solid support 45.

26. The method of rotating a rotary valve from a storage condition according to claim 21 wherein before the sealing step aligning a gasket inlet 84 and a gasket outlet 85 of a gasket 80 with the pair of apertures 41, 42 and aligning the gasket inlet 84 and the gasket outlet 85 with the pair of stator ports 53 in the stator face 52.

27. The method of rotating a rotary valve from a storage condition according to claim 26 further comprising:

Positioning the rotary valve to align the pair of apertures 41, 42 to a fluid channel 86 formed in the gasket 80 or through a fluid channel 87 formed in the gasket 80.

* * * * *